(12) United States Patent
Srinivasan et al.

(10) Patent No.: US 12,554,547 B2
(45) Date of Patent: Feb. 17, 2026

(54) SILICON USAGE METERING TO PROVIDE SILICON-AS-A-SERVICE

(71) Applicant: Intel Corporation, Santa Clara, CA (US)

(72) Inventors: Vasudevan Srinivasan, Portland, OR (US); Knut Grimsrud, Forest Grove, OR (US); Johan Van De Groenendaal, Portland, OR (US); Mariusz Oriol, Gdynia (PL); Nishi Ahuja, Portland, OR (US); Shen Zhou, Shanghai (CN); Samantha Alt, Portland, OR (US); Katalin Bartfai-Walcott, El Dorado Hills, CA (US); Arkadiusz Berent, Tuchom (PL)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 18/258,298

(22) PCT Filed: Dec. 23, 2020

(86) PCT No.: PCT/CN2020/138531
§ 371 (c)(1),
(2) Date: Jun. 19, 2023

(87) PCT Pub. No.: WO2022/133778
PCT Pub. Date: Jun. 30, 2022

(65) Prior Publication Data
US 2024/0054039 A1 Feb. 15, 2024

(51) Int. Cl.
*G06F 9/50* (2006.01)
*G06F 11/07* (2006.01)
(Continued)

(52) U.S. Cl.
CPC ........ *G06F 9/5044* (2013.01); *G06F 11/0721* (2013.01); *G06F 11/076* (2013.01); *G06Q 20/085* (2013.01); *G06Q 30/04* (2013.01)

(58) Field of Classification Search
CPC .. G06F 9/5044; G06F 11/0721; G06F 11/076; G06F 11/0793; G06F 11/3051;
(Continued)

(56) References Cited

U.S. PATENT DOCUMENTS

| 5,923,870 A | 7/1999 | Johns et al. |
| 6,578,169 B1 | 6/2003 | Le et al. |

(Continued)

FOREIGN PATENT DOCUMENTS

| CN | 104333456 A | 2/2015 |
| CN | 106104487 A | 11/2016 |

OTHER PUBLICATIONS

Nternational Searching Authority, "International Search Report," issued in connection with International Patent Application No. PCT/CN2020/138531, mailed on Sep. 24, 2021, 3 pages.

(Continued)

*Primary Examiner* — Jorge A Chu Joy-Davila
(74) *Attorney, Agent, or Firm* — Hanley, Flight & Zimmerman, LLC

(57) ABSTRACT

Methods, apparatus, systems and articles of manufacture (e.g., physical storage media) to implement software defined silicon feature configuration pay-as-you-go licensing are disclosed. A disclosed silicon semiconductor device includes a first counter that increments a first count when a timer expires and, responsive to expiration of the timer, a feature configuration sampler to sample a state of a configuration of a feature of the silicon semiconductor device. In addition, the silicon semiconductor device includes a second counter that increments a second count when the sampled state of the configuration of the feature indicates the feature is active. A feature up-time tracker is also included outputs a value representative of an amount of time the configuration has been active, where the amount of time is based on the first count and the second count.

20 Claims, 31 Drawing Sheets

(51) Int. Cl.
*G06Q 20/08* (2012.01)
*G06Q 30/04* (2012.01)

(58) Field of Classification Search
CPC ... G06F 11/3024; G06Q 20/085; G06Q 30/04
See application file for complete search history.

(56) References Cited

U.S. PATENT DOCUMENTS

| | | |
|---|---|---|
| 8,543,738 B2 | 9/2013 | Salapura et al. |
| 10,102,004 B2* | 10/2018 | Bartik ............... G06F 9/5083 |
| 2010/0005473 A1* | 1/2010 | Blanding ............ G06F 9/5044 |
| | | 718/104 |
| 2011/0119475 A1* | 5/2011 | Chen ..................... G06F 1/08 |
| | | 713/400 |
| 2011/0154348 A1* | 6/2011 | Elnozahy ............... G06F 1/324 |
| | | 718/104 |
| 2015/0277922 A1 | 10/2015 | Bartik |
| 2018/0181457 A1* | 6/2018 | Ebisawa ............... G06F 11/079 |
| 2021/0303390 A1* | 9/2021 | Akahori .............. G06F 11/0757 |

OTHER PUBLICATIONS

Nternational Searching Authority, "Written Opinion of the International Searching Authority," issued in connection with International Patent Application No. PCT/CN2020/138531, mailed on Sep. 24, 2021, 4 pages.

International Bureau, "International Preliminary Report on Patentability," issued in connection with International Patent Application No. PCT/CN2020/138531, mailed on Jul. 6, 2023, 6 pages.

* cited by examiner

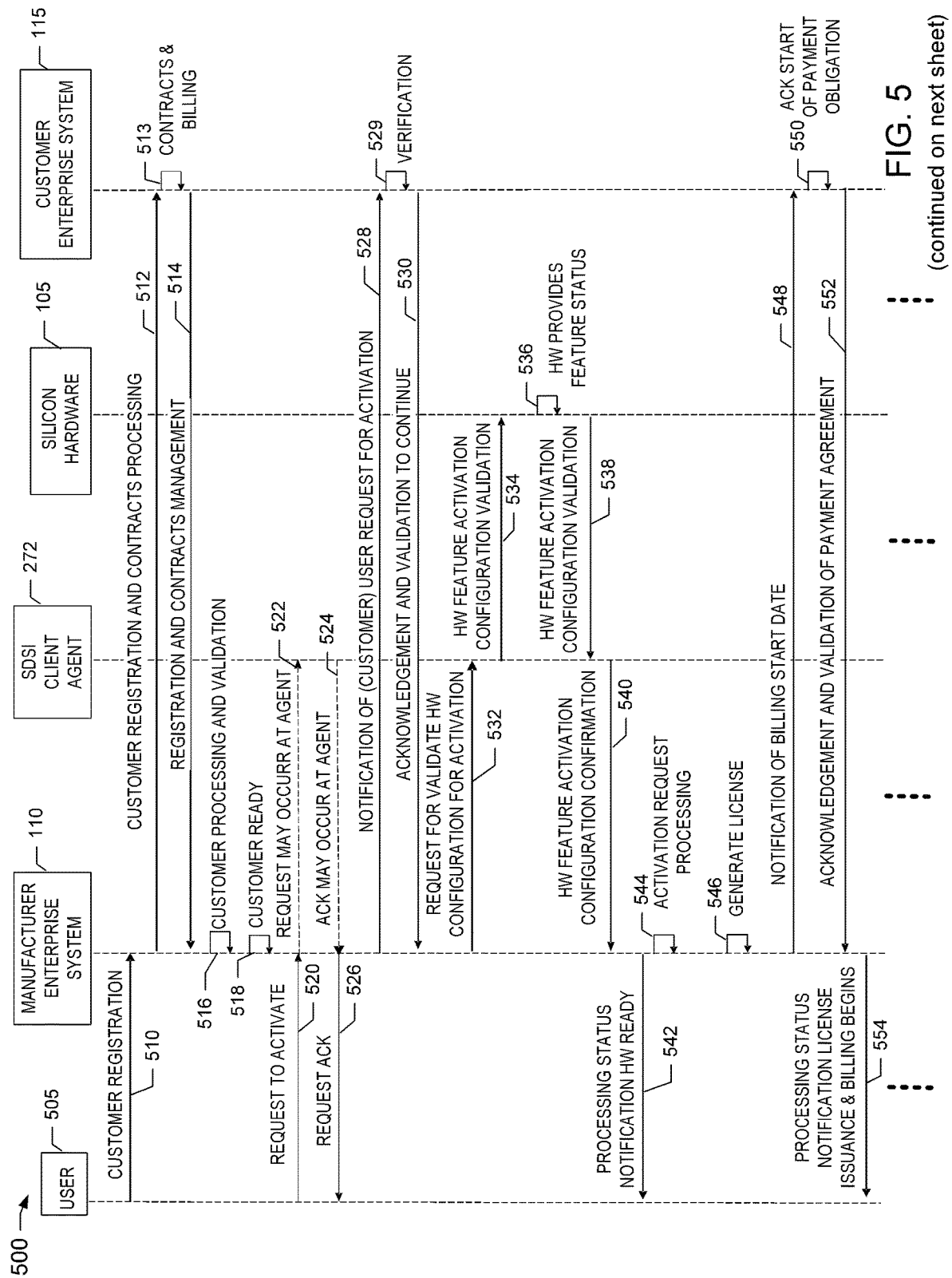
FIG. 5 (continued on next sheet)

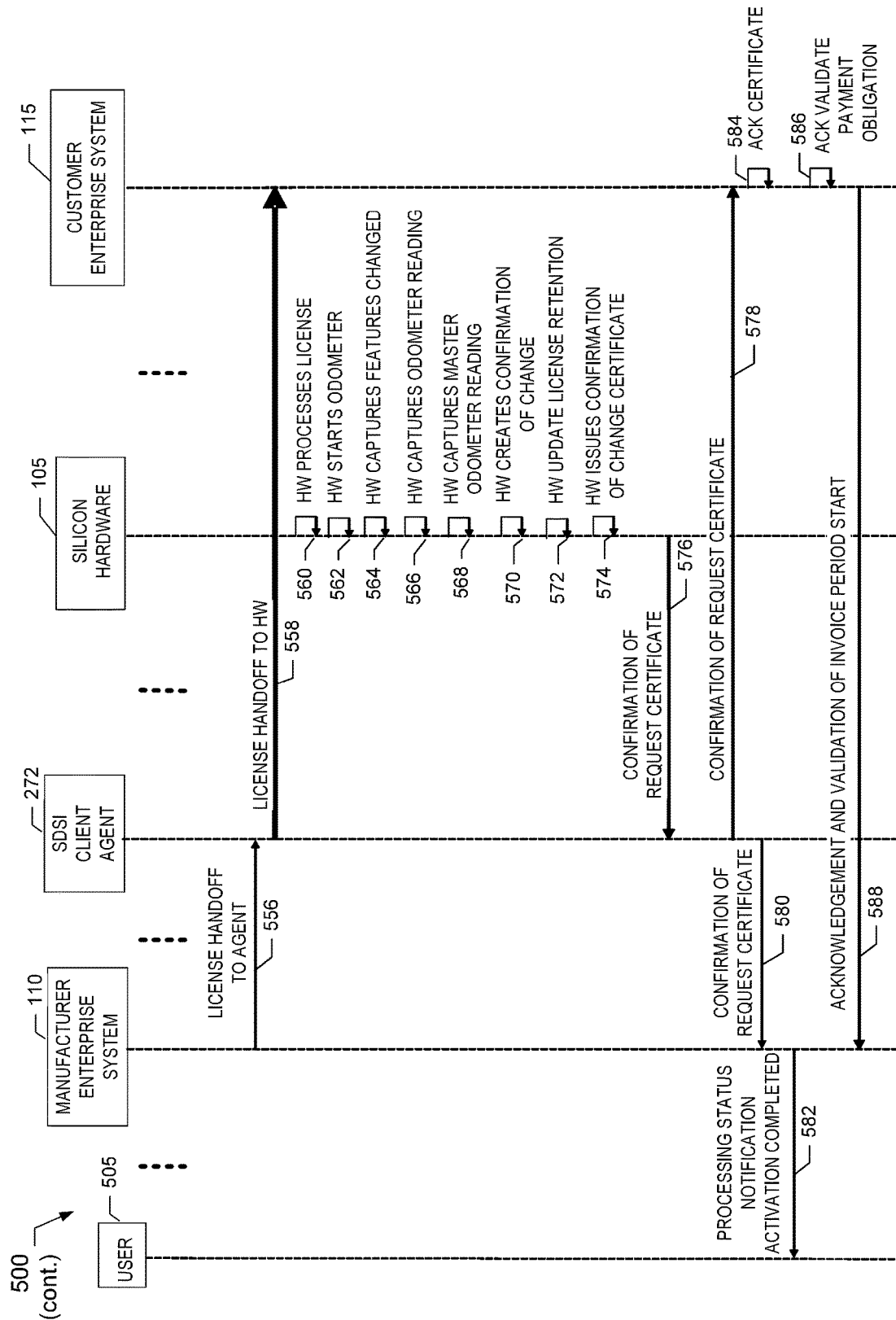
FIG. 5 (continued from previous sheet)

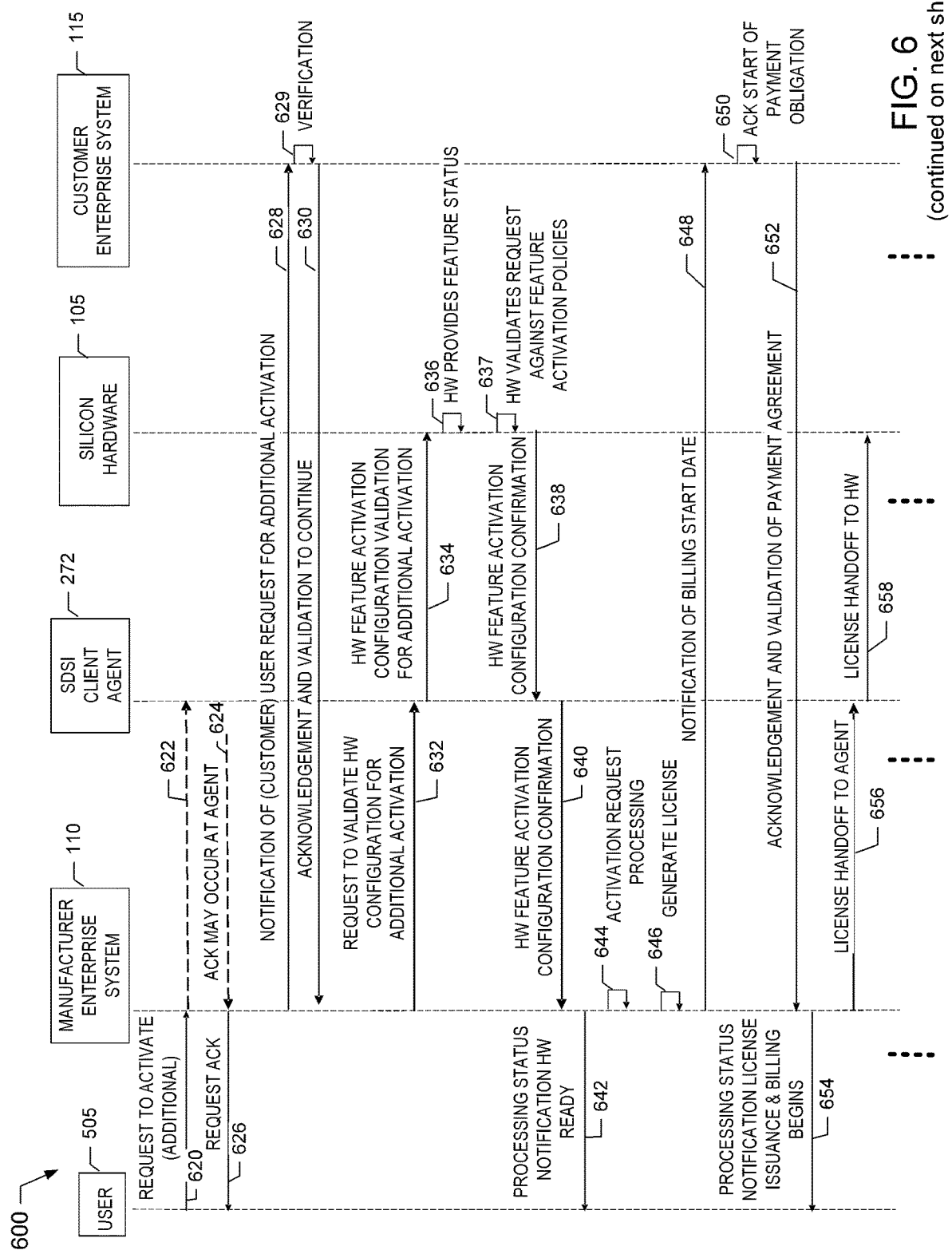
FIG. 6 (continued on next sheet)

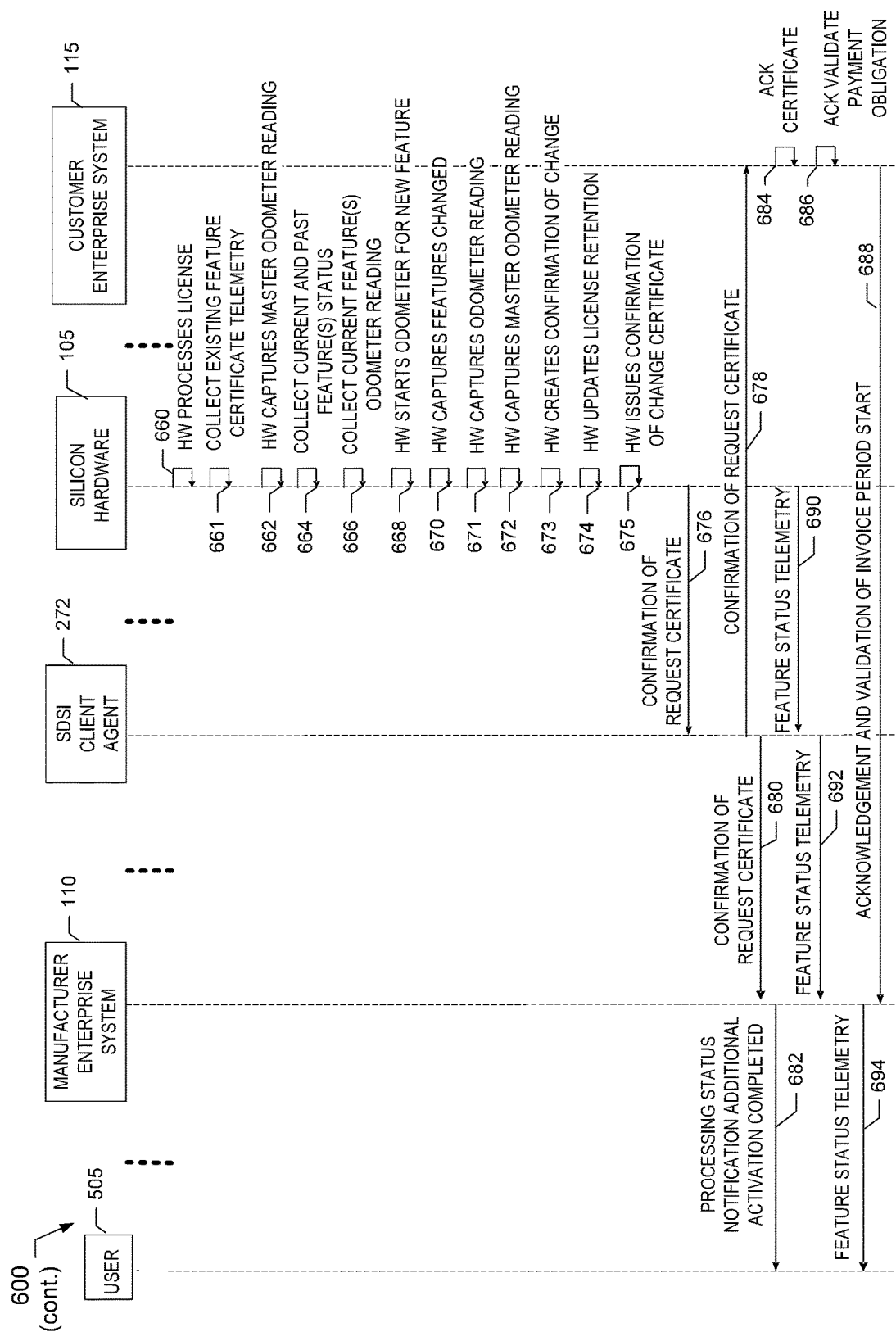
FIG. 6
(continued from previous sheet)

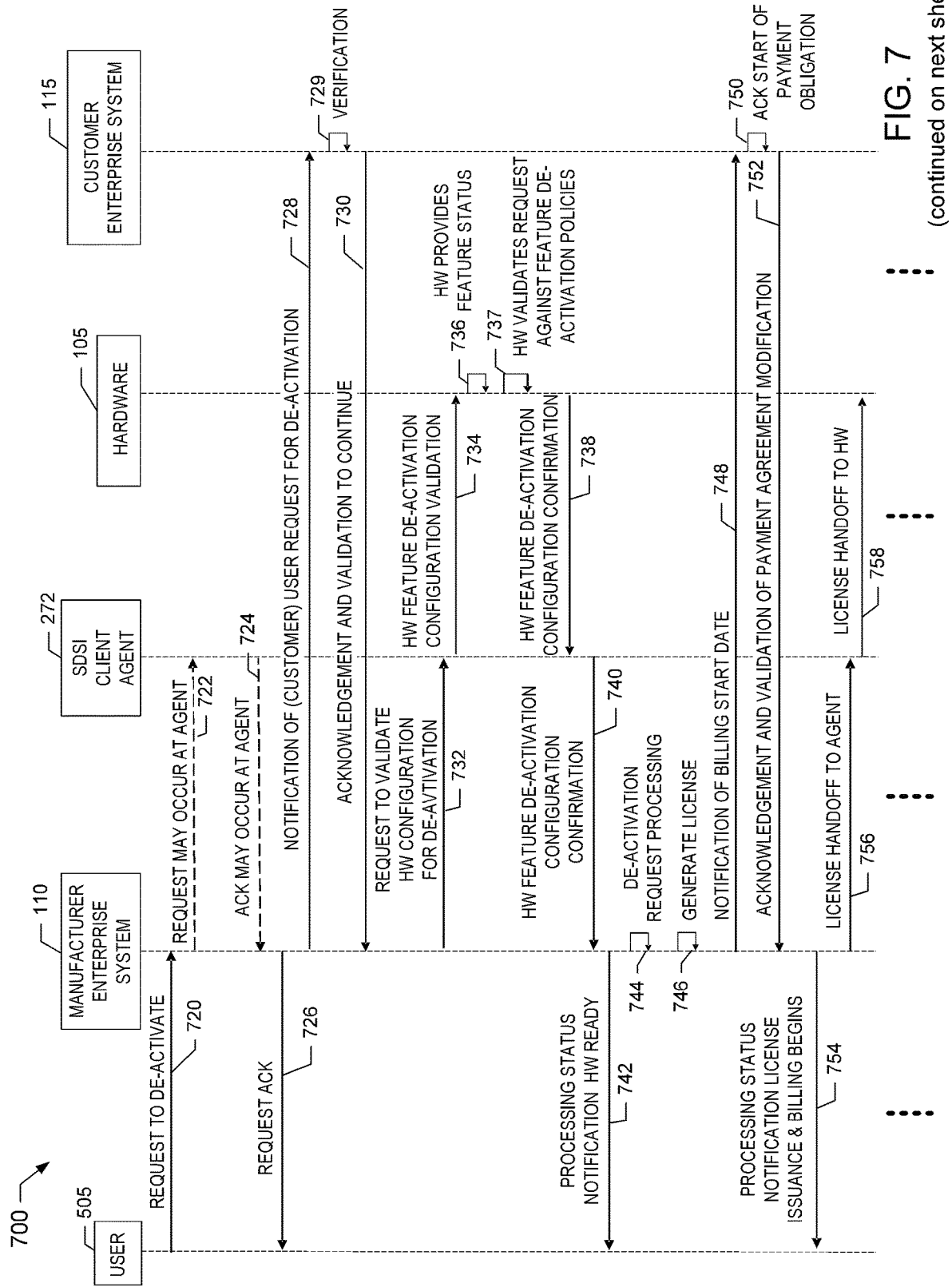

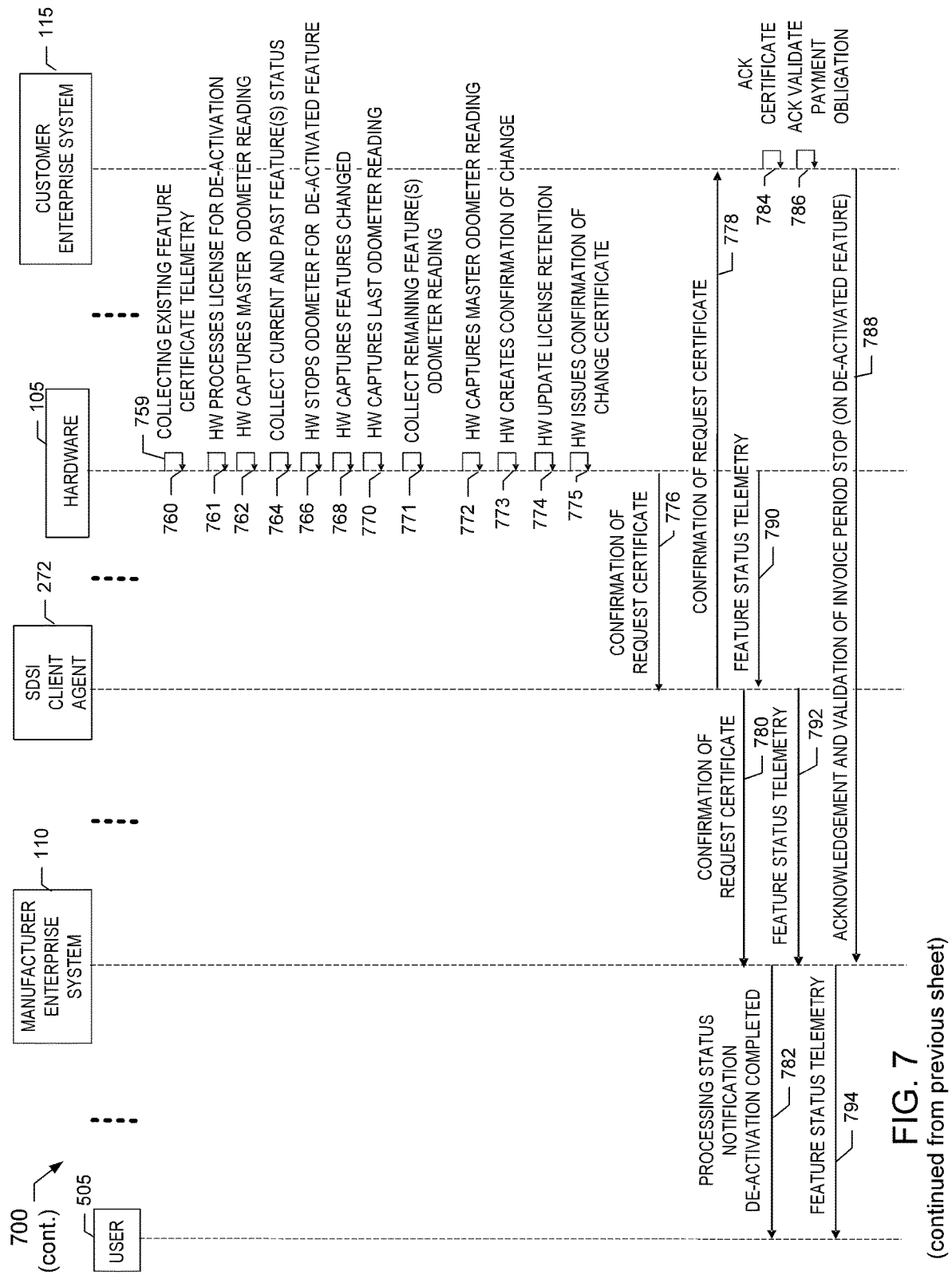
FIG. 7
(continued from previous sheet)

SILICON USAGE METERING TO PROVIDE SILICON-AS-A-SERVICE

RELATED APPLICATION(S)

This application corresponds to the U.S. national phase of International Patent Application No. PCT/CN2020/138531, which was filed on Dec. 23, 2020, and which is incorporated herein by reference in its entirety.

FIELD OF THE DISCLOSURE

This disclosure relates generally to semiconductor devices and, more particularly, to implementation and management of software defined silicon products.

BACKGROUND

In today's marketplace, semiconductor device manufacturers ship semiconductor devices, such as microprocessors, with hardware and firmware features, to customers. The microprocessors are replaced by such customers as, and when, the customers determine that additional hardware features (not available on the microprocessors), when the microprocessor is obsolete, when the processor has a fatal error, etc.

BRIEF DESCRIPTION OF THE DRAWINGS

FIG. 5 illustrates an example process flow performed by the example systems of FIGS. 1 and/or 2 to enable initial feature activation in an example software defined silicon product.

FIG. 6 illustrates an example process flow performed by the example systems of FIGS. 1 and/or 2 to enable additional feature activation in an example software defined silicon product.

FIG. 7 illustrates an example process flow performed by the example systems of FIGS. 1 and/or 2 to enable feature deactivation in an example software defined silicon product.

Figure 1:
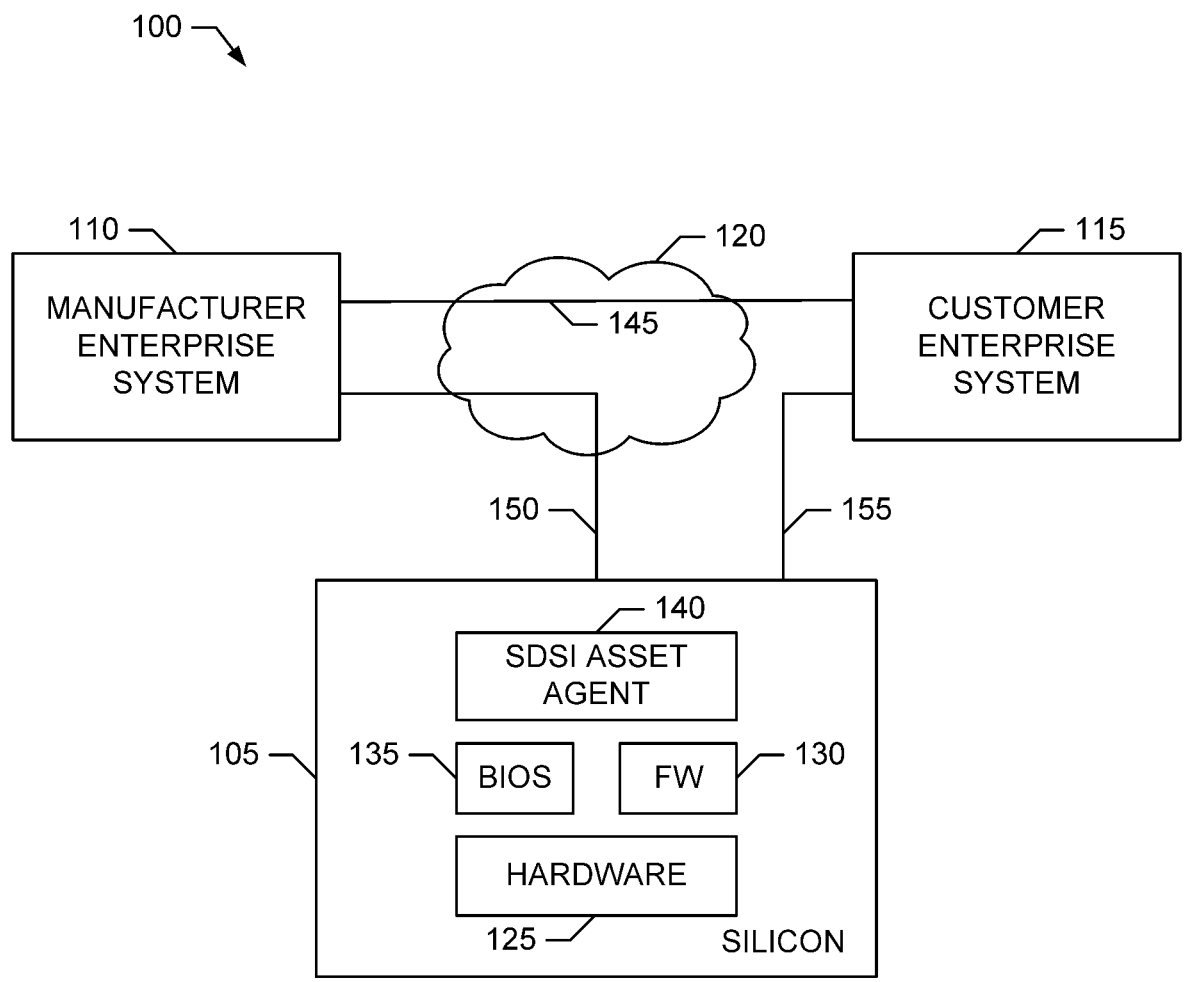
FIG. 1 is a block diagram of an example system to implement and manage software defined silicon products in accordance with teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Software Defined Silicon Architecture

Methods, apparatus, systems and articles of manufacture (e.g., physical storage media) to implement and manage software defined silicon products, also referred to as silicon assets, are disclosed herein. Examples of silicon products include any type of semiconductor device, such as, computer processors, central processing unit(s) (CPUs), semiconductor chips, silicon hardware devices, etc., as well as circuit boards and/or systems employing such silicon products, etc. Software Defined Silicon (SDSi) as disclosed herein, which is also referred to as Software Defined Intelligent Silicon (SDSi), enables a hardware agnostic activation and entitlement management solution, which can realize additional market and monetization opportunities for silicon products. For example, silicon products can be released to the market with additional, dormant processing capacity and/or features (e.g., to support unexpected market shifts, future competitive pressures, etc.) SDSi provides a solution for customers to access those features and for the platform manufacturer to recover trapped revenue in shipped products post-sale.

As mentioned above, semiconductor device manufacturers currently ship semiconductor devices, such as microprocessors, with hardware and firmware features fixed, or locked, at the factory. For example, a semiconductor device manufacturer may implement a semiconductor device with one-time fuses that are activated, or blown, to disable some features at the factory, leaving those feature dormant and unusable in the shipped semiconductor device. Thus, even if additional, dormant hardware and/or firmware features are included in the shipped semiconductor devices, such dormant features are unable to be activated after the semiconductor devices leave the factory when such one-time fuse implementations are employed. To gain access to one or more of those dormant features, a customer would need to order, and a manufacturer would need to ship, new versions of the semiconductor devices that have the desired dormant feature(s) activated at the factory. To further complicate matters, the manufacturer may need to predefine and manage a numerous different stock keeping units (SKUs) to track the various combinations of different features that are able to be activated on its semiconductor devices, even if some of those combinations are never realized.

In contrast, SDSi provides a solution that enables activation, deactivation and management of silicon product features after the product has left the manufacturer's facility and control. Thus, for silicon product manufacturers, SDSi provides a monetization opportunity and an access to new routes to market. For example, SDSi enables manufacturers to capture additional revenue via one-time activation, on-demand activation and/or recurring subscription models that extend feature activation and entitlement management onto the customer premises, with the potential for income and profits beyond the initial product sale. Additionally, or alternatively, SDSi enables manufacturers to take advantage of economies of scale by reducing the number of different silicon product versions that need to be manufactured. For example, through the use of SDSi, manufacturers can implement one version of a silicon product with a baseline set of features activated and can then activate other dormant features as requested and purchased by customers for their particular applications. For customers, SDSi enables effective management of capital expenditures and operating expenditures through silicon-enabled intra-scalability and elasticity. For example, SDSi can streamline a customer's inventory by reducing the number of different silicon product versions that need to be stocked to support different applications.

SDSi systems, as disclosed herein, also enable efficient SKU management by providing the ability to activate SKUs permanently, semi-permanently and/or via capacity-on-demand, and to provide SKU assignments on a per-customer basis. SDSi systems, as disclosed herein, enable permanent or dynamic activation of dormant features (also referred to as "dark assets") at a customer's premises without the need for a return merchandise authorization (RMA). In some examples, SDSi systems, as disclosed herein, also provide for tracking of usage of a configuration of a feature of the silicon product to enable a Silicon-As-A-Service (SiAAS) product and support a pay-as-you-go billing/business model. In some examples, the amount of up-time of a feature configuration is tracked and associated with a cost that can be a remittance to be paid to the manufacturer of the silicon 105. In some such examples, the customer need only pay for the up-time (the amount of time) the feature configuration is used, thus reducing customer costs. In some examples, up-time tracking of feature configurations can be analyzed using, for example AI to identify patterns associated with times when workload demand is sufficiently high to require additional resources. In some such examples, at the identified time, the system of FIGS. 1, 2, and/or 10 can automatically switch to a different feature configuration having additional resources thereby causing the resources to operate more efficiently. These and other example methods, apparatus, systems and articles of manufacture (e.g., physical storage media) to implement and manage SDSi products are disclosed in greater detail below.

Turning to the figures, a block diagram of an example system 100 to implement and manage SDSi products in accordance with teachings of this disclosure is illustrated in FIG. 1. The example SDSi system 100 of FIG. 1 includes an example silicon product 105, such as an example semiconductor device 105 or any other silicon asset 105, that implement SDSi features as disclosed herein. Thus, the silicon product 105 of the illustrated example is referred to herein as an SDSi product 105, such as an SDSi semiconductor device 105 or SDSi silicon asset 105. The system 100 also includes an example manufacturer enterprise system 110 and an example customer enterprise system 115 to manage the SDSi product 105. In the illustrated example of FIG. 1, at least some aspects of the manufacturer enterprise system 110 are implemented as cloud services in an example cloud platform 120.

The example manufacturer enterprise system 110 can be implemented by any number(s) and/or type(s) of computing devices, servers, data centers, etc. In some examples, the manufacturer enterprise system 110 is implemented by a processor platform, such as the example processor platform 2000 of FIG. 20. Likewise, the example customer enterprise system 115 can be implemented by any number(s) and/or type(s) of computing devices, servers, data centers, etc. In some examples, the customer enterprise system 115 is implemented by a processor platform, such as the example processor platform 2100 of FIG. 21. The example cloud platform 120 can be implemented by any number(s) and/or type(s), such as Amazon Web Services (AWS®), Microsoft's Azure® Cloud, etc. In some examples, the cloud platform 120 is implemented by one or more edge clouds as described below in connection with FIGS. 26-28. Aspects of the manufacturer enterprise system 110, the customer enterprise system 115 and the cloud platform 120 are described in further detail below.

In the illustrated example of FIG. 1, the SDSi product 105 is an SDSi semiconductor device 105 that includes example hardware circuitry 125 that is configurable under the disclosed SDSi framework to provide one or more features. For example, such features can include a configurable number of processor cores, a configurable clock rate from a set of possible clock rates, a configurable cache topology from a set of possible cache topologies, configurable coprocessors, configurable memory tiering, etc. As such, the hardware circuitry 125 can include one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs), field programmable logic device(s) (FPLD(s)), etc., or any combination thereof. The SDSi semiconductor device 105 of FIG. 1 also includes example firmware 130 and an example basic input/output system (BIOS) 135 to, among other things, provide access to the hardware circuitry 125. In some examples, the firmware 130 and/or the BIOS 135 additionally or alternatively implement features that are configurable under the disclosed SDSi framework. The SDSi semiconductor device 105 of FIG. 1 further includes an example SDSi asset agent 140 to configure (e.g., activate, deactivate, etc.) the SDSi features provided by the hardware circuitry 125 (and/or the firmware 130 and/or the BIOS 135), confirm such configuration and operation of the SDSi features, report telemetry data associated with operation of the SDSi semiconductor device 105, etc. Aspects of the SDSi asset agent 140 are described in further detail below.

The system 100 allows a customer, such as an original equipment manufacturer (OEM) of computers, tablets, mobile phones, other electronic devices, etc., to purchase the SDSi semiconductor device 105 from a silicon manufacturer and later configure (e.g., activate, deactivate, etc.) one or more SDSi features of the SDSi semiconductor device 105 after it has left the silicon manufacturer's factory. In some examples, the system 100 allows the customer (OEM) to configure (e.g., activate, deactivate, etc.) the SDSi feature(s) of the SDSi semiconductor device 105 at the customer's facility (e.g., during manufacture of a product including the SDSi semiconductor device 105) or even downstream after customer's product containing the SDSi semiconductor device 105 has been purchased by a third party (e.g., a reseller, a consumer, etc.)

By way of example, consider an example implementation in which the semiconductor device 105 includes up to eight (8) processor cores. Previously, the number of cores activated on the semiconductor device 105 would be fixed, or locked, at the manufacturer's factory. Thus, if a customer wanted the semiconductor device 105 to have two (2) active cores, the customer would contract with the manufacturer to purchase the semiconductor device 105 with 2 active cores, and the manufacturer would ship the semiconductor device 105 with 2 cores activated and identify the shipped device with a SKU indicating that 2 cores were active. However, the number of active cores (e.g., 2 in this example) could not be changed after the semiconductor device 105 left the manufacturer's factory. Thus, if the customer later determined that 4 (or 8) active cores were needed for its products, the customer would have to contract with the manufacturer to purchase new versions of the semiconductor device 105 with 4 (or 8) active cores, and the manufacturer would ship the new versions of the semiconductor device 105 with 4 (or 8) cores activated and identify the shipped device with a different SKU indicating that 4 (or 8) cores were active. In such examples, the customer and/or the manufacturer may be left with excess inventory of the semiconductor device 105 with the 2-core configuration, which can incur economic losses, resource losses, etc.

In contrast, assume the number of processor cores activated on the semiconductor device 105 is an SDSi feature that can be configured in the example system 100 in accordance with teachings of this disclosure. In such an example, the customer could contract with the manufacturer to purchase the SDSi semiconductor device 105 with 2 active cores, and the manufacturer would ship the SDSi semiconductor device 105 with 2 cores activated and identify the shipped device with a SKU indicating that 2 cores were active. After the device is shipped, if the customer determines that it would prefer that 4 cores were active, the customer management system 105 can contact the manufacturer enterprise system 110 via a cloud service implemented by the cloud platform 120 (represented by the line labeled 145 in FIG. 1) to request activation of 2 additional cores. Assuming the request is valid, the manufacturer enterprise system 110 generates a license (also referred to as a license key) to activate the 2 additional cores, and sends the license to the customer management system 115 via the cloud service implemented by the cloud platform 120 (represented by the line labeled 145 in FIG. 1) to confirm the grant of an entitlement to activate the 2 additional cores. The customer enterprise system 115 then sends the license (or license key) to the SDSi asset agent 140 of the SDSi semiconductor device 105 (via a network as represented by represented by the line labeled 155 in FIG. 1) to cause activation of 2 additional cores provided by the hardware circuitry 125 of the SDSi semiconductor device 105. In the illustrated example, the SDSi asset agent 140 reports a certificate back to the manufacturer enterprise system 110 (e.g., via an appropriate cloud service implemented by the cloud platform 120, as represented by the line labeled 150 in FIG. 1) to confirm activation of the 2 cores. In some examples, the SDSi asset agent 140 also reports the certificate back to the customer enterprise system 115 (e.g., via the network as represented by the line labeled 155 in FIG. 1) to confirm activation of the 2 cores. In some examples, the SDSi asset agent 140 also reports telemetry data associated with operation of the SDSi semiconductor device 105 to the manufacturer enterprise system 110 (e.g., via the appropriate cloud service implemented by the cloud platform 120, as represented by the line labeled 150 in FIG. 1) and/or the customer enterprise system 115 (e.g., via the network as represented by the line labeled 155 in FIG. 1). After successful activation is confirmed, the manufacturer then invoices the customer (e.g., via the manufacturer enterprise system 110 and the customer management system 115) for the newly activate features (e.g., 2 additional cores). In some examples, the manufacturer enterprise system 110 and/or the customer management system 115 determine a new SKU (e.g., a soft SKU) to identify the same SDSi semiconductor device 105 but with the new feature configuration (e.g., 4 cores instead of 2 cores).

If the customer later determines that it would prefer that 8 cores were active, the customer management system 115 can contact the manufacturer enterprise system 110 via the cloud service implemented by the cloud platform 120 (represented by the line labeled 145 in FIG. 1) to request activation of the remaining 4 additional cores. Assuming the request is valid, the manufacturer enterprise system 110 generates another license (or license key) to activate the 4 additional cores, and sends the license to the customer management system 115 via the cloud service implemented by the cloud platform 120 (represented by the line labeled 145 in FIG. 1) to confirm the grant of an entitlement to activate the 4 remaining cores. The customer enterprise system 115 then sends license (or license key) to the SDSi asset agent 140 of the SDSi semiconductor device 105 (e.g., via the network as represented by the line labeled 155 in FIG. 1) to cause activation of the 4 remaining cores provided by the hardware circuitry 125 of the SDSi semiconductor device 105. In the illustrated example, the SDSi asset agent 140 reports a certificate back to the manufacturer enterprise system 110 (e.g., via the appropriate cloud service implemented by the cloud platform 120, as represented by the line labeled 150 in FIG. 1) to confirm activation of the 4 remaining cores. In some examples, the SDSi asset agent 140 also reports the certificate back to the customer enterprise system 115 (e.g., via the network as represented by the line labeled 155 in FIG. 1) to confirm activation of the 4 remaining cores. In some examples, the SDSi asset agent 140 reports telemetry data associated with operation of the SDSi semiconductor device 105 to the manufacturer enterprise system 110 (e.g., via the appropriate cloud service implemented by the cloud platform 120, as represented by the line labeled 150 in FIG. 1) and/or the customer enterprise system 115 (e.g., via the network as represented by the line labeled 155 in FIG. 1). After successful activation is confirmed, the manufacturer then invoices the customer (e.g., via the manufacturer enterprise system 110 and the customer management system 115) for the newly activate features (e.g., the 4 additional cores). In some examples, the manufacturer enterprise system 110 and/or the customer management system 115 determine yet another new SKU (e.g., a soft SKU) to identify the same SDSi semiconductor device 105 but with the new feature configuration (e.g., 8 cores instead of 4 cores).

In the illustrated examples of FIG. 1, the communications between the manufacturer enterprise system 110 and the customer enterprise system 115, between the manufacturer enterprise system 110 and the SDSi asset agent 140 of the SDSi semiconductor device 105, and between the SDSi asset agent 140 of the SDSi semiconductor device 105 and the customer enterprise system 115 can be implemented by one or more networks. For example, such networks can include the Internet, one or more wireless (cellular, satellite, etc.) service provider networks, one or more wired (e.g., cable, digital subscriber line, optical fiber, etc.) networks, one or more communication links, busses, etc.

In some examples, the SDSi semiconductor device 105 is included in or otherwise implements an example edge node, edge server, etc., included in or otherwise implementing one or more edge clouds. In some examples, the SDSi semiconductor device 105 is included in or otherwise implements an appliance computing device. In some examples, the manufacturer enterprise system 110 is implemented by one or more edge node, edge server, etc., included in or otherwise implementing one or more edge clouds. In some examples, the manufacturer enterprise system 110 is implemented by one or more appliance computing devices. In some examples, the customer enterprise system 115 is implemented by one or more edge node, edge server, etc., included in or otherwise implementing one or more edge clouds. In some examples, the customer enterprise system 115 is implemented by one or more appliance computing devices. Examples of such edge nodes, edge servers, edge clouds and appliance computing devices are described in further detail below in connection with FIGS. 46-48. Furthermore, in some examples, such edge nodes, edge servers, edge clouds and appliance computing devices may themselves be implemented by SDSi semiconductor devices capable of being configured/managed in accordance with the teachings of this disclosure.

In some examples, the manufacturer enterprise system 110 communicates with multiple customer enterprise systems 115 and/or multiple SDSi semiconductor devices 105 via the cloud platform 120. In some examples, the manufacturer enterprise system 110 communicates with multiple customer enterprise systems 115 and/or multiple SDSi semiconductor device(s) 105 via the cloud platform 120 through one or more edge servers/nodes. In either such example, the customer enterprise system(s) 115 and/or SDSi semiconductor device(s) 105 can themselves correspond to one or more edge nodes, edge servers, edge clouds and appliance computing devices, etc.

In some examples, the manufacturer enterprise system 110 may delegate SDSi license generation and management capabilities to one or more remote edge nodes, edge servers, edge clouds, appliance computing devices, etc., located withing a customer's network domain. For example, such remote edge nodes, edge servers, edge clouds, appliance computing devices, etc., may be included in the customer enterprise system 115. In some such examples, the manufacturer enterprise system 110 can delegate to such remote edge nodes, edge servers, edge clouds, appliance computing devices, etc., a full ability to perform SDSi license generation and management associated with the customer's SDSi semiconductor devices 105 provided the remote edge nodes, edge servers, edge clouds, appliance computing devices, etc., are able to communicate with manufacturer enterprise system 110. However, in some examples, if communication with the manufacturer enterprise system 110 is disrupted, the remote edge nodes, edge servers, edge clouds, appliance computing devices may have just a limited ability to perform SDSi license generation and management associated with the customer's SDSi semiconductor devices 105. For example, such limited ability may restrict the delegated SDSi license generation and management to supporting failure recovery associated with the SDSi semiconductor devices 105. Such failure recovery may be limited to generating and providing licenses to configure SDSi features of a client's SDSi semiconductor device 105 to compensate for failure of one or more components of the SDSi semiconductor device 105 (e.g., to maintain a previously contracted quality of service).

Figure 2:
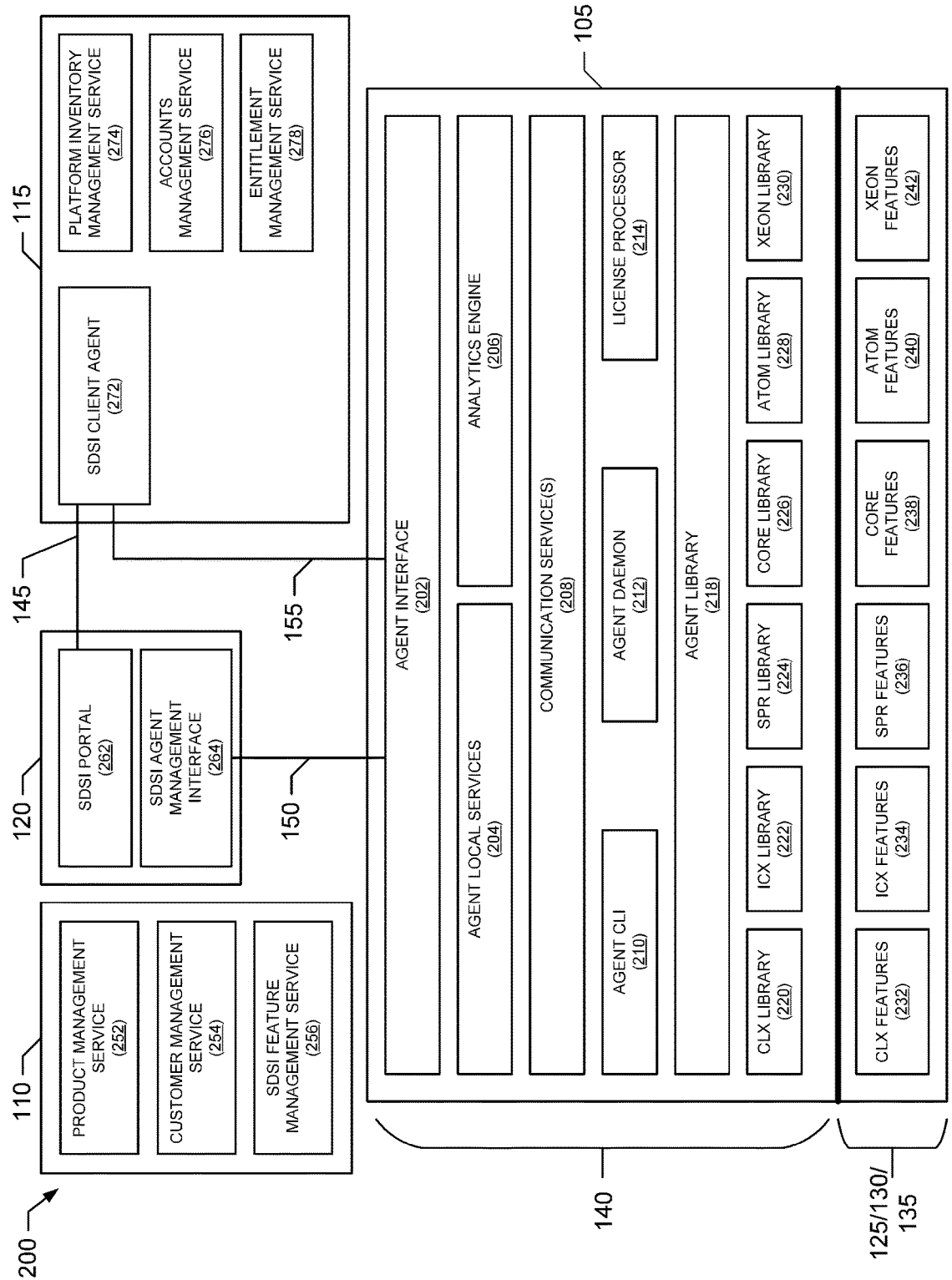
FIG. 2 is a block diagram illustrating example implementations of an example software defined silicon agent, an example manufacturer enterprise system and an example customer enterprise system included in the example system of FIG. 1.

A block diagram of an example system 200 that illustrates example implementations of the SDSi asset agent 140 of the SDSi silicon product 105, the manufacturer enterprise system 110 and the customer enterprise system 115 included in the example system 100 of FIG. 1 is illustrated in FIG. 2. The example SDSi asset agent 140 of FIG. 2 includes an example agent interface 202, example agent local services 204, an example analytics engine 206, example communication services 208, an example agent command line interface (CLI) 210, an example agent daemon 212, an example license processor 214, and an example agent library 218. The example SDSi asset agent 140 of FIG. 2 also includes example feature libraries 220-230 corresponding to respective example feature sets 232-242 implemented by the hardware circuitry 125, firmware 130 and/or BIOS 135 of the SDSi semiconductor device 105. The example manufacturer enterprise system 110 of FIG. 2 includes an example product management service 252, an example customer management service 254, and an example SDSi feature management service 256. The example manufacturer enterprise system 110 of FIG. 2 also implements an example SDSi portal 262 and an example SDSi agent management interface 264 as cloud services in the cloud platform 120. The example customer enterprise system 115 of FIG. 2 includes an example SDSi client agent 272, an example platform inventory management service 274, an example accounts management service 276 and an example entitlement management service 278.

In the illustrated example of FIG. 2, the agent interface 202 implements an interface to process messages sent between the SDSi asset agent 140 and the manufacturer enterprise system 110, and between the SDSi asset agent 140 and the customer enterprise system 115. The SDSi asset agent 140 of the illustrated example includes the agent local services 204 to implement any local services used to execute the SDSi asset agent 140 on the semiconductor device 105. The SDSi asset agent 140 of the illustrated example includes the analytics engine 206 to generate telemetry data associated with operation of the semiconductor device 105. Accordingly, the analytics engine 206 is an example of means for reporting telemetry data associated with operation of the semiconductor device 105. The communication services 208 provided in the SDSi asset agent 140 of the illustrated example include a local communication service to enable the SDSi asset agent 140 to communicate locally with the other elements of the semiconductor device 105 and/or a product platform including the semiconductor device 105. The communication services 208 also include a remote communication service to enable the SDSi asset agent 140 to communicate remotely with the SDSi agent management interface 264 of the manufacturer enterprise system 110 and the SDSi client agent 272 of the customer enterprise system 115. The SDSi asset agent 140 of the illustrated example includes the agent CLI 210 to process commands entered locally to the semiconductor device 105 via a command line interface. The SDSi asset agent 140 of the illustrated example includes the license processor 214 to process license(s) received from the customer enterprise system 115 to configure (e.g., activate, deactivate, etc.) one or more SDSi features included in the feature sets 232-242 implemented by the hardware circuitry 125, firmware 130 and/or BIOS 135 of the SDSi semiconductor device 105. Accordingly, the license processor 214 is an example of means for activating or deactivating at least one feature of the semiconductor device 105 based on a license received via a network from a remote enterprise system. The SDSi asset agent 140 of the illustrated example includes the agent daemon 212 to securely execute the elements of the SDSi asset agent 140. For example, the agent daemon 212 can execute one or more of the agent interface 202, the agent local services 204, the analytics engine 206, the communication services 208, the agent CLI 210 and/or the license processor 214 in a protected environment, such as a trusted execution environment (TEE), implemented by the semiconductor device 105. The SDSi asset agent 140 of the illustrated example includes the agent library 218 to provide, among other things, hardware-agnostic application programming interfaces (APIs) to be used by the license processor 214 to invoke the respective, hardware-specific feature libraries 220-230 to configure (e.g., activate, deactivate, etc.), based on the received license data, one or more features in the corresponding example features sets 232-242 implemented by the hardware circuitry 125, firmware 130 and/or BIOS 135 of the SDSi semiconductor device 105. Accordingly, the hardware circuitry 125, firmware 130 and/or BIOS 135 are examples of means for providing SDSi features in the SDSi semiconductor device 105. In some examples, the agent library 218 and/or the hardware-specific feature libraries 220-230 also operate in a protected environment, such as a TEE, implemented by the semiconductor device 105. Further details concerning the elements of the SDSi asset agent 140 of FIG. 2 are described below.

In the illustrated example of FIG. 2, the manufacturer enterprise system 110 includes the example product management service 252 to manage the inventory, pricing, etc., of the products manufactured by the manufacturer of the SDSi semiconductor device 105. The manufacturer enterprise system 110 of the illustrated example includes the customer management service 254 to manage customer accounts, billing, reconciliation, etc., for the manufacturer of the SDSi semiconductor device 105. The manufacturer enterprise system 110 of the illustrated example includes the SDSi feature management service 256 to manage the configuration of SDSi feature(s) implemented by the silicon products manufactured by the manufacturer of the SDSi semiconductor device 105. The manufacturer enterprise system 110 of the illustrated example implements the SDSi portal 262 to communicate (e.g., via a network) with the customer enterprise system 115. The manufacturer enterprise system 110 of the illustrated example implements the SDSi agent management interface 264 to communicate (e.g., via a network) with the SDSi asset agent 140 of the SDSi semiconductor device 105. Further details concerning the elements of the manufacturer enterprise system 110 of FIG. 2 are described below.

In the illustrated example of FIG. 2, the customer enterprise system 115 includes the SDSi client agent 272 to communicate (e.g., via a network) with the manufacturer enterprise system 110 and the SDSi asset agent 140 of the SDSi semiconductor device 105. The customer enterprise system 115 of the illustrated example includes the platform inventory management service 274 to manage the platforms offered by the customer (OEM), such as platforms that include the SDSi semiconductor device 105. The customer enterprise system 115 of the illustrated example includes the accounts management service 276 to manage accounts, billings, reconciliations, etc., the customer has with manufacturers, downstream customers, etc., such as the manufacturer of the SDSi semiconductor device 105. The customer enterprise system 115 of the illustrated example includes the entitlement management service 278 to manage licenses granted by manufacturers of SDSi products, such as the manufacturer of the SDSi semiconductor device 105, to configure (e.g., activate, deactivate, etc.) SDSi features implemented by those products. Further details concerning the elements of the customer enterprise system 115 of FIG. 2 are described below.

Figure 3:
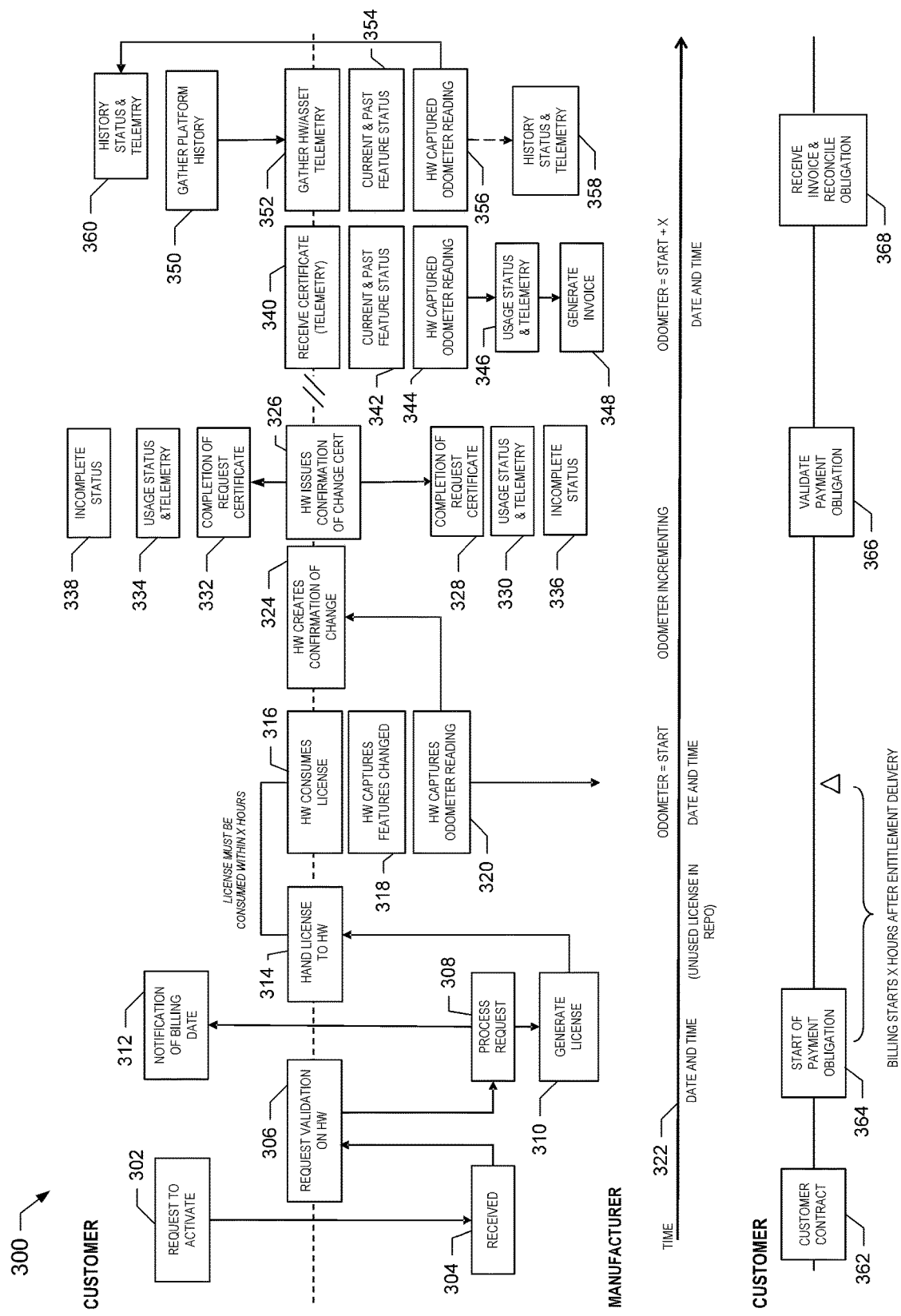
FIG. 3 illustrates an example software defined silicon management lifecycle implemented by the example systems of FIGS. 1 and/or 2.

An example SDSi management lifecycle 300 capable of being implemented by the example systems 100 and/or 200 of FIGS. 1-2 is illustrated in FIG. 3. The lifecycle 300 is described from the perspective of activating or deactivating an SDSI feature provided by the SDSi semiconductor device 105, but also can be applied to any type of configuration change of an SDSI feature provided by the SDSi semiconductor device 105. The lifecycle 300 begins at block 302 at which the SDSi client agent 272 of the customer enterprise system 115 sends a request to the SDSi portal 262 of the manufacturer enterprise system 110 to activate (or deactivate) an SDSI feature provided by the SDSi semiconductor device 105. Accordingly, the SDSi portal 262 is an example of means for receiving a request to activate or deactivate a feature provided by the semiconductor device 105. For example, the customer may access a customer management record for the SDSi semiconductor device 105 maintained by the platform inventory management service 274, and modify the customer management record to invoke the SDSi client agent 272 to send the request. Accordingly, the SDSi client agent 272 is an example of means for sending a request to activate or deactivate an SDSi feature provided by the semiconductor device 105. At block 304, the SDSi portal 262 of the manufacturer enterprise system 110 receives the request sent by the SDSi client agent 272 of the customer enterprise system 115 to activate (or deactivate) the SDSI feature provided by the SDSi semiconductor device 105. At block 306, the SDSi agent management interface 264 sends a query to the SDSi asset agent 140 to confirm that the SDSi semiconductor device 105 supports the SDSi feature to be activated (or deactivated). For example, the SDSi feature management service 256 may process the customer request received via the SDSi portal 262 and invoke the SDSi agent management interface 264 to send the query. The agent interface 202 of the SDSi asset agent 140 receives the query and invokes the license processor 214 to generate a response. The license processor 214 analyzes the configuration of the hardware circuitry 125, the firmware 130 and/or the BIOS 135 of the semiconductor device 105, generates feature support verification information indicating whether the queried feature is supported by the semiconductor device 105, and reports, via the agent interface 202, a response including the feature support verification information to the SDSi agent management interface 264. In some examples, rather than querying the SDSi asset agent 140 of the SDSi semiconductor device 105, the SDSi agent management interface 264 accesses one or more databases and/or other data structures (e.g., based on device identifier and/or SKU information included in the feature request) that store specification/configuration data for the SDSi semiconductor device 105 to confirm whether the SDSi semiconductor device 105 supports the requested feature.

At block 308 of the lifecycle 300, the SDSi agent management interface 264 receives the query response from the SDSi asset agent 140 (or from the queries database(s) and/or data structure(s)), which is processed by the SDSi feature management service 256. If the response indicates the SDSi feature of interest is supported by the SDSi semiconductor device 105, at block 310 the SDSi feature management service 256 generates a license to activate (or deactivate) the SDSi feature as requested. Accordingly, the SDSi feature management service 256 is an example of means for generating a license to be processed by the semiconductor device 105 to activate or deactivate an SDSi feature. Also, at block 312, the SDSi feature management service 256 causes the license to be sent via the SDSi portal 262 to the SDSi client agent 272 of the customer enterprise system 115. Accordingly, the SDSi client agent 272 is an example of means for receive a license from an enterprise management system to authorize activation or deactivation of an SDSi feature provided by the semiconductor device 105 In the illustrated example, the license generated at block 310 is associated with a license key and/or license data that specifies, for example, an identifier of the semiconductor device 105, the SDSi feature to be activated (or deactivated), terms of the activation (or deactivation), such as whether this is a one-time feature activation (deactivation) or renewable activation subject to a subscription, a valid start window (e.g., X hours, where X is a numerical value, or some other duration) for invoking the license to activate (or deactivate) the SDSI feature, etc. At this point in the lifecycle 300, the license generated at block 310 is treated as an unused license to activate (or deactivate) the SDSi feature, which is stored in a repository at the customer enterprise system 115 until the customer triggers use of the license to activate (or deactivate) the requested feature. For example, the SDSi feature management service 256 of the manufacturer enterprise system 110 can update a manufacturer management record maintained by the manufacturer for the semiconductor device 105 to include the license and/or license data generated at block 310, Likewise, the entitlement management service 278 of the customer enterprise system 115 can update the customer management record maintained by the customer for the semiconductor device 105 to indicate receipt of the license along with the license details. Accordingly, the entitlement management service 278 is an example of means for updating a management record associated with the semiconductor device 105 based on a license. In some such examples, the entitlement management service 278 can be invoked by the customer to update the customer management record to trigger operation of the license to activate (or deactivate) the SDSi feature, which cause the SDSi client agent 272 of the customer enterprise system 115 to transmit (e.g., download) the license via the network 155 to the SDSi asset agent 140 of the semiconductor device 105.

For example, upon receipt of a request at the SDSi client agent 272 to invoke the license, at block 314 the SDSi client agent 272 sends the license to the SDSi asset agent 140. Accordingly, the SDSi client agent 272 is an example of means for sending a license to the semiconductor device 105. The license is received by the agent interface 202, which at block 316 invokes the license processor 214. At block 316, the license processor 214 processes the license data to identify the feature to be activated (or deactivated), and activates (or deactivates) the feature in accordance with the license data. For example, if the feature is a configurable number of processor cores, and the semiconductor device 105 was initialized to have a first number of the processor cores active (e.g., 2 of 8 cores are active) with remaining ones of the processor cores dormant (e.g., 6 of 8 cores are dormant), the license data may specify that a second number of dormant processor cores (e.g., 4 of the 6 dormant cores) are to be activated (e.g., in response to a request from the customer enterprise system 115 to activate the second number of dormant cores). The license data may also identify which of the dormant cores are to be activated. In such an example, the license processor 214 invokes the agent library 218 to activate the dormant cores specified in the license data. As another example, the SDSi asset agent 140 may later receive a second license from the SDSi client agent 272 of the customer enterprise system 115 that specifies a third number of the active processor cores (e.g., 2 of the 6 active cores) that are to be deactivated (e.g., with the second license being generated by the manufacturer enterprise system 110 in response to a request from the customer enterprise system 115 to deactivate the third number of active cores). The second license data may also identify which of the active cores are to be deactivated. In such an example, the license processor 214 invokes the agent library 218 to deactivate the active cores specified in the license data. In some examples, the license processor 214 may limit the number of cores able to be deactivated to not be greater than the second number of dormant cores that were activated based on prior received license data. As yet another example, if the feature is a configurable clock rate, and the semiconductor device was initialized to activate a first clock rate from a set of possible clock rates, the license generated by the manufacturer enterprise system 110 and downloaded via the SDSi client agent 272 of the customer enterprise system 115 may identify a second clock rate different from the first clock rate that is to be activated (e.g., in response to a request from the customer enterprise system 115 to activate the second clock rate). In such an example, the license processor 214 invokes the agent library 218 to activate the second clock rate identified in the license data.

In some examples, a single license can configure multiple features across different feature categories. For example, a single license may include first license data to activate one or more additional cores, and second license to modify and/or otherwise adjust a clock rate of one or more cores. In such an example, the adjusted clock rate may be applied to one or more previously activated cores and/or one(s) of the one or more additional cores to be activated in response to the license processor 214 processing the license. Additionally, or alternatively, in some examples, a single license can activate one or more features, and also deactivate one or more other features.

At block 318 of the lifecycle 300, the analytics engine 206 of the SDSi asset agent 140 logs the SDSi feature activation (or deactivation) performed on the semiconductor device 105. At block 320, the analytics engine 206 captures an odometer reading representative of a present, local time maintained by the circuitry 125 (in combination with the firmware 135 and/or BIOS 140) of the semiconductor device 105. For example, the circuitry 125 may utilize a counter, timer or other mechanism to implement an odometer to track the passage of time locally at the semiconductor device 105 (which is represented by the directed line 322 in FIG. 3). At block 320, the analytics engine 206 captures a value of the odometer to act as a timestamp of when the requested feature was activated (or deactivated). At block 324, the analytics engine 206 generates a certificate to confirm the successful activation (or deactivation) of the requested SDSi feature. In the illustrated example, the certificate includes telemetry data associated with operation of the semiconductor device 105 and generated by the analytics engine 206 in response to activation (or deactivation) of the requested SDSi feature. In some examples, the telemetry data includes an indication of whether the feature activation (or deactivation) was a success, a status of the SDSi feature affected by the activation (or deactivation) (e.g., such as the presently configured number of cores that are active, the presently active clock rate, etc.), a first odometer reading (e.g., first timestamp) indicating when the feature activation (or deactivation) occurred, a second odometer reading (e.g., a second timestamp) indicating whether the certificate was generated, etc.

At block 326 of the lifecycle 300, the analytics engine 206 reports, via the agent interface 202, the certificate with the telemetry data in response to the activation (or deactivation) of the SDSi feature based on the received license data. In the illustrated example, the analytics engine 206 reports the certificate with the telemetry data to both the manufacturer enterprise system 110 and the customer enterprise system 115. For example, at block 328, the example SDSi agent management interface 264 of the manufacturer enterprise system 110 receives the certificate, and at block 330 provides it to the SDSi feature management service 256 of the manufacturer enterprise system 110. Accordingly, the SDSi agent management interface 264 is an example of means for receiving a certificate from the semiconductor device 105 to confirm successful activation or deactivation of an SDSi feature. The SDSi feature management service 256 processes the certificate and included telemetry data to log the successful feature activation (or deactivation). Similarly, at block 332, the SDSi client agent 272 of the customer enterprise system 115 receives the certificate and at block 334 provides it to the entitlement management service 278 of the customer enterprise system 115. The entitlement management service 278 processes the certificate and included telemetry data to log the successful feature activation (or deactivation). In the illustrated example, at this point in the lifecycle 300, the status of the feature activation (or deactivation) may be considered incomplete until verified by a subsequent certificate from the SDSi asset agent 140 (see blocks 336 and 338).

At block 340 of the lifecycle 300, the SDSi agent management interface 264 of the manufacturer enterprise system 110 receives a subsequent certificate with updated telemetry data from the SDSi asset agent 140. At block 342, the subsequent certificate is provided to the SDSi feature management service 256 of the manufacturer enterprise system 110. The SDSi feature management service 256 processes the certificate to obtain the updated telemetry data, and also obtains the prior telemetry data included in the previous certificate. At block 344, the SDSi feature management service 256 accesses the odometer readings included in the telemetry data. At block 346, the SDSi feature management service 256 compares the telemetry data and odometer reading to confirm the successful activation (or deactivation) (or, more generally, the successful configuration change) of the SDSi feature of interest. Accordingly, the SDSi feature management service 256 is an example of means for validating the successful activation or deactivation of an SDSi feature based on telemetry data. At block 348, the customer management service 254 of the manufacturer enterprise system 110 generates an invoice for the successful activation (or deactivation) of the SDSi feature of interest, and sends it to the customer enterprise system 115 via the SDSi portal 262 for processing by the accounts management service 276. In some examples, assuming the semiconductor device 105 is associated with a present SKU (e.g., a first SKU), after the requested SDSi feature is activated (or deactivated), the product management service 252 of the manufacturer enterprise system 110 generates a new SKU (e.g., a second SKU) and updates the manufacturer management record maintained for the semiconductor device 105 to associate the new SKU (second SKU) with the semiconductor device 105. Accordingly, the product management service 252 is an example of means for updating a management record to associate a second SKU with the semiconductor device 105 after an SDSi feature is activated or deactivated. Additionally, or alternatively, in some examples, assuming the semiconductor device 105 is associated with a present SKU (e.g., a first SKU), after the requested SDSi feature is activated (or deactivated), the platform inventory management service 274 of the customer enterprise system 115 generates a new SKU (e.g., a second SKU) and updates the customer management record maintained for the semiconductor device 105 to associate the new SKU (second SKU) with the semiconductor device 105. Accordingly, the platform inventory management service 274 is an example of means for updating a management record to associate a second SKU with the semiconductor device 105 after an SDSi feature is activated or deactivated.

At block 350 of the lifecycle 300, the entitlement management service 278 of the customer enterprise system 115 generates a request for status of the semiconductor device 105, and sends the request via the SDSi client agent 272 to the SDSi asset agent 140. Additionally, or alternatively, the SDSi feature management service 256 of the manufacturer enterprise system 110 could generate the request for status of the semiconductor device 105, and send the request via the SDSi agent management interface 264 to the SDSi asset agent 140. In either case, at block 352, the agent interface 202 receives the request and invokes the analytics engine 206 to generate a certificate in response to the request. In the illustrated example, the certificate includes updated telemetry data associated with operation of the semiconductor device 105 generated by the analytics engine 206 in response to the request. The updated telemetry data is timestamped with a local time corresponding to an odometer reading captured in response to the request. At blocks 354 and 356, the SDSi agent management interface 264 receives the requested certificate with the updated telemetry data from the SDSi asset agent 140 and provides it to the SDSi feature management service 256 of the manufacturer enterprise system 110. The SDSi feature management service 256 obtains the updated telemetry data, and also obtains the prior telemetry data for the semiconductor device 105, and further accesses the odometer readings included in the telemetry data. At block 356, the example SDSi feature management service 256 updates a history of the operational status of the semiconductor device 105 and uses the telemetry data to determine whether the semiconductor device 105 is operating properly.

Similarly, at block 360 of the lifecycle 300, the SDSi client agent 272 receives the requested certificate with the updated telemetry data from the SDSi asset agent 140 and provides it to the entitlement management service 278 of the customer enterprise system 115. The entitlement management service 278 obtains the updated telemetry data, and also obtains any prior telemetry data for the semiconductor device 105, and further accesses the odometer readings included in the telemetry data. The entitlement management service 278 then updates a history of the operational status of the semiconductor device 105 and uses the telemetry data to determine whether the semiconductor device 105 is operating properly. In some examples, the accounts management service 276 of the customer enterprise system 115 updates, based on receipt of the certificate, the customer management record associated with the semiconductor device 105 to confirm establishment or conclusion of a payment obligation with the manufacturer of the semiconductor device 105, such as the payment obligation associated with the invoice received from the manufacturer enterprise system 110 at block 348. Accordingly, the accounts management service 276 is an example of means for updating a management record, based on a certificate, to confirm establishment or conclusion of a payment obligation with a manufacturer of the semiconductor device 105.

As illustrated in the example lifecycle 300 of FIG. 3, the request to activate (or deactivate) the SDSi feature sent by the customer enterprise system 115 at block 302 and received by the manufacturer enterprise system 110 at block 304 can initiate a contract between the customer and the manufacturer. Later, the sending of the license to the customer enterprise system 115 at block 312 can be a trigger to start a payment obligation (see block 364). In some examples, the start of the payment obligation can be delayed until the feature is activated (or deactivated) in the semiconductor device 105 based on the license at block 316. Later, the reporting at block 326 of the certificate in response to the activation (or deactivation) of the SDSi feature in the semiconductor device 105 can validate the payment obligation (see block 366). Later, the generation and receipt of the invoice at block 348 can trigger reconciliation of the payment obligation (see block 368).

The licenses generated by the manufacturer enterprise system 110 to activate (or deactivate) SDSi features in the semiconductor device 105 can support one-time activation, on-demand activation and/or recurring subscription models. For example, the license may include license data to instruct the license processor 214 of the SDSi asset agent 140 executing in the semiconductor device 105 to perform a one-time activation (or deactivation) of one or more features identified by the license data. In some examples, to support on-demand activation and/or recurring subscription models, the license generated by the manufacturer enterprise system 110 can include license data that instructs the license processor 214 to activate (or deactivate) the specified SDSi feature(s) in accordance with an express permit or an express deny control mechanism. For example, under an express permit control mechanism, the license processor 214 causes an SDSi feature that is activated based on the license to be deactivated upon expiration of a time period (e.g., tracked by a counter, clock, or other mechanism) unless an express permit control signal is received from the manufacturer enterprise system 110 (e.g., via the SDSi agent management interface 264) before the time period expires. Conversely, under an express deny control mechanism, the license processor 214 causes an SDSi feature that is activated based on the license to be remain active unless an express deny control signal is received from the manufacturer enterprise system 110 (e.g., via the SDSi agent management interface 264). In such an example, receipt of the express deny control signal causes the license processor 214 to deny access to the activated feature, such as, by deactivating the feature.

In some examples, the license processor 214 of the SDSi asset agent 140 executing in the semiconductor device 105 activates and deactivates SDSI features through the use of reprogrammable soft fuse(s), register(s), logic gate(s), etc. For example, such reprogrammable soft fuse(s), register(s), logic gate(s), etc., can be connected to control lines of the hardware blocks included in the hardware circuitry 125 of the semiconductor device 105 to implement the SDSi features, connected to control inputs read by the firmware 130 and/or BIOS 135 to enable/disable the SDSi features, etc. The license processor 214 can set and/or reset ones of the reprogrammable soft fuse(s), values of the register(s), input(s) of the logic gate(s), etc., to activate/deactivate different SDSi features of the semiconductor device 105.

In some examples, the license processor 214 writes received license(s) and/or the license data included therein to a protected license memory region of the semiconductor device 105. In some examples, the license data is encrypted and the license processor 214 decrypts the license data before writing it to the protected license memory region of the semiconductor device 105. In some such examples, SDSi feature activation/deactivation responsive to a received license does not occur until the semiconductor device 105 reboots (e.g., via a soft reset, a hard reset, etc.) and the license data in the protected license memory region is read upon start-up. In some examples, the license processor 214 sets one or more particular locations of the protected license memory region to activate one or more SDSi features, and erases or overwrites the license data contained in those location(s) of the protected license memory region to deactivate those SDSi feature(s). For example, to deactivate a given SDSi feature, the license processor 214 may write random or otherwise garbage data to the location(s) associated with that feature in the protected license memory region, and rely on an error checking capability of the semiconductor device 105 that causes the given SDSi feature to remain disabled in response to such random or otherwise garbage data.

In some examples, the location(s) of the protected license memory region for deactivated SDSi feature(s) is(are) not erased or overwritten. Rather, in some such examples, to deactivate an SDSi feature, a deactivation license is appended to the list of licenses already stored in the protected license memory region for that SDSi feature. The newly received deactivation license in such an example overrides the actions of previously received licenses for that SDSi feature. In that way, the history of SDSi configuration operations (activations and deactivations) performed on the SDSi feature are stored by the semiconductor device 105 in the order the SDSi licenses were applied. In some examples, this information could be read by the customer.

Figure 4:
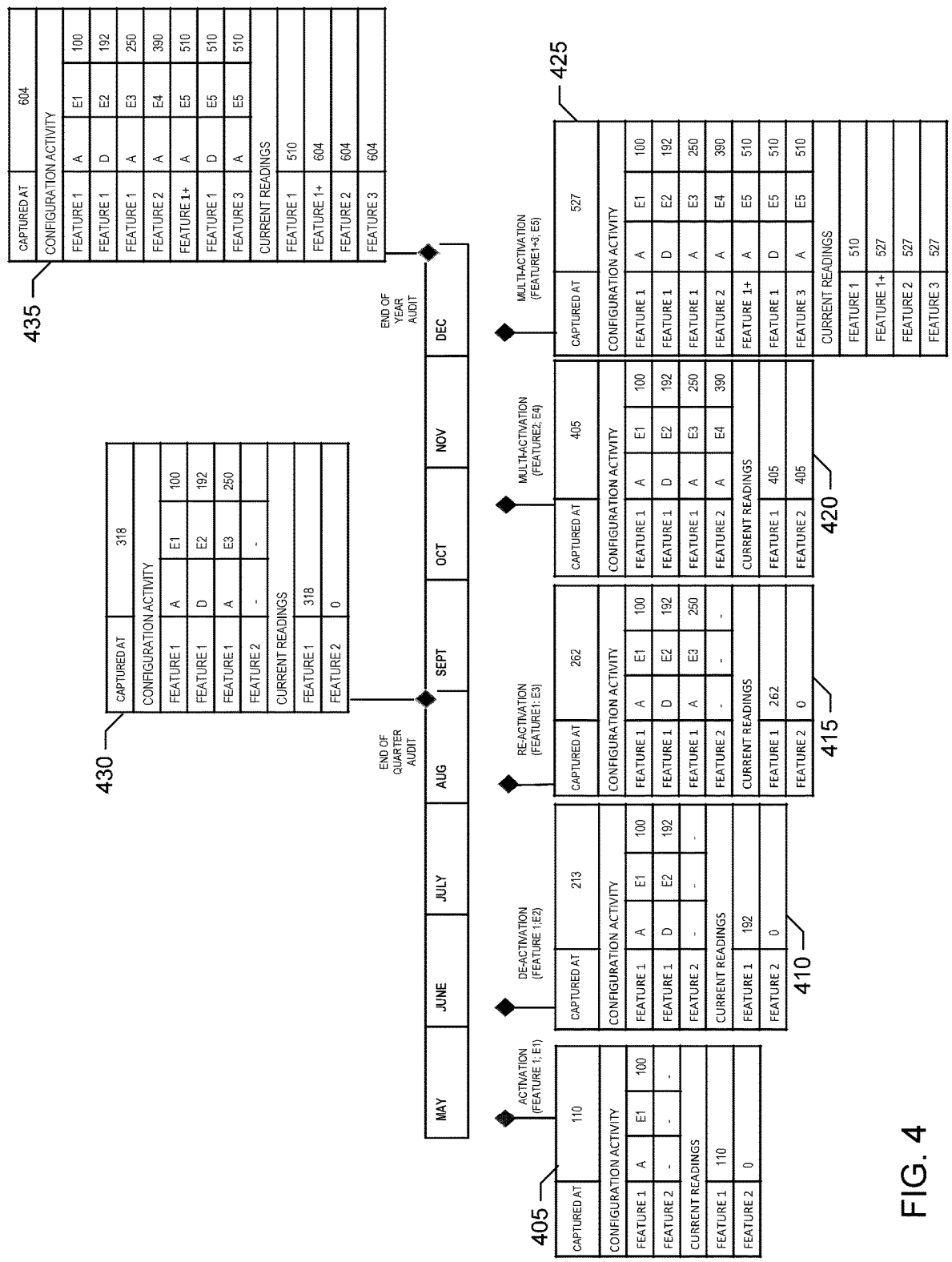
FIG. 4 illustrates example certificates utilized in the example systems of FIGS. 1 and/or 2 to implement the example lifecycle of FIG. 4.

Example certificates utilized in the example systems 100 and/or 200 of FIGS. 1-2 to implement the example lifecycle 300 of FIG. 3 are illustrated in FIG. 4. In the illustrated example of FIG. 4, the SDSi asset agent 140 associated with the semiconductor device 105 generates and reports a first example certificate 405 to the manufacturer enterprise system 110 and/or the customer enterprise system 115 in response to a first event (labeled "E1" in FIG. 4). The first event corresponds to activation of a first SDSi feature of the semiconductor device 105 (labeled "Feature 1" in FIG. 4). In the illustrated example, the first certificate 405 identifies the first SDSi feature ("Feature 1") and includes telemetry data. The telemetry data of the first certificate 405 indicates an activated status (labeled "A" in FIG. 4) for the first SDSi feature ("Feature 1"), and includes a first timestamp (e.g., first odometer reading) having a value of "100," which represents a local time at which the first SDSi feature ("Feature 1") was activated in the semiconductor device 105. The telemetry data of the first certificate 405 also indicates that another available SDSi feature (labeled "Feature 2" in FIG. 4) is dormant. The telemetry data of the first certificate 405 further includes a second timestamp (e.g., second odometer reading) having a value of "110," which represents a local time at which the first certificate 405 was generated.

In the illustrated example of FIG. 4, the SDSi asset agent 140 associated with the semiconductor device 105 generates and reports a second example certificate 410 to the manufacturer enterprise system 110 and/or the customer enterprise system 115 in response to a second event (labeled "E2" in FIG. 4). The second event corresponds to deactivation of the first SDSi feature of the semiconductor device 105 (labeled "Feature 1" in FIG. 4). In the illustrated example, the second certificate 410 identifies the first SDSi feature ("Feature 1") and includes updated telemetry data (in addition to the telemetry data included in the first certificate 405). The updated telemetry data of the second certificate 410 indicates a deactivated status (labeled "D" in FIG. 4) for the first SDSi feature ("Feature 1"), and includes a third timestamp (e.g., third odometer reading) having a value of "192," which represents a local time at which the first SDSi feature ("Feature 1") was deactivated in the semiconductor device 105. The updated telemetry data of the second certificate 410 also indicates that another available SDSi feature (labeled "Feature 2" in FIG. 4) is still dormant. The updated telemetry data of the second certificate 410 further includes a fourth timestamp (e.g., fourth odometer reading) having a value of "213," which represents a local time at which the second certificate 410 was generated.

In the illustrated example of FIG. 4, the SDSi asset agent 140 associated with the semiconductor device 105 generates and reports a third example certificate 415 to the manufacturer enterprise system 110 and/or the customer enterprise system 115 in response to a third event (labeled "E3" in FIG. 4). The third event corresponds to re-activation of the first SDSi feature of the semiconductor device 105 (labeled "Feature 1" in FIG. 4). In the illustrated example, the third certificate 415 identifies the first SDSi feature ("Feature 1") and includes updated telemetry data (in addition to the telemetry data included in the prior certificates 405 and 410). The updated telemetry data of the third certificate 415 indicates an activated status (labeled "A" in FIG. 4) for the first SDSi feature ("Feature 1"), and includes a fifth timestamp (e.g., fifth odometer reading) having a value of "250," which represents a local time at which the first SDSi feature ("Feature 1") was re-activated in the semiconductor device 105. The updated telemetry data of the third certificate 415 also indicates that another available SDSi feature (labeled "Feature 2" in FIG. 4) is still dormant. The updated telemetry data of the third certificate 415 further includes a sixth timestamp (e.g., sixth odometer reading) having a value of "262," which represents a local time at which the third certificate 415 was generated.

In the illustrated example of FIG. 4, the SDSi asset agent 140 associated with the semiconductor device 105 generates and reports a fourth example certificate 420 to the manufacturer enterprise system 110 and/or the customer enterprise system 115 in response to a fourth event (labeled "E4" in FIG. 4). The fourth event corresponds to activation of a second SDSi feature of the semiconductor device 105 (labeled "Feature 2" in FIG. 4). In the illustrated example, the fourth certificate 420 identifies the second SDSi feature ("Feature 2") and includes updated telemetry data (in addition to the telemetry data included in the prior certificates 405-415). The updated telemetry data of the fourth certificate 420 indicates an activated status (labeled "A" in FIG. 4) for the second SDSi feature ("Feature 2"), and includes a seventh timestamp (e.g., seventh odometer reading) having a value of "390," which represents a local time at which the second SDSi feature ("Feature 2") was activated in the semiconductor device 105. The updated telemetry data of the fourth certificate 420 further includes an eighth timestamp (e.g., eighth odometer reading) having a value of "405," which represents a local time at which the fourth certificate 420 was generated.

In the illustrated example of FIG. 4, the SDSi asset agent 140 associated with the semiconductor device 105 generates and reports a fifth example certificate 425 to the manufacturer enterprise system 110 and/or the customer enterprise system 115 in response to a fifth event (labeled "E5" in FIG.

4). The fifth event corresponds to modification of the first SDSi feature (labeled "Feature 1+" in FIG. 4), and activation of a third SDSi feature of the semiconductor device 105 (labeled "Feature 3" in FIG. 4). In the illustrated example, the fifth certificate 425 identifies the modified first SDSi feature ("Feature 1+") and the third SDSi feature ("Feature 3"), and includes updated telemetry data (in addition to the telemetry data included in the prior certificates 405-420). The updated telemetry data of the fifth certificate 425 indicates an activated status (labeled "A" in FIG. 4) for the modified first SDSi feature ("Feature 1+"), a de-activated status (labeled "D" in FIG. 4) for the prior version of the first SDSi feature ("Feature 1"), and an activated status (labeled "A" in FIG. 4) for the third SDSi feature ("Feature 3). The updated telemetry data includes a ninth timestamp (e.g., ninth odometer reading) having a value of "510," which represents a local time at which the modified first SDSi feature ("Feature 1+") was activated, the prior version of the first SDSi feature ("Feature 1") was deactivated, and the third SDSi feature ("Feature 3") was activated in the semiconductor device 105. The updated telemetry data of the fifth certificate 425 further includes a tenth timestamp (e.g., tenth odometer reading) having a value of "527," which represents a local time at which the fifth certificate 425 was generated.

In the illustrated example of FIG. 4, the SDSi asset agent 140 associated with the semiconductor device 105 generates and reports a sixth example certificate 430 to the manufacturer enterprise system 110 and/or the customer enterprise system 115 in response to a first status request from the manufacturer enterprise system 110 and/or the customer enterprise system 115. In the illustrated example, the sixth certificate 430 identifies the status history of the SDSi features provided by the semiconductor device 105. For example, the sixth certificate 430 includes status and corresponding telemetry data to log the activation and de-activation events for the first SDSi feature ("Feature 1") that occurred up to the time of the status request. The telemetry data of the sixth certificate 430 further includes a timestamp (e.g., odometer reading) having a value of "318," which represents a local time at which the sixth certificate 430 was generated.

In the illustrated example of FIG. 4, the SDSi asset agent 140 associated with the semiconductor device 105 generates and reports a seventh example certificate 435 to the manufacturer enterprise system 110 and/or the customer enterprise system 115 in response to a second status request from the manufacturer enterprise system 110 and/or the customer enterprise system 115. In the illustrated example, the seventh certificate 435 identifies the status history of the SDSi features provided by the semiconductor device 105. For example, the seventh certificate 435 includes status and corresponding telemetry data to log the activation and de-activation events for the first SDSi feature ("Feature 1"), the modified first feature (Feature 1+"), the second feature (Feature 2") and the third feature (Feature 3") that occurred up to the time of the status request. The telemetry data of the seventh certificate 435 further includes a timestamp (e.g., odometer reading) having a value of "604," which represents a local time at which the seventh certificate 435 was generated.

An example process flow 500 performed by the example systems 100 and/or 200 of FIGS. 1-2 to enable initial feature activation in the SDSi product 105 is illustrated in FIG. 5. The process flow 500 of the illustrated example begins with an example user 505 associated with a customer requesting registration of the customer for access to SDSi capabilities offered by a manufacturer of the SDSi product 105 (line 510). The manufacturer enterprise system 110 then engages with the customer enterprise system 115 to on-board the customer (lines 512-518). The manufacturer enterprise system 110 then receives a request to activate an SDSi feature of the SDSi product 105 and acknowledges the request (lines 520-526). As shown in the illustrated example, the feature activation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the SDSi feature activation request is valid (lines 528-530).

Assuming the SDSi feature activation request is valid, the manufacturer enterprise system 110 queries the SDSi product 105 to determine whether the requested SDSi feature to be activated is supported by the SDSi product 105 (lines 532-542). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105.

Assuming the requested SDSi feature is supported, the manufacturer enterprise system 110 generates a license to activate the requested SDSi feature in the SDSi product 105 (lines 544-546). The manufacturer enterprise system 110 also communicates with the customer enterprise system 115 to establish billing terms and other contractual obligations associated with activation of the requested SDSi feature (lines 548-554). The manufacturer enterprise system 110 then sends the generated license to the SDSi client agent 272 of the customer enterprise system 115 (line 556). Sometime later (e.g., when the customer is ready for the requested feature to be activated), the SDSi client agent 272 sends the license to the SDSi asset agent 140 of the SDSi product 105 (line 558). The SDSi asset agent 140 invokes the license processor 214 to process the received license to activate the requested SDSi feature (line 560). The license processor 214 invokes the analytics engine 206 to capture one or more odometer readings (lines 562-568), and then creates a confirmation certificate to confirm activation of the requested feature (lines 570-574).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 576-580. The manufacturer enterprise system 110 and the customer enterprise system 115 process the received confirmation certificate, and the customer enterprise system 115 validates the start of a payment obligation responsive to activation of the requested SDSi feature (lines 582-588).

An example process flow 600 performed by the example systems 100 and/or 200 of FIGS. 1-2 to enable additional feature activation in the SDSi product 105 is illustrated in FIG. 6. The process flow 600 of the illustrated example begins with the manufacturer enterprise system 110 receiving a request from the user 505 to activate an additional SDSi feature of the SDSi product 105 and acknowledging the request (lines 620-626). As shown in the illustrated example, the additional feature activation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the additional SDSi feature activation request is valid (lines 628-630).

Assuming the additional SDSi feature activation request is valid, the manufacturer enterprise system 110 queries the SDSi product 105 to determine whether the additional requested SDSi feature to be activated is supported by the SDSi product 105 (lines 632-642). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105. In the illustrated example, in addition to checking whether the requested feature is supported, the SDSi product 105 also validates the activation request against other policies (line 637). For example, such policies may confirm that the additional SDSi feature to be activated will not conflict with an earlier SDSi feature that was activated.

Assuming the requested additional SDSi feature is supported, the manufacturer enterprise system 110 generates a license to activate the additional SDSi feature in the SDSi product 105 (lines 644-646). The manufacturer enterprise system 110 also communicates with the customer enterprise system 115 to establish billing terms and other contractual obligations associated with activation of the additional SDSi feature (lines 648-654). The manufacturer enterprise system 110 then sends the generated license to the SDSi client agent 272 of the customer enterprise system 115 (line 656). Sometime later (e.g., when the customer is ready for the additional feature to be activated), the SDSi client agent 272 sends the license to the SDSi asset agent 140 of the SDSi product 105 (line 658). The SDSi asset agent 140 invokes the license processor 214 to process the received license to activate the requested SDSi feature (line 660). The license processor 214 also invokes the analytics engine 206 to collect telemetry data for the SDSi features of the SDSi product 105 (line 661) and capture one or more odometer readings (lines 662-672), and then creates a confirmation certificate to confirm activation of the requested feature (lines 673-675).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 676-680. The manufacturer enterprise system 110 and the customer enterprise system 115 process the received confirmation certificate, and the customer enterprise system 115 validates the start of a payment obligation responsive to activation of the requested SDSi feature (lines 682-688). In the illustrated example, the SDSi asset agent 140 of the SDSi product 105 also reports SDSi feature status telemetry (e.g., included in subsequent certificates) to the manufacturer enterprise system 110 (e.g., via the SDSi client agent 272 in the illustrated example) (lines 690-694).

An example process flow 700 performed by the example systems 100 and/or 200 of FIGS. 1-2 to enable feature deactivation in the SDSi product 105 is illustrated in FIG. 7. The process flow 700 of the illustrated example begins with the manufacturer enterprise system 110 receiving a request from the user 505 to deactivate an SDSi feature of the SDSi product 105 and acknowledging the request (lines 720-726). As shown in the illustrated example, the feature deactivation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the SDSi feature deactivation request is valid (lines 728-730).

Assuming the SDSi feature deactivation request is valid, the manufacturer enterprise system 110 queries the SDSi product 105 to determine whether the requested SDSi feature to be deactivated is supported by the SDSi product 105 (lines 732-742). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105. In the illustrated example, in addition to checking whether the requested feature is supported, the SDSi product 105 also validates the deactivation request against other policies (line 737). For example, such policies may confirm that the SDSi feature to be deactivated will not cause a conflict with remaining active SDSi features, will not violate a specified base SDSi feature state for SDSi product 105, etc.

Assuming the SDSi feature to be deactivated is supported, the manufacturer enterprise system 110 generates a license to deactivate the SDSi feature in the SDSi product 105 (lines 744-746). The manufacturer enterprise system 110 also communicates with the customer enterprise system 115 to establish billing terms and other contractual obligations associated with deactivation of the SDSi feature (lines 748-754). The manufacturer enterprise system 110 then sends the generated license to the SDSi client agent 272 of the customer enterprise system 115 (line 756). Sometime later (e.g., when the customer is ready for the feature to be deactivated), the SDSi client agent 272 sends the license to the SDSi asset agent 140 of the SDSi product 105 (line 758). The SDSi asset agent 140 invokes the analytics engine 206 to collect telemetry data for the SDSi product 105 before feature deactivation (line 759), and then invokes the license processor 214 to process the received license to deactivate the requested SDSi feature (line 760). The analytics engine 206 also captures one or more odometer readings and collects telemetry data for the remaining active SDSi features of the SDSi product 105 (lines 762-774), which are used by the license processor 214 to create a confirmation certificate to confirm deactivation of the requested feature (lines 775).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 776-780. The manufacturer enterprise system 110 and the customer enterprise system 115 process the received confirmation certificate, and the customer enterprise system 115 validates the start of a payment obligation responsive to deactivation of the requested SDSi feature (lines 782-788). In the illustrated example, the SDSi asset agent 140 of the SDSi product 105 also reports SDSi feature status telemetry (e.g., included in subsequent certificates) to the manufacturer enterprise system 110 (e.g., via the SDSi client agent 272 in the illustrated example) (lines 790-794).

Figure 8:
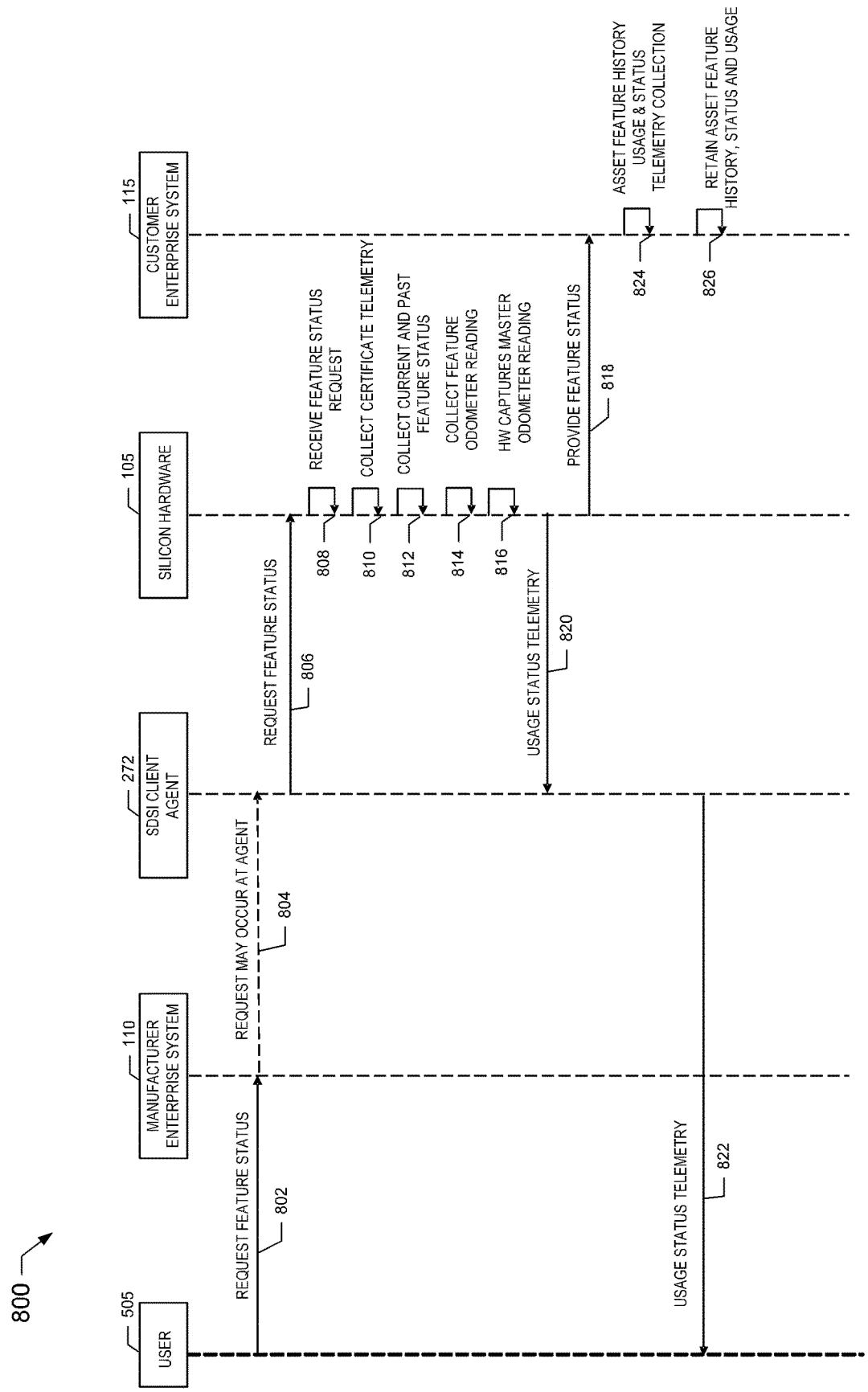
FIG. 8 illustrates an example process flow performed by the example systems of FIGS. 1 and/or 2 to provide customer-initiated feature usage status and billing reconciliation.

An example process flow 800 performed by the example systems 100 and/or 200 of FIGS. 1-2 to provide customer-initiated feature usage status and billing reconciliation is illustrated in FIG. 8. The process flow 800 of the illustrated example begins with the manufacturer enterprise system 110 receiving a request from the user 505 for SDSi feature status of the SDSi product 105 (lines 802-804). As shown in the illustrated example, the additional feature activation request can be received from a source (e.g., computer device) separate from the customer enterprise system 115, or can be received at the SDSi client agent 272 thereby bypassing the manufacturer enterprise system 110. In the illustrated example, the feature status request is received by the SDSi client agent 272, which sends the request to the SDSi asset agent 140 of the SDSi product 105 (line 806). In response to the feature status request, the SDSi asset agent 140 invokes the analytics engine 206 to collect telemetry data, current and past feature status, and odometer readings (lines 808-816). The SDSi asset agent 140 the reports the SDSi feature status of the SDSi product 105 to the customer enterprise system 115 (line 818), and more detailed telemetry status to the manufacturer enterprise system 110 (lines 820-822). In the illustrated example, the customer enterprise system 115 collects the SDSi feature status data from the SDSi product 105 and retains the status to perform feature usage status and billing reconciliation (lines 824-826).

Figure 9:
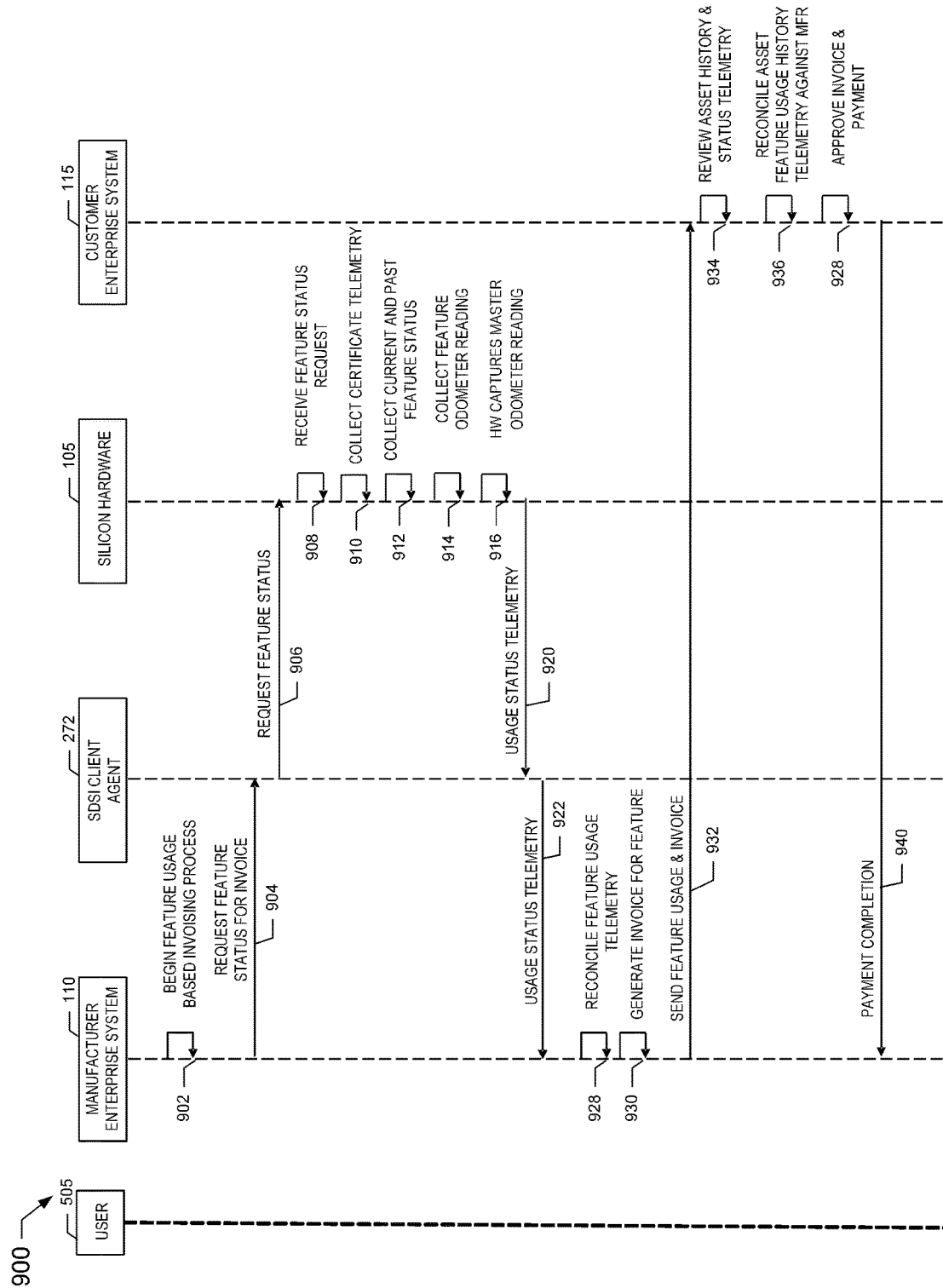
FIG. 9 illustrates an example process flow performed by the example systems of FIGS. 1 and/or 2 to provide manufacturer-initiated feature usage status and billing reconciliation.

An example process flow 900 performed by the example systems 100 and/or 200 of FIGS. 1-2 to provide manufacturer-initiated feature usage status and billing reconciliation is illustrated in FIG. 9. The process flow 900 of the illustrated example begins with the manufacturer enterprise system 110 beginning an invoicing process based on SDSi feature usage associated with the SDSi product 105 (line 902). The manufacturer enterprise system 110 then send a request for SDSi feature status of the SDSi product 105 (line 904). In the illustrated example, the feature status request is received by the SDSi client agent 272, which sends the request to the SDSi asset agent 140 of the SDSi product 105 (line 906). In response to the feature status request, the SDSi asset agent 140 invokes the analytics engine 206 to collect telemetry data, current and past feature status, and odometer readings (lines 908-916). The SDSi asset agent 140 the reports the SDSi feature status and telemetry to the manufacturer enterprise system 110 (lines 920-922). In the illustrated example, the manufacturer enterprise system 110 uses the SDSi feature status data and telemetry from the SDSi product 105 to perform feature usage status and billing, and sends an invoice to the customer enterprise system 115 (lines 928-932). The customer enterprise system 115 then reconciles the invoice against stored SDSI feature status and telemetry for the SDSi product 105, approves payment, and sends payment (or a payment completion record) to the manufacturer enterprise system 110 (lines 934-940).

Although the examples of FIGS. 1-9 are illustrated as including a single SDSi silicon product 105 (SDSi semiconductor device 105), a single manufacturer enterprise system 110 in associated with a single cloud platform 120, and a single customer enterprise system 115, SDSi frameworks and architectures as disclosed herein are not limited thereto. For example, any number(s) and/or type(s) of SDSi silicon products 105 (SDSi semiconductor devices 105) can be configured and managed in the example systems 100 and 200 described above. Additionally, or alternatively, any number of manufacturer enterprise systems 110 and/or cloud platforms 120 can be included in the systems 100 and 200 described above to manage respective SDSi silicon products 105 (SDSi semiconductor devices 105) manufactured by different silicon manufacturers. Additionally, or alternatively, any number of client enterprise systems 115 can be included in the systems 100 and 200 described above to manage SDSi silicon products 105 (SDSi semiconductor devices 105) purchased by different customers (e.g., OEMs). Also, in some examples, the client enterprise systems 115 can include multiple SDSi client agents 272. For example, the client enterprise systems 115 can configure different SDSi client agents 272 to manage different groups of one or more SDSi products 105.

Figure 10:
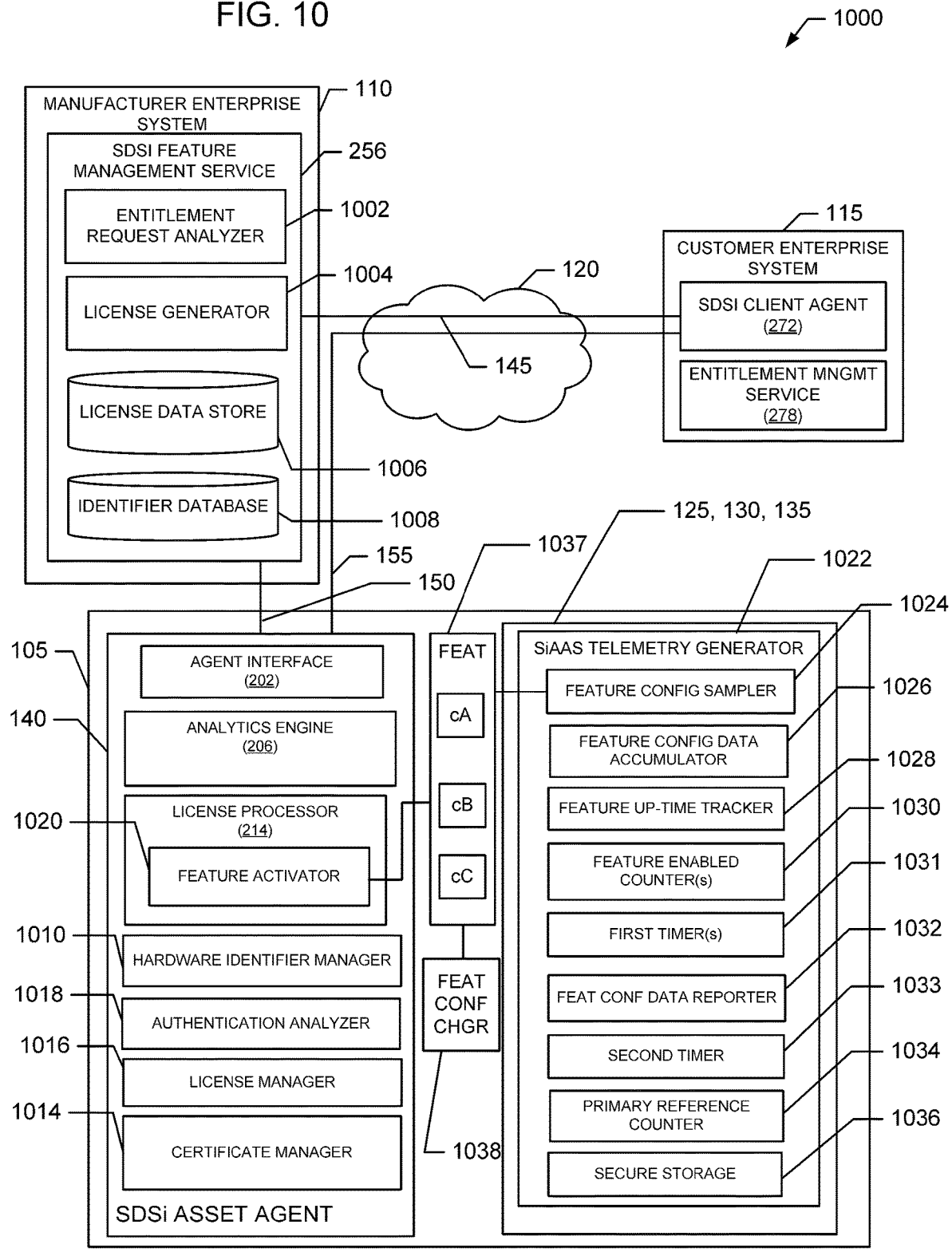
FIG. 10 is a block diagram of an example system to provide a silicon-as-a-service (SiAAS) using software-defined silicon in accordance with teachings of this disclosure.

Turning now to FIG. 10, FIG. 10 is a block diagram 1000 of an example system to provide silicon-as-a-service (SiAAS) in accordance with teachings of this disclosure. The block diagram 1000 of FIG. 10 includes the example SDSi semiconductor device 105, the example manufacturer enterprise system 110, the example customer enterprise system 115, the example cloud platform 120, the example SDSi asset agent 140, and the example connections 145, 150, and 155 of FIGS. 1 and 2.

In the illustrated example of FIG. 10, the example SDSi feature management service 256 of the example manufacturer enterprise system 110 includes an example entitlement request analyzer 1002, an example license generator 1004, an example license data store 1006, and an example identifier database 1008. Further, in the illustrated example of FIG. 10, the example SDSi asset agent 140 includes an example agent interface 202, an example hardware identifier manager 1010, and an example certificate manager 1014. In the illustrated example of FIG. 10, the example license processor 214 includes an example feature activator 1020.

The example entitlement request analyzer 1002 of the illustrated example of FIG. 10 processes entitlement requests to determine whether one or more license(s) should be granted for feature adjustments. As used herein, entitlement requests refer to requests to activate, deactivate, etc., SDSi features of an asset, such as the SDSi semiconductor device 105. In some examples, an entitlement refers to an authorization to activate, deactivate, etc., one or more SDSi features of an asset, and a license refers to data and/or other things that cause activation, deactivation, etc., on the asset of the one or more SDSi features for which an entitlement has been granted. For example, the entitlement request analyzer 1002 can process an entitlement request received from the customer enterprise system 115 via the cloud platform 120. If the entitlement request analyzer 1002 determines that the entitlement request should be granted, the entitlement request analyzer 1002 can cause the license generator 1004 to generate a license to communicate to the customer enterprise system 115. If the entitlement request analyzer 1002 determines that the entitlement request should not be granted (e.g., based on the entitlement request not adhering to an entitlement rule, based on a state of the asset, etc.), the entitlement request analyzer 1002 can communicate a rejection of the entitlement request to the customer enterprise system 115. In some examples, the entitlement request analyzer 1002 may communicate (e.g., directly, via the network, etc.) a response to the SDSi asset agent 140.

In some examples, in response to receiving an entitlement request, the entitlement request analyzer 1002 determines a state of the asset for which a feature entitlement is being requested. As used herein, a state refers to a set of features and/or capabilities of an asset. In some examples, the entitlement request analyzer 1002 determines a base state for the asset. As used herein, a base state is an initial configuration for the asset when it is received by a customer (e.g., when ownership was last transferred). For example, the customer enterprise system 115 can request an entitlement for a feature to be activated or deactivated on the SDSi semiconductor device 105. The entitlement request analyzer 1002, in response to receiving the entitlement request, can determine the identity of the semiconductor device associated with the request (the semiconductor device 105 in the illustrated example of FIG. 10), and retrieve a base state for the semiconductor device.

In some examples, the entitlement request analyzer 1002 determines the base state of the semiconductor device 105 based on base state information stored in the license data store 1006. In some examples, the entitlement request analyzer 1002 determines a customer identity associated with the entitlement request. For example, the entitlement request analyzer 1002 can determine the customer identity based on an address (e.g., an Internet Protocol (IP) address) associated with the entitlement request and/or based on a credential associated with the entitlement request. In some examples, the entitlement request analyzer 1002 can determine whether the customer making the entitlement request is different from a customer that made a prior entitlement request. In some examples, the entitlement request analyzer 1002 determines the identity of a customer making an entitlement request based on an authentication key (e.g., a cryptographic key). For example, the entitlement request may be signed with a public identification key that belongs to a specific customer. The entitlement request analyzer 1002 can determine the base state of the semiconductor device 105 by looking the base state up using the public key (e.g., in the license data store 1006).

In some examples, the entitlement request analyzer 1002 sets (e.g., updates, stores, etc.) the base state for the semiconductor device 105. The entitlement request analyzer 1002 can store the base state along with an identifier corresponding to the semiconductor device 105 in the license data store 1006 and/or any other storage location accessible to the entitlement request analyzer 1002. For example, in response to receiving an entitlement request from a customer different than the customer associated with the prior entitlement request for the semiconductor device 105, the entitlement request analyzer 1002 can determine that a transfer of ownership has occurred, and set the base state based on the currently active features of the semiconductor device 105. In some examples, the entitlement request analyzer 1002 sets the base state for the semiconductor device 105 based on a completion certificate. In some such examples, the completion certificate is received at the manufacturing enterprise system 110 after execution of a license. In some examples, the completion certificate is received at the entitlement request analyzer 1002 along with a new entitlement request. A completion certificate (also referred to herein as a status certificate and/or certificate of completion) indicates the current state of the semiconductor device 105, such as which features are active, and which licenses have been executed (e.g., to enable/disable features).

The entitlement request analyzer 1002 analyzes the entitlement request in view of one or more rules. For example, if the manufacturer wishes to avoid deactivation of already activated features by subsequent owners of the semiconductor device 105, the entitlement request analyzer 1002 can reject entitlement requests that request deactivation of features that were enabled in the most recent base state. In some examples, the entitlement request analyzer 1002 can determine whether a customer has paid a specific fee (e.g., a recurring subscription fee, a one-time fee) associated with access to a feature and thereby determine whether to issue a license for the feature. In some examples, the entitlement request analyzer 1002 may be able to approve entitlement requests for features based on other features which are enabled (e.g., as represented in the base state) and/or based on a customer status (e.g., a subscriber status, a customer level, etc.). For example, some features may be sub-features of others, indicating that entitlements for these features can be granted if the master feature with which they are associated is already activated in the base state. In some examples, in addition to or alternatively to communicating with the license generator 1004 to generate a license when an entitlement is approved, the entitlement request analyzer 1002 may communicate with other components of the manufacturer enterprise system 110 to cause other changes to occur when an entitlement is approved. For example, a financial charge may be scheduled to enable the manufacturer to receive a payment for the feature that is being activated in response to the entitlement request.

The example license generator 1004 of the illustrated example of FIG. 10 generates license corresponding to activation or deactivation of features on the semiconductor device 105. In some examples, the license generator 1004 communicates licenses via the cloud network 120 to the semiconductor device 105. In some examples, the license generator 1004 communicates licenses to the customer enterprise system 115 to thereafter be provided to the semiconductor device 105. In some examples, the license is passed via proxy entities corresponding to the source of the entitlement request. For example, if a first enterprise system sent an entitlement request to a second enterprise system which then forwarded it to the manufacturer, the license may similarly be traversed through the proxy (e.g., sent to the second enterprise system and then to the first enterprise system). In some such examples, the license generator 1004 can use asymmetric cryptography to sign the license such that only the intended recipient can execute the license and enable the features. For example, the license generator 1004 may encrypt the license with a public key provided with the entitlement request. In some such examples, the semiconductor device 105 then utilizes the private key to decrypt the license and allow execution of the license.

In some examples, the example license generator 1004 of the illustrated example of FIG. 10 appends one or more identifiers along with the license communicated to the semiconductor device 105 to ensure that the license is executed on the intended asset. For example, the license generator 1004 can access one or more hardware identifiers from the identifier database 1008. The identifiers may be hardware based (e.g., based on fuses of the semiconductor device 105, based on physical characteristics of the hardware of the semiconductor device 105, etc.) and/or entropy-based (e.g., based on a physically-unclonable function, based on ambient noise, based on quantum noise, etc.).

The example license data store 1006 of the illustrated example of FIG. 10 stores information corresponding to licenses that can be, or have been, issued to semiconductor devices or other silicon assets, such as the semiconductor device 105. In some examples, the license data store 1006 includes one or more logs including historical data regarding licenses that have been executed on semiconductor devices. For example, the license data store 1006 can list licenses that have been executed, features that are activated, the most recent and/or any prior base states, or any other information that can be utilized by the entitlement request analyzer 1002 and/or the license generator 1004 to make entitlement decisions and/or to generate licenses. In some examples, the license data store 1006 and/or the identifier database 1008 may be implemented as a single database. For example, the hardware identifiers and/or entropy-based identifiers can be stored in association with base state information, feature activation/deactivation information, rule information, and/or other information useful for making entitlement decisions and generating licenses. In some examples, the entitlement request analyzer 1002 updates the base state of the semiconductor device 105 upon detecting a change in ownership by updating the base state associated with an identifier of the semiconductor device 105 in the license data store 1006.

The example identifier database 1008 of the illustrated example of FIG. 10 stores identification information corresponding to semiconductor devices (such as the semiconductor device 105). In some examples, the identification information may be a hardware identifier (e.g., associated with a fuse or other physical component on the semiconductor device 105). In some examples, the identification information stored in the identifier database 1008 may include a serial number, a SKU number, and/or any other unique identifier of the semiconductor device 105. In some examples, the identifier database 1008 includes entropy-based hardware identifiers that are generated while the semiconductor device 105 is still possessed by the manufacturer enterprise system 110.

The example hardware identifier manager 1010 of the illustrated example of FIG. 10 stores and/or accesses a hardware identifier specific to the semiconductor device 105. For example, the hardware identifier manager 1010 may include one or more fuses which are unique to the semiconductor device 105. In some such examples, by reading values associated with the one or more fuses, a unique hardware identifier can be determined. In some examples, the hardware identifier manager 1010 determines the hardware identifier of the semiconductor device 105 based on one or more other physical aspects of the semiconductor device 105 (e.g., a characteristic of the circuitry, a physically unclonable function, internal CPU FLASH etc.). The hardware identifier manager 1010 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory, etc.). The hardware identifier manager 1010 can additionally or alternatively be implemented by one or more double data rate (DDR) memories, such as DDR, DD11, DD12, mobile DDR (mDDR), etc. The hardware identifier manager 1010 can additionally or alternatively be implemented by one or more mass storage devices such as hard disk drive(s), compact disk drive(s) digital versatile disk drive(s), etc. While, in the illustrated example, the hardware identifier manager 1010 is illustrated as a single database, the hardware identifier manager 1010 can be implemented by any number and/or type(s) of databases. Furthermore, the data stored in the hardware identifier manager 1010 can be in any data format such as, for example, binary data, comma delimited data, tab delimited data, structured query language (SQL) structures, etc.

The example certificate manager 1016 of the illustrated example of FIG. 10 stores and/or accesses completion certificates associated with execution of licenses by the license processor 214 of the semiconductor device 105, as described above. For example, the certificate manager may include data storage to store completion certificates generated by the license processor 214. In some examples, the certificate manager 1014 generates completion certificates in response to the license processor 214 executing a license. In some examples, the customer enterprise system 115 accesses certificates managed by the certificate manager 1014 to communicate the certificates to the manufacturer enterprise system 110. For example, the customer enterprise system 115 may communicate the latest completion certificate to the manufacturer enterprise system 110 to enable determination of the base state for the semiconductor device 105. Completion certificates may include features active on the semiconductor device 105, event logs pertaining to activation or deactivation of features on the semiconductor device 105, and/or usage logs pertaining to usage of features on the semiconductor device 105. In some examples, the feature activator 1020 generates completion certificates and communicates them to the certificate manager 1014.

The example license manager 1016 of the illustrated example of FIG. 10 accesses licenses to be executed on the semiconductor device 105. For example, the license manager 1016 can receive licenses provided by the license generator 1004 to the customer enterprise system 115. For example, the license manager 1016 can receive a license from the SDSi client agent 272 of the customer enterprise system 115, as described above. In some examples, the license manager 1016 includes storage to store a license for subsequent execution. In some examples, the license manager 1016 can determine whether a license is intended for execution on the semiconductor device 105 by comparing one or more identifiers associated with the license to one or more identifiers of the semiconductor device 105 (e.g., the hardware identifier managed by the hardware identifier manager 1010, an entropy-based identifier, etc.).

In some examples, the license manager 1016 can determine whether a license can be executed on the semiconductor device 105 based on a version number associated with the license. In some examples, the authentication analyzer 1018 of the illustrated example of FIG. 10 analyzes authentication information associated with licenses and/or authentication information communicated by the customer enterprise system 115.

The example feature activator 1020 of the illustrated example of FIG. 10 executes one or more license(s) and causes features to be activated and/or deactivated in accordance with the license(s). In some examples, the feature activator 1020 communicates features which have been activated and/or deactivated to the certificate manager 1014 enable generation of a completion certificate. In some examples, the feature activator 1020 generates a completion certificate and communicates the completion certificate to the certificate manager 1014. In some examples, the feature activator 1020 can deactivate features by changing them to an unusable mode or configuration.

Silicon-As-A-Service (SiAAS)

In some examples, an example SiAAS Telemetry Generator 1022 of FIG. 10 enables the usage of a silicon as a service (SiAAS) business model whereby the user/customer pays for usage of silicon embedded features/configurations as such resources are used (e.g., pay-as-you-go payment system). Thus, in addition to the activate/deactivate capabilities described above, the system described with respect to the block diagram of FIG. 10 allows users to use one or more silicon feature configurations and pay for the amount of time that the silicon feature configuration is used.

In some examples, the example SiAAS telemetry generator 1022 includes an example feature configuration sampler 1024, an example feature configuration data accumulator 1026, and example feature up-time tracker 1028, an example feature enabled counter(s) 1030, an example first timer 1031, an example feature configuration data reporter 1032, an example perpetual write/second timer 1033, an example primary reference counter 1034, and an example secure storage 1036. In some examples, the example feature configuration sampler 1024 of the example SiAAS telemetry generator 1022 can be implemented using, for example, microcontroller hardware/firmware, other trusted embedded software logic, etc. In some examples, the SiAAS is implemented using any of the example hardware circuitry 125 (FIG. 1), the example firmware 130 (FIG. 1), and/or the example BIOS 135 (FIG. 1). In some examples, the example silicon semiconductor device 105 includes an example feature 1037 and an example feature configuration changer 1038. The feature 1037 can be implemented on one or more of the example hardware circuitry 125, the example firmware 130, and/or the example BIOS 135. In some examples, the feature configuration changer 1038 can be implemented on one or more of the example SDSi asset agent 140, the example hardware circuitry 125, the example firmware 130, and/or the example BIOS 135. The feature configuration changer 138 operates to change a configuration of the feature 1037 as described further below.

The feature configuration sampler 1024 samples feature configuration(s) of the semiconductor device 105. In some examples, a single feature configuration (Feature A) is available, and, in some examples, multiple feature configurations are available (e.g., Feature A, Feature B, and/or Feature C). In some examples, the available feature configurations can be determined based on information provided by the example certificate manager 1014 and/or the example feature activator 1020. In some examples, the feature configuration sampler 1024 periodically samples the one or more feature configurations. In some examples, the sampled information is referred to as feature configuration data and can be used to determine whether any of the silicon feature configurations are in use at the time a sample is taken.

In some examples, the example feature configuration data accumulator 1026 accumulates the feature configuration usage data. The feature configuration data accumulator 1026 can accumulate data associated with usage of multiple feature configurations. In some examples, one or more example feature enabled counter(s) (FECs) 1030 are associated with respective, different feature configurations (e.g., configuration A, configuration B, configuration C, etc). In some examples, the FECs 1030 each include a counter having a value that is incremented each time a corresponding feature configuration, when sampled, is determined to be in use. In some examples, each different feature configuration can be sampled at different frequencies. In some examples, the number of samples during which the feature configuration is in use is stored in the example secure storage 1036. The feature configuration status can be described as having two states for the purposes of describing the SiAAS telemetry generator 1022. The first state refers to a feature configuration being "in use" or "up," and the second state refers to the feature configuration as being "not in use."

In some examples, the example first timer(s) 1031 is used to control when a corresponding feature configuration will be sampled. In some such examples, each feature configuration being metered has a corresponding first timer 1031. When the first timer expires, the feature configuration sampler determines whether the corresponding feature configuration is in use, and, if so, the value in the corresponding FEC 1030 is incremented. Otherwise, the value in the FEC 1030 is not incremented. Thus, when an FEC 1030 holds a value of 10, for example, the corresponding feature configuration was determined to be in use when 10 samples were taken.

In some examples, the example feature up-time tracker 1028 tracks a silicon up-time (e.g., an amount of time that a silicon feature configuration(s) is/are being used). In some examples, the feature up-time tracker 1028 uses the value stored in the example FEC 1030 to determine a percentage of time (relative to a duration of time determined using the primary reference counter 1034) that a silicon configuration feature is being used (e.g., is "up"). In some examples, the up-time for a feature configuration is determined in a same unit of time as is used by the example primary reference counter 1034 for all feature configurations that are being tracked. Thus, when the primary reference counter 1034 is configured to be incremented each time a minute has elapsed, then, after a duration of one hour, the primary reference counter 1034 will hold a value of 60. In some examples, during the same one hour duration, the feature configuration sampler 1024 samples the feature configuration every minute and the FEC 1030 is incremented when, at the time a sample is taken, the feature configuration is determined to be "up" (also referred to as "in use"). Then the feature up-time tracker 1028 can determine the percentage of time during which the feature configuration was "up" (during the one hour duration) by dividing the count value stored in the FEC 1030 by the count value stored in the primary reference counter 1034. When the division operation yields a value of 50% then the feature configuration was "up" for 50% of one hour (30 minutes).

In some examples, the primary reference counter 1034 can serve as a global counter for all of the feature configurations. In some examples, the feature configurations are sampled at different configurations such that the primary reference counter 1034 can be configured to serve as a local primary reference counter for each of the different feature configurations. In addition, the primary reference counter 1034 can be used to correlate the usage of each feature configuration.

In some examples, the example feature configuration data reporter 1032 reports some or all of the information generated by the example feature up-time tracker 1028, the example feature configuration sampler 1024, the example feature enabled counter(s) (FECs) 1030, the example feature configuration data accumulator 1026, and/or the example primary reference counter 1034, etc. In some examples, the information reported by the feature configuration data reporter 1032 is reported periodically or aperiodically or can instead be reported in response to a query. In some examples, the data reported by the feature configuration data reporter 1032 is extracted from the example secure storage 1036. The secure storage 1036 is used to store accumulated primary reference counter values and individual feature enabled counters (FEC) for various tracked features and tracked feature configurations in perpetuity, thus allowing ever-increasing counters that function as odometers and that cannot be decremented or tampered with to ensure that feature configuration usage tracking is always accurate. The secure storage is used to periodically save the accumulated reference counter values so that on a power-failure those values are not lost and upon restoration of power the pre-failure, stored values can be restored to the PRC and FEC counters and continue to be incremented based on the expiration of the first timer (the PRC) and based on the sampling of the state of the feature configuration Thus, the secure storage maintains the usage tracking over the life of the silicon asset. The data reported by the feature configuration data reporter 1032 can additionally include parameters such as feature configuration identifying information, sampling period information, etc. In some examples, determining an amount of usage time/active operating time over any duration of time as measured by the PRC can be determined by subtracting the FEC value at the beginning of the duration from the FEC value at the end of the duration. In addition, the length of the duration can be determined by subtracting the PRC value at the beginning of the duration from the PRC value at the end of the duration. In some examples, the difference between the FEC values can be divided by the difference between the PRC values to obtain a percentage of the duration during which the feature configuration was in use/operating/active.

In some examples, the secure storage 1036 is implemented using a trusted execution environment (TEE) or is the date stored therein is encrypted such that data in the software storage cannot be altered by customer software or other logic. Further, although the SiAAS telemetry generator of FIG. 10 is illustrated as residing on/within the silicon semiconductor device 105 of FIG. 10, the SiAAS telemetry generator can be implemented in hardware, firmware within hardware and/or firmware within a system (e.g., a baseboard management controller (BMC), etc.) or software.

Referring also to FIG. 9, in some examples, the data reported by the feature configuration data reporter 1032 can be implemented using, for example, a variant of some of the operations illustrated in FIG. 9. For example, the "receive feature status request" 908 received at the semiconductor device 105 may include a request for feature configurations up-time data. In addition, the "collect current, and past feature status" operation 912 can include collecting feature configurations up-time data and/or any of the data stored in the secure storage 1036. Likewise, the "collect feature odometer reading" operation 914 can be interpreted to collect values held in the example FECs 1030. Additionally, the operation to "capture a master odometer reading" 916 can be interpreted to capture a value held in the example primary reference counter 1034. In some examples, the master odometer described in previous figures is implemented with the primary reference counter.

Figure 11:
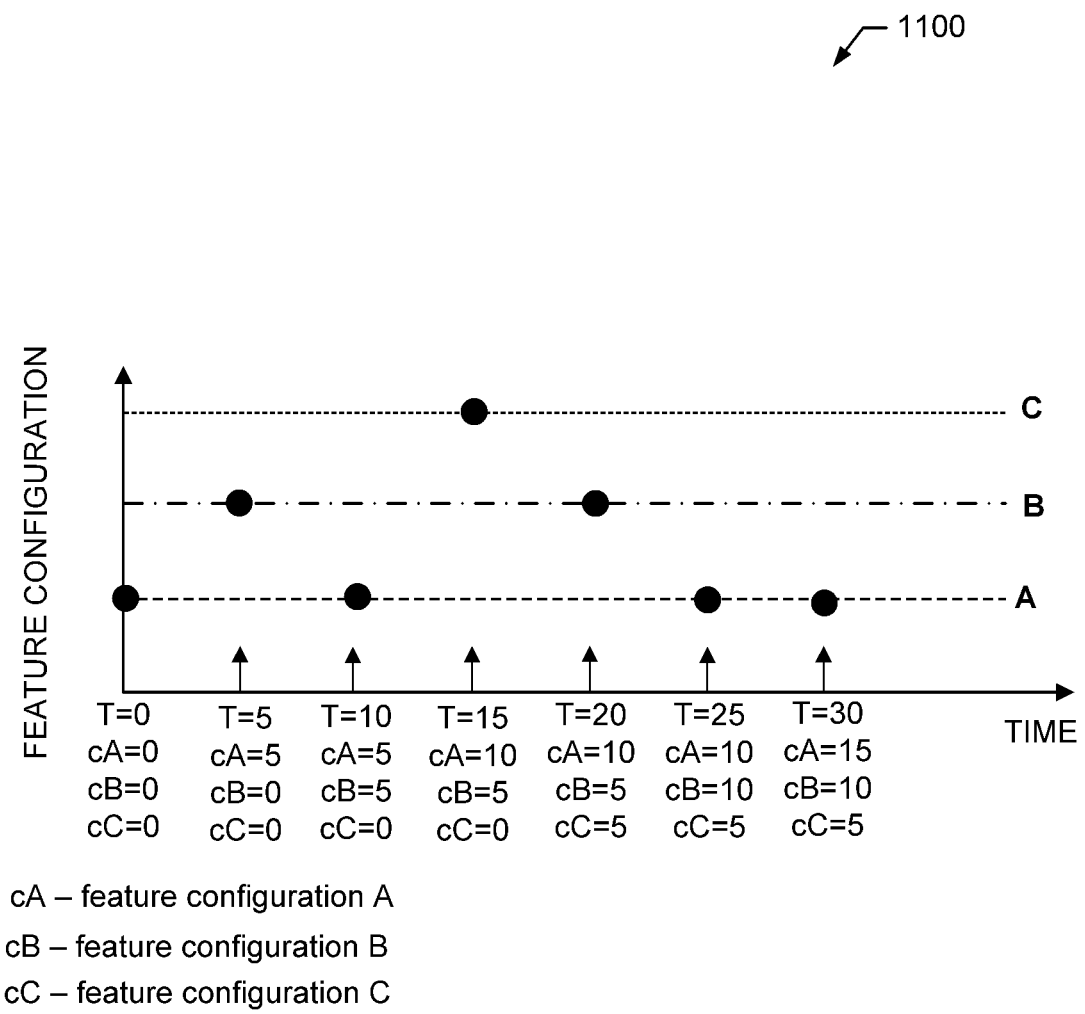
FIG. 11 is a graph illustrating metered feature configuration data for three different feature configurations.

FIG. 11 is a table 1100 illustrating example data generated by the example SiAAS Telemetry Generator 1022 of FIG. 10. The table 1100 includes data collected at times, T=0, T=5, T=10, T=15, T=20, T=25, and T=30. In the table 1100, the times at which data is collected correspond to times sampled from the primary reference counter 1034. As illustrated, there are datapoints collected for a feature having three different configurations, A, B and C (represented as cA, cB, cC). In some examples, the feature can be a CPU core count and the configurations can include a first configuration in which two cores are active (being used/in operation), a second configuration in which four cores are active (being used/in operation) and a third configuration in which eight cores are active (being used/in operation). In some examples, the feature can be a CPU base frequency and a first configuration can be 1.8 GHz, a second configuration can be 2 GHz, and a third configuration can be 2.2 GHz.

In the table 1100, the feature configurations cA, cB, and cC are each represented by one of the dotted and/or dashed lines beside which the corresponding configuration letter appears. Although, three configurations are represented in the table 1100, data can also (or instead) be collected for more or fewer configurations depending on the availability of such feature configurations on the semiconductor device 105 being metered. In the example table 1100, at each sampling time at which a feature configurations is detected as being used, a dot appears on the line representing the corresponding feature configuration at the corresponding sampling time.

In the example data illustrated in table 1100, the sampling unit (e.g., the time between samples taken by the feature configuration sampler 1024) is equal to 1 minute such that the FECs corresponding to feature configuration A, feature configuration B, and feature configuration C, sample the operational state of each of the respective feature configurations at 1 minute intervals. In some examples, the primary reference counter is incremented at a selected interval. In some examples, the primary reference counter is incremented at intervals equal to the sampling intervals for the feature configurations (e.g., the FECs).

In the illustrated example, the feature, at the time T=0, is configured in the feature configuration A (cA). As a result, the table 1100 shows a dot (data point) appearing the time T=0 on the line representing the feature configuration A, cA. The dot indicates that the feature configuration A (cA) was detected as being used at first sampling time (T=0). The feature configuration A (cA) is not usage at time T=5, is in usage at T=10, is not in usage at T=15 nor at T=20 and then is in usage at time T=25 and at time=30. Thus, the feature configuration A (cA) is assumed to have been in use for the duration between T=0 and T=5 and for the duration between T=25 and T=30. As a result, the feature configuration A (cA) has been in use for at least 5 minutes+5 minutes+five minutes for a total of 15 minutes. Thus, of the thirty minute duration the feature configuration A (cA) was in use 50% of the time.

In the example data of table 1100, the feature configuration B (cB) detected as being is used between the sample times, T=5 and T=20 and is not use at the remaining sampling times. As a result, the feature configuration B (cB) has been in use for 5 minutes+5 minutes for a total of 10 minutes. Thus, of the thirty minute duration, the feature configuration B (cB) is in use for 10 minutes which is ⅓rd of the 30 minute duration.

In the example data of table 1100, the feature configuration C (cC) is not detected as being in use until the time T=15 and is not being used at the time T=20, T=25 and T=30. Thus, the feature configuration C (cC) has been in use for at 5 minutes out of a total of 30 minutes which is ⅙th of the 30 minute duration.

By tracking and metering the usage of each of the configurations (e.g., feature configuration A, feature configuration B and feature configuration C), with respect to the primary reference counter, a per feature configuration odometer is created and can be used to track usage between any two samples/snapshots in time. This data, in turn, can be used to deploy multiple solutions and satisfy multiple needs including, pay as you go billing and business models, analytics, Artificial Intelligence (AI) based predictive feature configuration changes to optimize the performance of the system, etc. In some examples, AI analyze the data to determine usage patterns. For examples, the AI analysis could determine that a combination of FEC/PRC counter values (at any point in time) indicates a specific usage pattern. Further, the specific usage pattern may indicate a need to change a configuration of another feature or features (e.g. to a feature configuration that has more or less resources) so as to optimize the overall system usage. For example, if a variable number of cores is a feature, a first configuration of the feature can be the usage two cores, and a second configuration of the feature can be the usage of four cores, etc. In such an example, CPU utilization can be tracked as percentage of total CPU processing capacity. Assuming the first feature configuration is being used, and that the utilization meter indicates that the two cores are consistently experiencing 100% utilization over a duration of time/period, then a first configuration having two operable cores may be insufficient to perform the workload demand. In some such examples, and provided that a higher core count configuration is available, a switch to the higher core count configuration can be recommended/prescribed or can be configured occur automatically.

Figure 12:
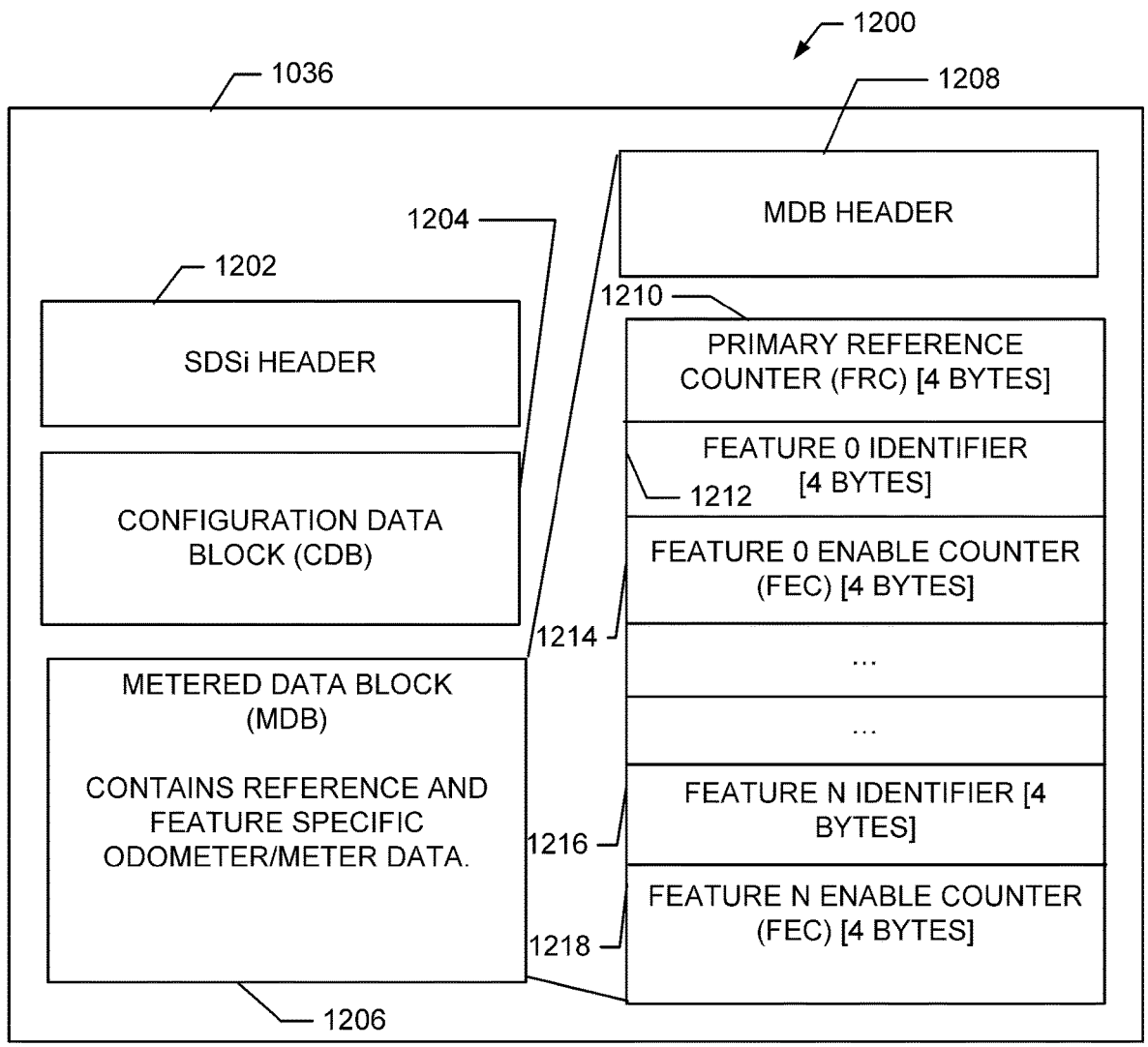
FIG. 12 is an example layout/format in which the metered configuration data can be organized for storage and/or reporting needs.

FIG. 12 is an example format/layout in which the sampled data (e.g., the tracking data) may be stored in the secure storage 1036 of FIG. 10, in accordance with the teachings of this disclosure. In some examples, an example SDSi header 1202 identifies a header identifying an SDSi. An example configuration data block (CDB) 1204 follows the SDSi header and includes information identifying activated features in the silicon. As used with respect to FIG. 10, an activated feature is not necessarily being used. An example metered data block (MDB) contains primary reference counter readings (PRC) and feature-specific counter readings (e.g., FEC data) that may or may not be tied to activated feature(s) in the configuration data block. In some examples, the MDB block 1206 includes an example MDB header 1208 in addition to an example primary reference counter 1210 of four bytes. An example feature 0 identifier field 1212 and an example feature 0 enable counter (FEC) 1214 field identify an arbitrary first feature configuration to be metered, and a corresponding feature enable counter (FEC) value, respectively. A number "N" of feature configuration identifiers 1216 and FEC fields 1218 follow wherein N is equal to a total number of features and feature configurations associated with each feature for which configuration data is being metered. In some examples, there may not be any configuration data block (CDB) 1204 present in the secure storage. In some examples, the SDSi header may not be present and the location of the data in secure storage may identify the data as SDSi data.

While example manners of implementing the systems 100 and 200 are illustrated in FIGS. 1-9, one or more of the elements, processes and/or devices illustrated in FIGS. 1-9 may be combined, divided, re-arranged, omitted, eliminated and/or implemented in any other way. Further, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276, the example entitlement management service 278 and/or, more generally, the systems 100 and/or 200 of FIGS. 1-9 may be implemented by hardware, software, firmware and/or any combination of hardware, software and/or firmware. Thus, for example, any of the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276, the example entitlement management service 278 and/or, more generally, the systems 100 and/or 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example systems 100 and/or 200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276 and/or the example entitlement management service 278 is/are hereby expressly defined to include a non-transitory computer readable storage device or storage disk such as a memory, a digital versatile disk (DVD), a compact disk (CD), a Blu-ray disk, etc. including the software and/or firmware. Further still, the example systems 100 and/or 200 may include one or more elements, processes and/or devices in addition to, or instead of, those illustrated in FIGS. 1-9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While example manners of implementing the systems 100 and 200 (denoted as 1000 in FIG. 10) are also illustrated in FIG. 10, one or more of the elements, processes and/or devices illustrated in FIG. 10 may be combined, divided, re-arranged, omitted, eliminated and/or implemented in any other way. Further, the example silicon product 105 (e.g., the example semiconductor device 105), the example manufacturer enterprise system 110, the example customer enterprise system 115, the example cloud platform 120, the example SDSi asset agent 140, the example agent interface 202, the example analytics engine 206, the example license processor 214, the example SDSi feature management service 256, the example SDSi client agent 272, the example entitlement management service 278, The example entitlement request analyzer 1002, the example license generator 1004, the example license data store 1006, the example identifier database 1008, the example hardware identifier manager 1010, the example certificate manager 1014, the example license manager 1016, the example authentication analyzer 1018, the example feature activator 1020, the example SiAAS telemetry generator 1022, the example feature configuration sampler 1024, the example feature configuration data accumulator 1026, the example feature up-time tracker 1028, the example feature enabled counter(s) 1030, the example first timer(s) 1031, the example feature configuration data reporter 1032, the example second timer 1033, the example primary reference counter 1034, the example secure storage 1036 and/or, more generally, the system 1000 of FIG. 10 may be implemented by hardware, software, firmware and/or any combination of hardware, software and/or firmware. Thus, for example, any of the example silicon product 105 (e.g., the example semiconductor device 105), the example manufacturer enterprise system 110, the example customer enterprise system 115, the example cloud platform 120, the example SDSi asset agent 140, the example agent interface 202, the example analytics engine 206, the example license processor 214, the example SDSi feature management service 256, the example SDSi client agent 272, the example entitlement management service 278, The example entitlement request analyzer 1002, the example license generator 1004, the example license data store 1006, the example identifier database 1008, the example hardware identifier manager 1010, the example certificate manager 1014, the example license manager 1016, the example authentication analyzer 1018, the example feature activator 1020, the example SiAAS telemetry generator 1022, the example feature configuration sampler 1024, the example feature configuration data accumulator 1026, the example feature up-time tracker 1028, the example feature enabled counter(s) 1030, the example first timer(s) 1031, the example feature configuration data reporter 1032, the example second timer 1033, the example primary reference counter 1034, the example secure storage 1036 and/or, more generally, the system 1000 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, the example system 1000, the example silicon product 105 (e.g., the example semiconductor device 105), the example manufacturer enterprise system 110, the example customer enterprise system 115, the example cloud platform 120, the example SDSi asset agent 140, the example agent interface 202, the example analytics engine 206, the example license processor 214, the example SDSi feature management service 256, the example SDSi client agent 272, the example entitlement management service 278, The example entitlement request analyzer 1002, the example license generator 1004, the example license data store 1006, the example identifier database 1008, the example hardware identifier manager 1010, the example certificate manager 1014, the example license manager 1016, the example authentication analyzer 1018, the example feature activator 1020, the example SiAAS telemetry generator 1022, the example feature configuration sampler 1024, the example feature configuration data accumulator 1026, the example feature up-time tracker 1028, the example feature enabled counter(s) 1030, the example first timer(s) 1031, the example feature configuration data reporter 1032, the example second timer 1033, the example primary reference counter 1034, and/or the example secure storage 1036 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system 1000 may include one or more elements, processes and/or devices in addition to, or instead of, those illustrated in FIG. 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowchart Introduction

Flowcharts representative of example hardware logic, machine readable instructions, hardware implemented state machines, and/or any combination thereof for implementing the example systems 100 and/or 200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276 and/or the example entitlement management service 278 are shown in FIGS. 16-19. In these examples, the machine readable instructions may be one or more executable programs or portion(s) of an executable program for execution by a computer processor, such as the processors 2012, 2112, and/or 2212 shown in the example processor platforms 2000, 2100 and/or 2200 discussed below in connection with FIGS. 20-22. The one or more programs, or portion(s)

thereof, may be embodied in software stored on a non-transitory computer readable storage medium such as a CD-ROM, a floppy disk, a hard drive, a DVD, a Blu-ray Disk™, or a memory associated with the processors 2012, 2112 and/or 2212, but the entire program or programs and/or parts thereof could alternatively be executed by a device other than the processor 2012, 2212, and/or 2312 and/or embodied in firmware or dedicated hardware. Further, although the example program(s) is(are) described with reference to the flowcharts illustrated in FIGS. 16-18, many other methods of implementing the example systems 100 and/or 200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276 and/or the example entitlement management service 278 may alternatively be used. For example, with reference to the flowcharts illustrated in FIGS. 16-18, the order of execution of the blocks may be changed, and/or some of the blocks described may be changed, eliminated, combined and/or subdivided into multiple blocks. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Flowcharts representative of example hardware logic, machine readable instructions, hardware implemented state machines, and/or any combination thereof for implementing the example silicon product 105 (e.g., the example semiconductor device 105), the example manufacturer enterprise system 110, the example customer enterprise system 115, the example cloud platform 120, the example SDSi asset agent 140, the example agent interface 202, the example analytics engine 206, the example license processor 214, the example SDSi feature management service 256, the example SDSi client agent 272, the example entitlement management service 278, The example entitlement request analyzer 1002, the example license generator 1004, the example license data store 1006, the example identifier database 1008, the example hardware identifier manager 1010, the example certificate manager 1014, the example license manager 1016, the example authentication analyzer 1018, the example feature activator 1020, the example SiAAS telemetry generator 1022, the example feature configuration sampler 1024, the example feature configuration data accumulator 1026, the example feature up-time tracker 1028, the example feature enabled counter(s) 1030, the example first timer(s) 1031, the example feature configuration data reporter 1032, the example second timer 1033, the example primary reference counter 1034, the example secure storage 1036 and/or more generally the example system 1000 of FIG. 10 are shown in FIGS. 13-15, and 19. The machine readable instructions may be one or more executable programs or portion(s) of an executable program for execution by a computer processor such as the processor 2312 shown in the example processor platform 2300 discussed below in connection with FIG. 23. The program may be embodied in software stored on a non-transitory computer readable storage medium such as a CD-ROM, a floppy disk, a hard drive, a DVD, a Blu-ray disk, or a memory associated with the processor 2312, but the entire program and/or parts thereof could alternatively be executed by a device other than the processor 2312 and/or embodied in firmware or dedicated hardware. Further, although the example program is described with reference to the flowcharts illustrated in FIGS. 13-15, and 19 many other methods of implementing the example system 1000 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, baseboard management controller firmware and/or Operating System software, and/or operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machines. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 13-19, may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 13:
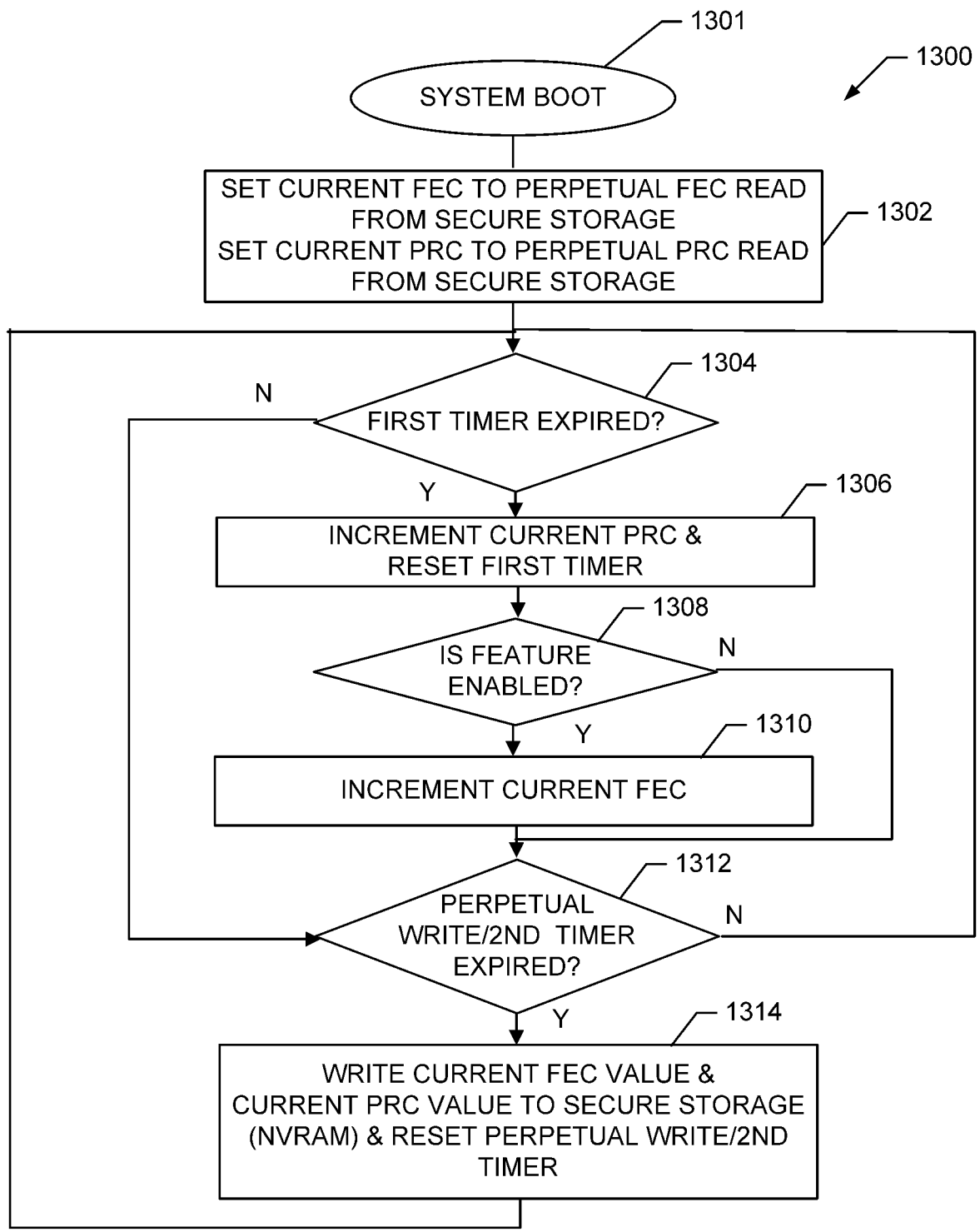
FIG. 13 is a flowchart representative of example computer readable instructions that may be executed to implement the example SiAAS telemetry generator of FIG. 10.

An example program 1300 is illustrated in FIG. 13. In some examples, the program 1300 may be executed to implement the example SiAAS telemetry generator 1024 of the example SDSi asset agent 140 (FIGS. 1, 2, 10) of the example systems 100, 200 and/or 1000 (FIGS. 1, 2, 10). The example program 1300 may be executed at predetermined intervals, based on an occurrence of a predetermined event, etc., or any combination thereof. With reference to the preceding figures and associated written descriptions, the example program 1300 manages the operation of the example FEC 1030 (FIG. 10) and the example PRC 1034 (FIG. 10) and further manages the recording of the values of each such counters 1030, 1034. In some examples, FIG. 13 begins execution at block 1301 at which a microprocessor system that includes the silicon 105 performs a system boot. In response to the system boot, the feature enabled counter (FEC) 1030 (FIG. 10) obtains/reads a perpetual FEC value stored in the secure storage 1036 and sets a variable "current FEC" equal to the perpetual FEC value (block 1302). In some examples, the "current FEC" variable denotes a current value of the FEC 1030. In some examples, the value of the "current FEC" variable, after being obtained, is loaded into the FEC 1030. Likewise, the example primary reference counter (PRC) 1034 (FIG. 10) obtains/reads a perpetual primary reference counter value from the secure storage 1036 and sets a variable "current PRC" equal to the perpetual PRC value (also at block 1302). In some examples, the current PRC "variable" denotes the current value of the PRC 1034. In some examples, the value of the "current PRC" variable is loaded into the PRC 1034. In some examples, any of the components of the example SiAAS telemetry generator 1022 can be used to cause the counter values to be read/collected from the example secure storage 1036, and loaded into the counters (PRC 1034, FEC 1030).

In some examples, the example feature configuration sampler 1024 determines whether the example first timer (FIG. 10) 1031 has expired (block 1304). The first timer 1031 is set to expire after a unit of time corresponding to a sampling interval of the feature configuration being metered. In some examples, the first timer 1031 is set to expire at the sampling interval by the feature configuration sampler 1024 upon bootup. The feature configuration sampler 1024 can obtain the sampling interval from the secure storage upon boot-up, can be programmed with the sampling interval at a time of configuration, etc. In some examples, when the first timer 1031 has expired, the example feature configuration sampler 1024 or the example feature up-time tracker 1028 causes the value of the "current PRC" variable stored in the PRC 1034 to be incremented (block 1306). In addition, the feature configuration sampler 1024 causes the first timer 1031 to be reset to the sampling interval of the feature configuration currently being metered/monitored/sampled (also block 1306).

In some examples, the example feature configuration sampler 1024, determines whether a feature configuration currently being metered is in use (block 1308). In some examples, the feature configuration sampler 1024 can make this determination by monitoring activity on the silicon 105, if any, that corresponds to the silicon feature configuration currently being metered/monitored. Monitoring/metering of the silicon feature configuration is also referred to herein as sampling to determine whether the current feature configuration is being used. In some examples, when the feature configuration currently being monitored is determined to be in use (e.g., enabled), the feature configuration sampler 1024 or the example feature up-time tracker 1028 causes the value of the FEC variable in the FEC 1030 to be incremented (block 1310). In some examples, the feature configuration data accumulator 1026 collects data corresponding to the metering of the feature configuration from any or all of the FEC 1030, the PRC 1034, the feature configuration sampler 1024, the secure storage 1036, etc. In some examples, the feature configuration data accumulator 1026 places the collected data into a format such as that disclosed with respect to FIGS. 11 and/or 12. In some examples, when multiple feature configurations are being monitored, the feature configuration data accumulator 1026 associates the identity of the feature configuration being metered/monitored with the metering/monitoring data of the respective feature configuration.

In some examples, after the value stored in the FEC 1030 is incremented, the feature configuration sampler 1024 determines whether the second timer has expired (block 1312). In some examples, the second timer 1033 notifies the example feature configuration sampler 1024 when the second timer 1033 has expired. The second timer 1034 is programmed/configured to expire after a perpetual write interval has elapsed. In some examples, the second timer is set to expire after any desired period of time. In some examples, the second timer is set to expire at twenty four hours.

When the perpetual write timer/second timer 1034 has expired, the example FEC 1030 and PRC 1034 (or any of the components of the example SiAAS telemetry generator 1022) cause the current FEC value and the current PRC value to be written to the secure storage 1036 (e.g., NVRAM, TEE, protected storage, etc.) (block 1314). In some examples, the example feature up-time tracker 1028 determines the ratio of the FEC value to the PRC value to identify a percentage of time during which the feature configuration was in use. In some examples, the perpetual write timer/second timer 1034 is also reset to zero (also block 1314). In some examples, the feature up-time tracker 1028 causes the up-time to be recorded in the secure storage 1036. Thereafter, the program 1300 proceeds to again perform the operations disclosed with respect to blocks 1304, 1306, 1308, 1310, 1312 and 1314. In some examples, the feature up-time tracker 1028 determines an amount of up-time of the feature configuration (e.g., a percentage of time during which the feature configuration was in use) during an interval of time by subtracting an FEC value from the beginning of the interval of time from an FEC value at the end of the interval and also subtracting a PRC value from the beginning of the interval of time from a PRC value at the end of the interval of time. The difference between the FEC values represents the total amount of usage time and the difference between the PRC values represents a duration during which the usage time occurred. In some examples, the usage time can be represented as a percentage of the duration by dividing the difference between the FEC values by the difference between the PRC values.

In some examples, when the (at block 1304), the example first timer 1031 has not expired, the program 1300 proceeds to block 1312 at which the feature configuration sampler 1024 again determines whether the perpetual write/second timer 1033 has expired. If so, the operations at block 1314 and thereafter (as disclosed above) are again performed. In some examples, when the feature configuration sampler 1024 determines that the feature configuration is not enabled (e.g., being used) (block 1308), the value of the FEC 1030 is not incremented (e.g., the block 1310 is bypassed) and the program proceeds to the block 1312 and the blocks subsequent thereto. Not incrementing the value of the FEC 1030 for the sampling interval ending with the expiration of the first timer 1031 ensures, for example, that the sampling interval will not be counted when determining a total duration of time in which the feature configuration was in use.

When the example perpetual write timer has not expired (block 1312), the feature configuration sampler 1024 again determines whether the first timer 1031 has expired (block 1304) and proceeds to perform the operations described with respect to the blocks 1304, 1306, 1308 1310 and 1314 as disclosed above. Thereafter, the SiAAS telemetry generator 1022 can continue to meter/monitor the usage of one or more feature configurations in this manner until the system is shut down and/or the feature configuration is inactivated.

Figure 14:
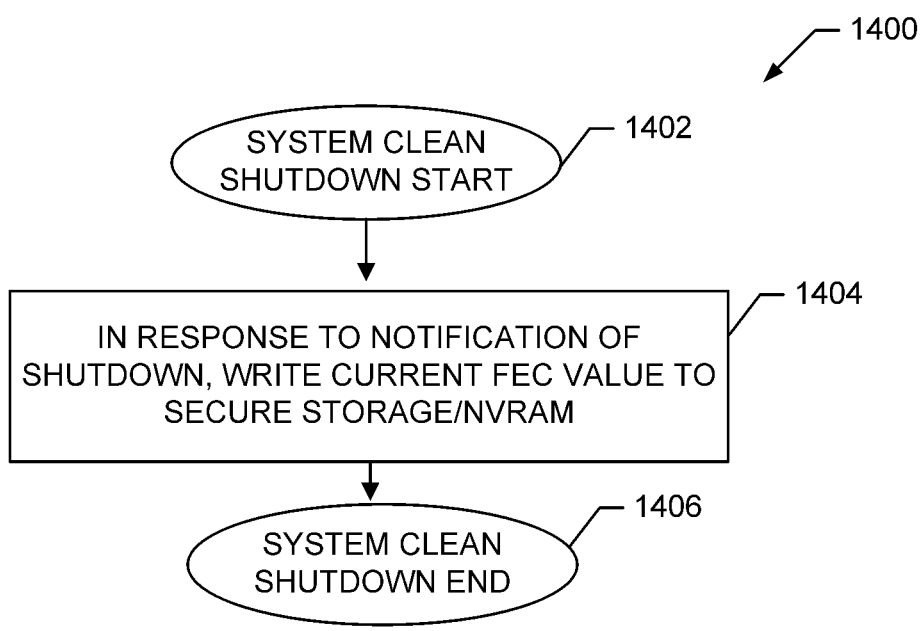
FIG. 14 is a flowchart representative of example computer readable instructions that may be executed to implement the example SiAAS telemetry generator of FIG. 10.

An example program 1400 that may be executed to implement at least a portion of the SiAAS telemetry generator 1022 of the SDSi asset agent 140 of FIG. 10 is illustrated in FIG. 14. The example program 1400 may be executed at predetermined intervals, based on an occurrence of a predetermined event, etc., or any combination thereof. With reference to the preceding figures and associated written descriptions, the example program 1400 of FIG. 14 begins execution at block 1402 at which a system clean shut down is to be performed. In response to a notification that the shutdown is to occur, the FEC 1030 and/or the feature configuration sampler 1024 causes the current FEC value held in the FEC 1030 to be written to the secure storage 1036 (block 1404). After the FEC value has been written the system clean shutdown ends (block 1406).

Figure 15:
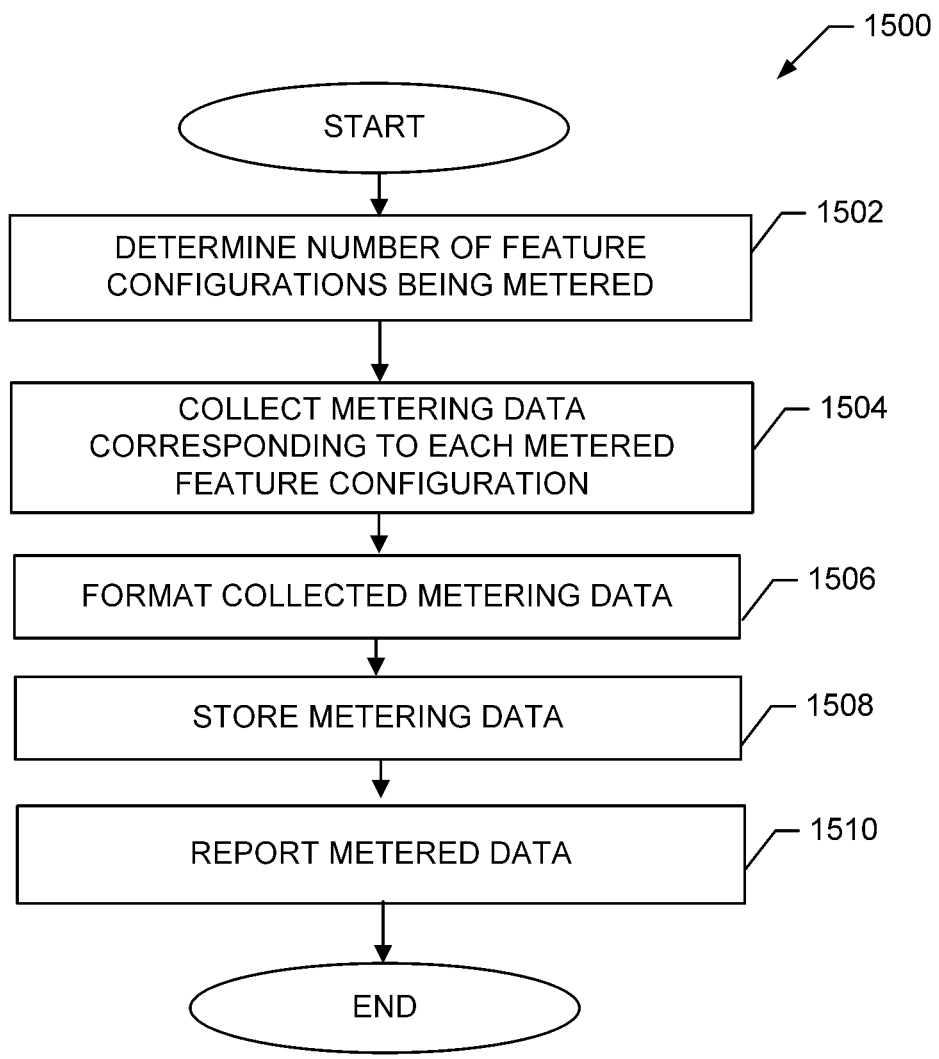
FIG. 15 is a flowchart representative of example computer readable instructions that may be executed to implement the example SiAAS telemetry generator of FIG. 10.

An example program 1500 that may be executed to implement at least the example feature configuration data accumulator 1026 and the example feature configuration data reporter 1032 of the example SiAAS 1022 of FIG. 10 is illustrated in FIG. 15. The example program 1500 may be executed at predetermined intervals, based on an occurrence of a predetermined event, etc., or any combination thereof. In some examples, the example program 1500 operates during, before or after the feature configuration metering program 13 of FIG. 13. With reference to the preceding figures and associated written descriptions, the example program 1500 of FIG. 15 begins execution at block 1502 at which the example feature configuration data accumulator 1026 determines a number of feature configurations being metered. In some examples, the number of feature configurations being metered can be determined based on a number of FECs 1030 (FIG. 10) that have been configured and/or are in use. In some examples, the number of feature configurations being metered can be determined based on the feature configuration sampler 1024, in some examples, the number of feature configurations being metered can be determined based on a number of first timers being deployed for sampling management. The feature configuration data accumulator 1026 collects metering data corresponding to each metered feature configuration (block 1504). In some examples, the feature configuration data accumulator 1026 can collect data from the FECs 1030 for each metered feature configuration and from the PRC 1034. In some examples, the feature configuration data accumulator 1026 collects the metering data from the secure storage 1036 (FIG. 10). The feature configuration data accumulator 1026 and/or the feature configuration data reporter 1032 formats the data in an example format such as, but not limited to, the format illustrated in FIG. 12 (block 1506). The formatted metering data is stored in the secure storage 1036 (block 1508) after being formatted and is reported to the manufacturer enterprise system 110 (FIG. 1, FIG. 2, FIG. 10) (block 1510). In some examples, the feature configuration data reporter 1032 can report the data to the manufacturer enterprise system 110 periodically, aperiodically, or in response to a request from the manufacturer enterprise system 110. Thereafter the program 1500 ends and can repeated as often as necessary or requested.

Figure 16:
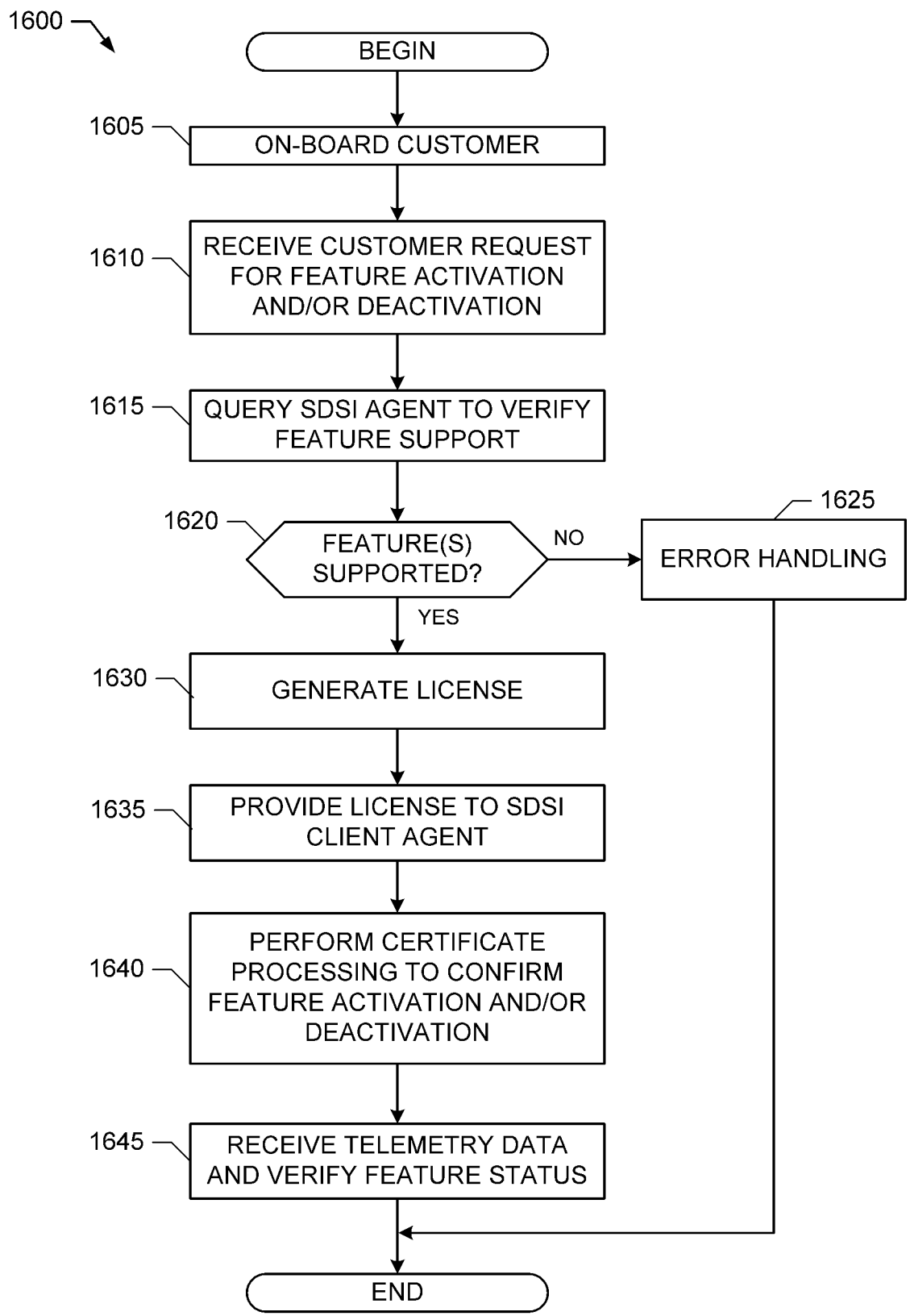
FIG. 16 is a flowchart representative of example computer readable instructions that may be executed to implement the example manufacturer enterprise system of FIGS. 1 and/or 2.

An example program 1600 that may be executed to implement the example manufacturer enterprise system 110 of the example systems 100 and/or 200 of FIGS. 1-2 is illustrated in FIG. 16. The example program 1600 may be executed at predetermined intervals, based on an occurrence of a predetermined event, etc., or any combination thereof. With reference to the preceding figures and associated written descriptions, the example program 1600 of FIG. 16 begins execution at block 1605 at which the customer management service 254 of the manufacturer enterprise system 110 on-boards a customer for access to SDSi capabilities offered by the manufacturer of the SDSi product 105, as described above. For example, the customer management service 254 can exchange information with the customer enterprise system 115 of the customer to on-board the customer prior to or after the customer's purchase of the SDSi product 105.

At block 1610, the SDSi portal 262 of the manufacturer enterprise system 110 receives a request to activate (or deactivate) an SDSi feature of the SDSi product 105, as described above. In the illustrated example, the request is forwarded to the SDSi feature management service 256, which identifies the SDSi product 105 associated with the request and determines whether the request is valid. Assuming the request is valid, at block 1615, the SDSi feature management service 256 initiates a query to determine whether the SDSi feature to be activated (or deactivated) is supported by the SDSi product 105. In some examples, the SDSi feature management service 256 invokes the SDSi agent management interface 264 of the manufacturer enterprise system 110 to send the query directly to the SDSi product 105, as described above, thereby directly querying the SDSi product 105. In some examples, the SDSi feature management service 256 sends the query to the SDSi client agent 272 of the client enterprise system 115, which then sends the query to the SDSi product 105, as described above, thereby indirectly querying the SDSi product 105. In some examples, the SDSi agent management interface 264 queries one or more database and/or other data structure(s) maintained by the manufacturer enterprise system 110 to determine whether the SDSi product 105 supports the SDSi feature to be activated (or deactivated), as described above.

If the requested SDSi feature is not supported by the SDSi product 105 (block 1620), at block 1625 the manufacturer enterprise system 110 performs error handling and denies the request, such as by sending an appropriate communication via the SDSi portal 262 to the customer enterprise system 115. However, if the requested SDSi feature is supported by the SDSi product 105 (block 1620), at block 1630 the SDSi feature management service 256 of the manufacturer enterprise system 110 generates a license to activate (or deactivate) the SDSi feature in response to the customer's request, as described above. At block 1635, the SDSi feature management service 256 causes the license to be sent via the SDSi portal 262 to the SDSi client agent 272 of the customer enterprise system 115, as described above.

Sometime later, at block 1640, the manufacturer enterprise system 110 receives, as described above, a certificate reported by the SDSi product 105 to confirm activation (or deactivation) of the requested SDSi feature, which is processed by the SDSi feature management service 256. In some examples, the certificate is received directly from the SDSi product 105 by the SDSi agent management interface 264 of the manufacturer enterprise system 110. In some examples, the certificate is received indirectly, such as from the SDSi client agent 272 of the client enterprise system 115, which received the certificate form the SDSi product 105. At block 1640, the SDSi feature management service 256 of the manufacturer enterprise system 110 processes the received certificate, as described above, to confirm successful activation (or deactivation) of the requested SDSi feature, and invokes the customer management service 254 to reconcile billing, generate an invoice, etc., which contacts the customer enterprise system 115 accordingly. Thereafter, at block 1645, the SDSi feature management service 256 of the manufacturer enterprise system 110 receives telemetry data reported by the SDSi product 105 (e.g., in one or more certificates), as described above, which is processed at the manufacturer enterprise system 110 to confirm proper operation of the SDSi product 105, reconcile billing, generate further invoice(s), etc.

Figure 17:
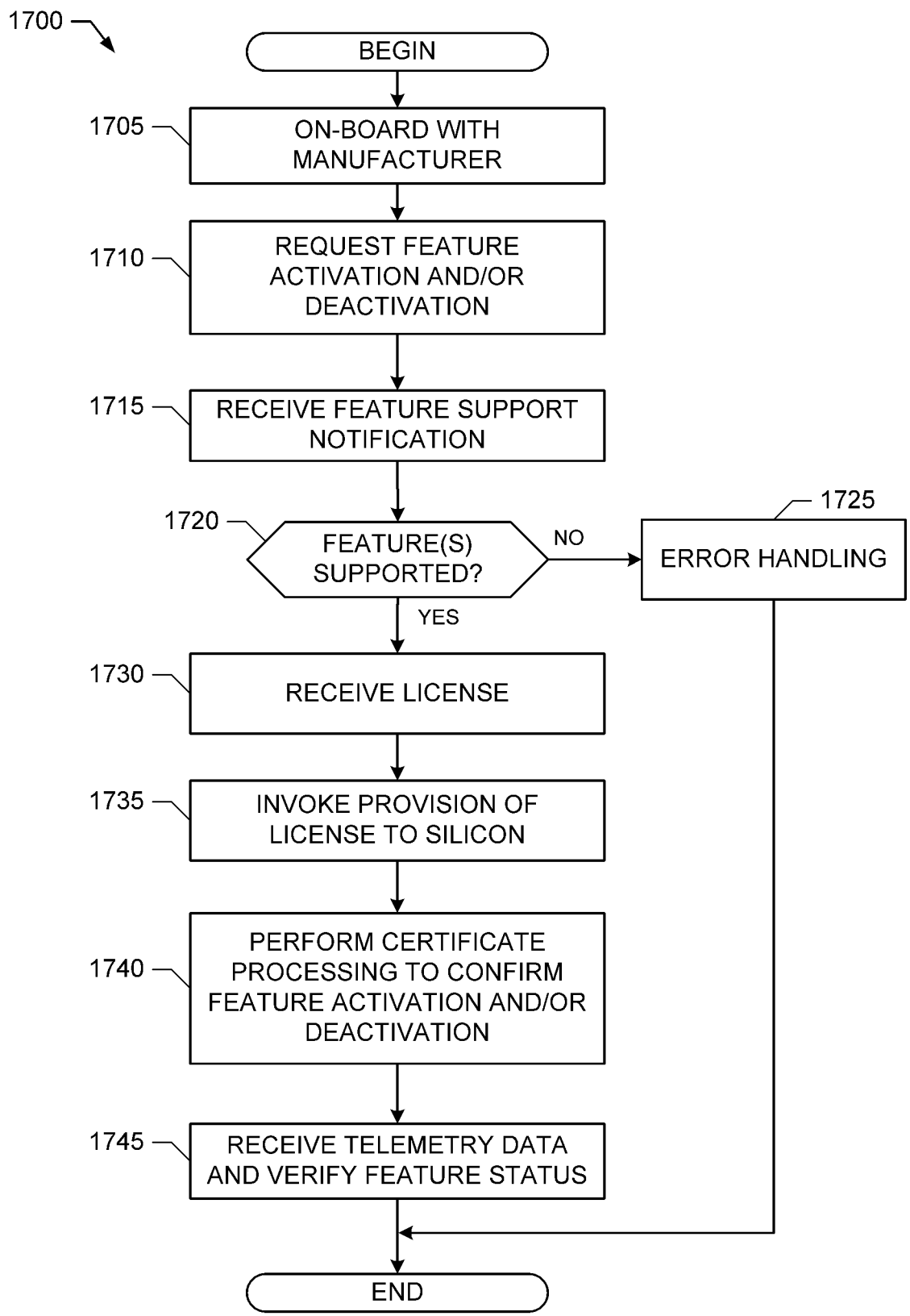
FIG. 17 is a flowchart representative of example computer readable instructions that may be executed to implement the example customer enterprise system of FIGS. 1 and/or 2.

An example program 1700 that may be executed to implement the example customer enterprise system 115 of the example systems 100 and/or 200 of FIGS. 1-2 is illustrated in FIG. 17. The example program 1700 may be executed at predetermined intervals, based on an occurrence of a predetermined event, etc., or any combination thereof. With reference to the preceding figures and associated written descriptions, the example program 1700 of FIG. 17 begins execution at block 1705 at which the accounts management service 276 of the customer enterprise system 115 on-boards its customer for access to SDSi capabilities offered by a manufacturer of the SDSi product 105, as described above. For example, the accounts management service 276 can exchange information with the manufacturer enterprise system 110 to on-board with the manufacturer prior to or after the customer's purchase of the SDSi product 105.

At block 1710, the SDSi client agent 272 of the client enterprise system 115 sends a request to activate (or deactivate) an SDSi feature of the SDSi product 105, as described above. In the illustrated example, the request is generated by the platform inventory management service 274 or the SDSi client agent 272 of the client enterprise system 115, and is sent by the SDSi client agent 272 to the SDSi portal 262 of the manufacturer enterprise system 110. At block 1715, the SDSi client agent 272 receives a notification from the SDSi portal 262 that indicates whether the requested SDSi feature to be activated (or deactivated) is supported by the SDSi product 105. If the requested SDSi feature is not supported by the SDSi product 105 (block 1720), at block 1725 the customer enterprise system 115 performs error handling and, for example, updates the platform inventory management service 274 to note that the requested SDSi feature is not supported by the SDSi product 105. However, if the requested SDSi feature is supported by the SDSi product 105 (block 1720), at block 1730 the SDSi client agent 272 receives, from the SDSi portal 262, a license to activate (or deactivate) the SDSi feature in response to the customer's request, as described above. In the illustrated example, the license is maintained by the entitlement management service 278 of the customer enterprise system 115 until the customer is ready to invoke the license, as described above.

Sometime later, at block 1735, the entitlement management service 278 determines (e.g., based on customer input) that the license received at block 1730 to activate (or deactivate) the SDSi feature is to be invoked. Thus, the entitlement management service 278 provides the license to the SDSi client agent 272, which sends (e.g., downloads) the license to the SDSi product 105, as described above. Sometime later, at block 1740, the customer enterprise system 115 receives, as described above, a certificate reported by the SDSi product 105 to confirm activation (or deactivation) of the requested SDSi feature. In the illustrated example, the certificate is received directly from the SDSi product 105 by the SDSi client agent 272 of the customer enterprise system 115. At block 1740, the entitlement management service 278 of the customer enterprise system 115 processes the received certificate, as described above, to confirm successful activation (or deactivation) of the requested SDSi feature, and invokes the accounts management service 276 to reconcile billing, authorize payment, etc., which contacts the manufacturer enterprise system 110 accordingly. Thereafter, at block 1745, the SDSi client agent 272 of the customer enterprise system 115 receives feature status data reported by the SDSi product 105 (e.g., in one or more certificates), as described above, which is processed at the entitlement management service 278 and accounts management service 276 to confirm proper operation of the SDSi product 105, reconcile billing, authorize further payment(s), etc.

Figure 18:
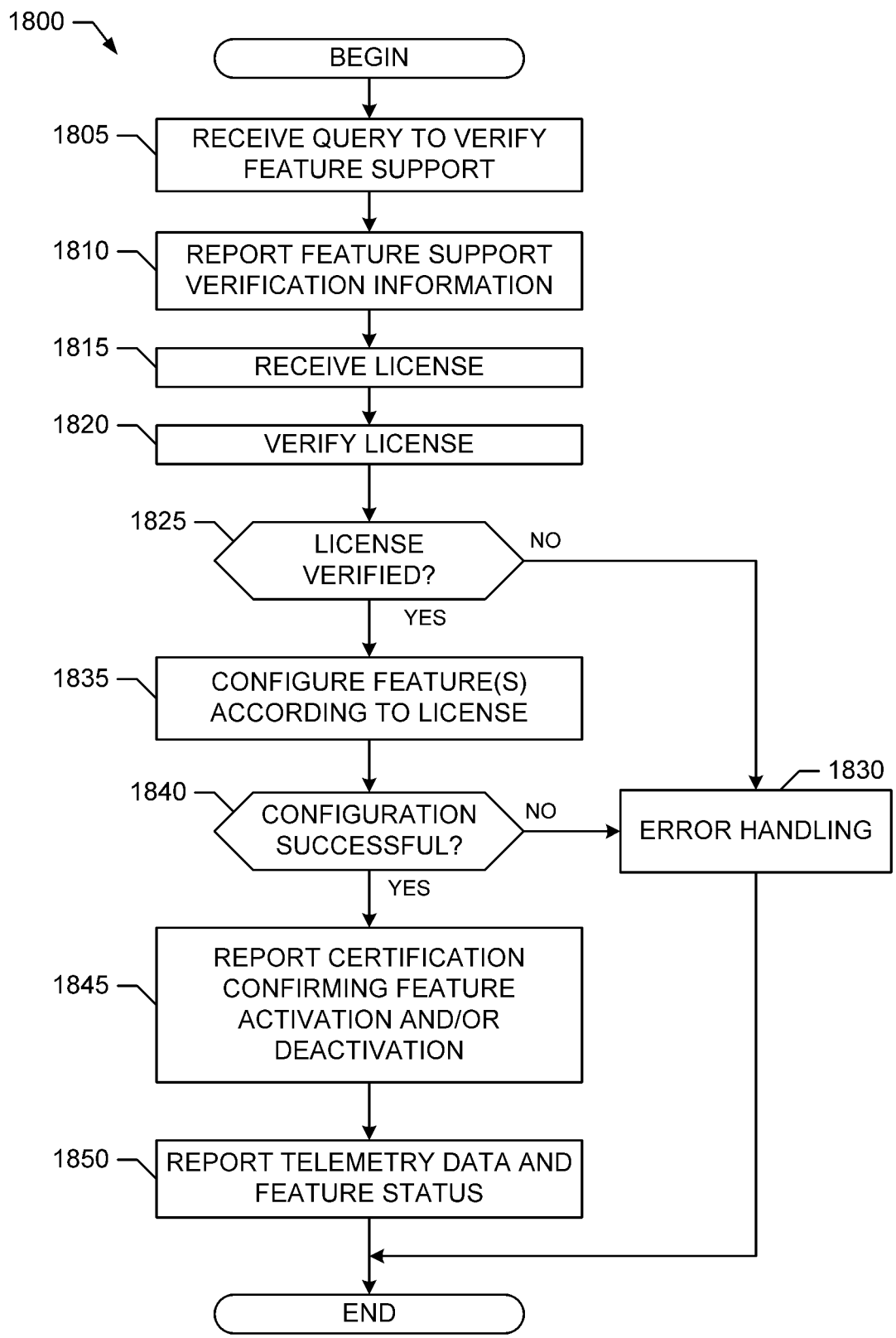
FIG. 18 is a flowchart representative of example computer readable instructions that may be executed to implement the example software defined silicon agent of FIGS. 1 and/or 2.

An example program 1800 that may be executed to implement the example SDSi asset agent 140 of the example systems 100 and/or 200 of FIGS. 1-2 is illustrated in FIG. 18. The example program 1800 may be executed at predetermined intervals, based on an occurrence of a predetermined event, etc., or any combination thereof. With reference to the preceding figures and associated written descriptions, the example program 1800 of FIG. 18 begins execution at block 1805 at which the SDSi asset agent 140 receives a query to confirm whether a particular SDSi feature is supported by the SDSi product 105. For example, the query may be from the SDSi agent management interface 264 of the manufacturer enterprise system 110, the SDSi client agent 272 of the customer enterprise system 115, etc. At block 1810, the SDSi asset agent 140 invokes its license processor 214 to generating a response to the query, as described above. For example, the license processor 214 analyzes the configuration of the hardware circuitry 125, the firmware 130 and/or the BIOS 135 of the SDSi product 105, and generates feature support verification information indicating whether the queried feature is supported by the SDSi product 105, which is reported by the SDSi asset agent 140 back to the source of the query.

At block 1815, the SDSi asset agent 140 receives a license from the SDSi client agent 272 of the customer enterprise system 115 to activate (or deactivate) an SDSi feature of the SDSi product 105, as described above. At block 1820, the license processor 214 of the SDSi asset agent 140 verifies the license. For example, the license processor 214 may determine the license is verified when the license correctly identifies the SDSi product 105 and/or the feature to be activated (or deactivated), when the license is authentic (e.g., based on a manufacturer signature included with the license, a license sequence number included in the license, etc.), when activation (or deactivation) of the requested SDSi feature will not result in an unsupported or otherwise invalid configuration of the SDSi product 105, etc., or any combination thereof. In some examples, the license processor 214 determines the license is verified if some or all such verification criteria are satisfied, and determines the license is unverified if one or more of such verification criteria are not satisfied.

If the license is determined to be unverified (block 1825), at block 1830 the SDSi asset agent 140 performs error handling to, for example, discard the license and report a certificate to the SDSi client agent 272 that indicates the license could not be invoked. However, if the license is determined to be valid (block 1825), at block 1835 the license processor 214 configures the SDSi product 105 to activate (or deactivate) the SDSi feature in accordance with the license, as described above. If configuration is not successful (block 1840), at block 1830 the SDSi asset agent 140 performs error handling to, for example, discard the license and report a certificate to the SDSi client agent 272 that indicates the configuration of the SDSi product 105 to activate (or deactivate) the requested SDSi feature was unsuccessful.

However, if configuration is successful (block 1840), at block 1845 the license processor 214, in combination with the analytics engine 205, generates a certificate to confirm the successful activation (or deactivation) of the requested SDSi feature, which is reported by the SDSi asset agent 140 to the SDSi client agent 272, as described above. Sometime later (e.g., in response to a request, based on an event, etc.), at block 1850, the SDSi asset agent 140 reports telemetry data and feature status data (e.g., in one or more certificates) to the SDSi client agent 272 of the customer enterprise system 115 and/or to the SDSi agent management interface 264 of the manufacturer enterprise system 110, as described above.

Example machine readable instructions 1900 for implementing the SDSi asset agent 140 of FIG. 10 are illustrated in FIG. 7. With reference to the preceding figures and associated descriptions, the example machine readable instructions 1900 begin at block 1902. At block 1902, the example SDSi asset agent 140 determines whether a license has been received. In some examples, the license processor 214 determines whether a license has been received. In response to a license having been received, processing transfers to block 1904. Conversely, in response to a license having not been received, processing transfers to block 1930.

At block 1904, the example SDSi asset agent 140 determines whether an instruction to apply a license has been received. In some examples, the license manager 1016 determines whether an instruction to apply a license has been received. In response to an instruction to apply the license having been received, processing transfers to block 1908. Conversely, in response to an instruction to apply the license not having been received, processing transfers to block 1906.

At block 1908, the example SDSi asset agent 140 determines if the license is signed with an authentication key. In some examples, the authentication analyzer 1018 determines if the license is signed with an authentication key. In response to the license being signed with an authentication key, processing transfers to block 1910. Conversely, in response to the license not being signed with an authentication key, processing transfers to block 1918.

At block 1910, the example SDSi asset agent 140 determines whether the public customer authentication key (CAK) of the license corresponds to the current customer's private CAK. In some examples, the authentication analyzer 1018 determines if the public CAK of the license corresponds to the current customer's private CAK. In response to the public CAK of the license corresponding to the current customer's private CAK, processing transfers to block 1916. Conversely, in response to the public CAK of the license not corresponding to the current customer's private CAK, processing transfers to block 1912.

At block 1912, the example SDSi asset agent 140 invalidates the license. In some examples, the license manager 1016 invalidates the license.

At block 1914, the example SDSi asset agent 140 communicates an unintended recipient error to the asset manufacturer. In some examples, the agent interface 202 and/or the authentication analyzer 1018 communicates the unintended recipient error to the asset manufacturer, to inform the manufacturer that an attempt was made to execute a license on an unintended asset.

At block 1916, the example SDSi asset agent 140 decodes the license using a private CAK. In some examples, the authentication analyzer 1016 decodes the license using the private CAK.

At block 1918, the example SDSi asset agent 140 activates feature(s) in accordance with the license. In some examples, the feature activator 1020 activates features in accordance with the license.

At block 1920, the example SDSi asset agent 140 generates a completion certificate. In some examples, the certificate manager 1014 generates a completion certificate.

At block 1922, the example SDSi asset agent 140 stores the completion certificate. In some examples, the certificate manager 1014 stores the completion certificate.

At block 1924, the example SDSi asset agent 140 determines whether the asset is ready for transfer to a new customer. In some examples, the agent interface 202 determines whether the asset is ready for transfer to a new customer. In response to the asset being ready for transfer to a new customer, processing transfers to block 1926. Conversely, in response to the asset not being ready for transfer to a new customer, processing transfers to block 1930.

At block 1926, the example SDSi asset agent 140 signs the base state configuration with a private authentication key. In some examples, the authentication analyzer 1018 signs the base state configuration with the private authentication key.

At block 1928, the example SDSi asset agent 140 communicates the base state to the asset manufacturer. In some examples, the agent interface 202 communicates the base state to the asset manufacturer.

At block 1930, the example SDSi asset agent 140 determines whether to continue monitoring. In response to continuing monitoring, processing transfers to block 702. Conversely, in response to not continuing monitoring, processing terminates.

Processor and Distribution Platforms

Figure 19:
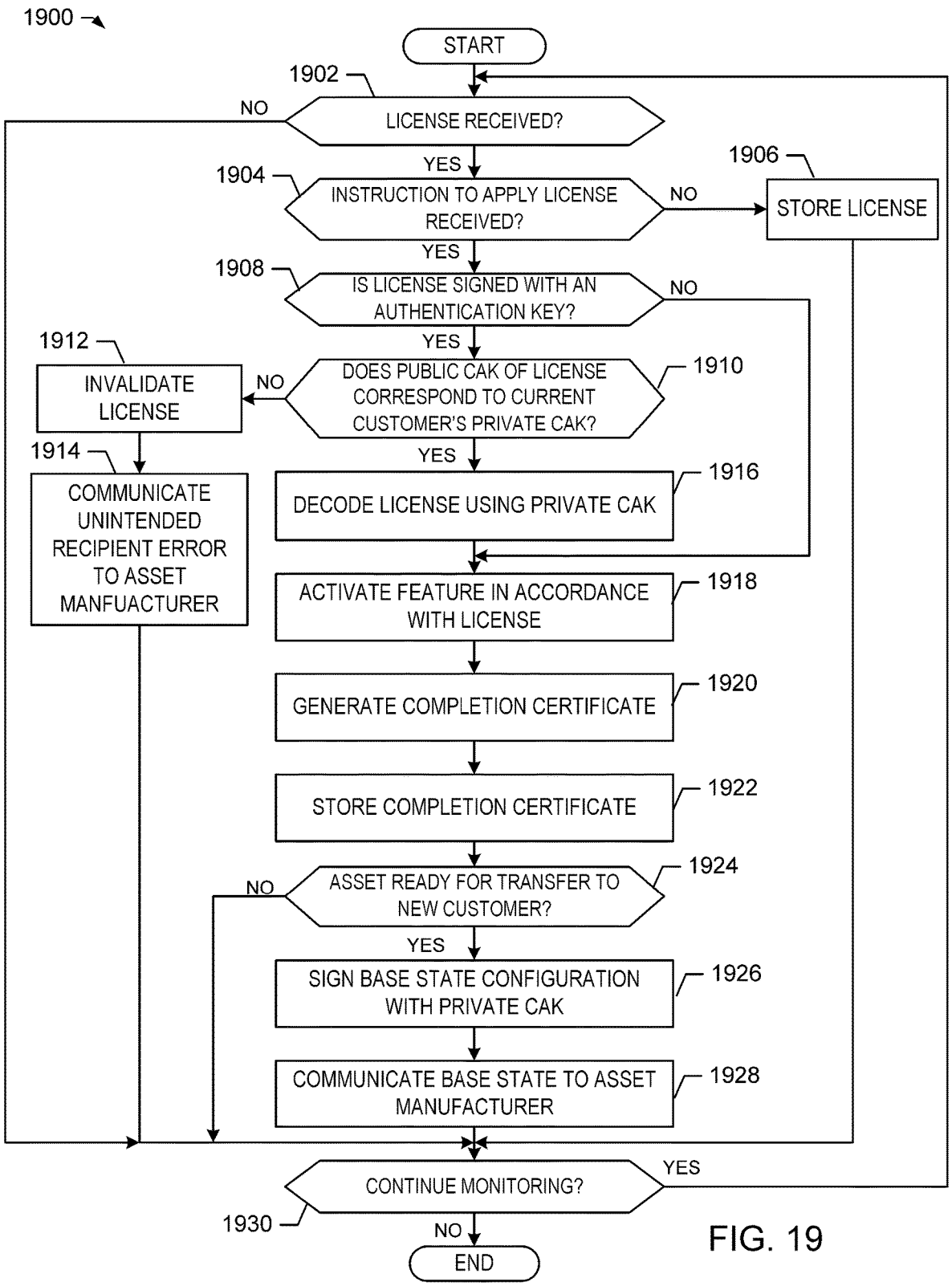
FIG. 19 is a flowchart representative of example computer readable instructions that may be executed to implement the example SDSi asset agent of FIG. 10.
Figure 20:
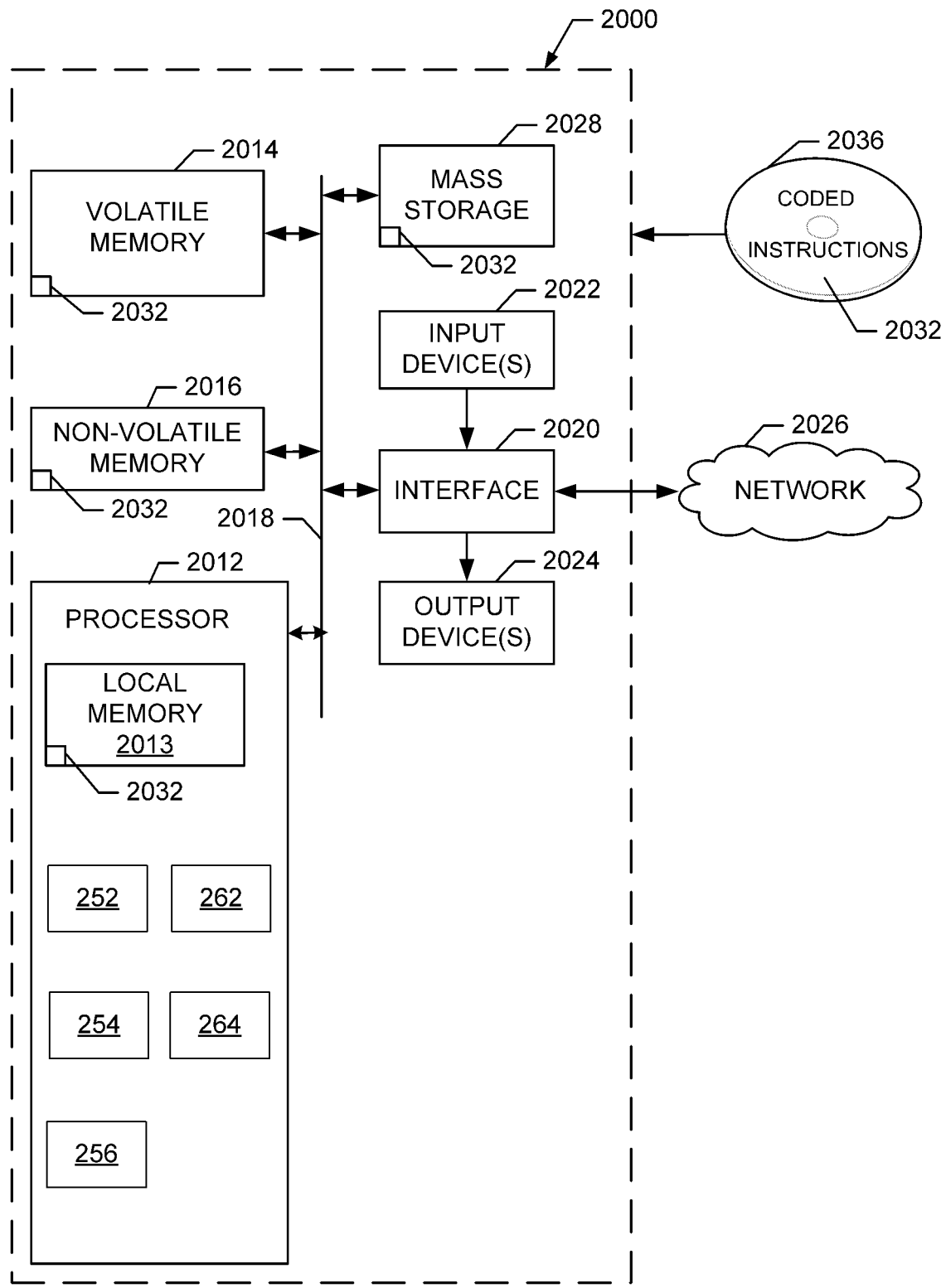
FIG. 20 is a block diagram of an example processor platform structured to execute the example computer readable instructions of FIG. 16 to implement the example manufacturer enterprise system of FIGS. 1 and/or 2.

FIG. 20 is a block diagram of an example processor platform 2000 structured to execute the instructions of FIG. 19 to implement the manufacture enterprise system 110 of FIGS. 1-9. The processor platform 2000 can be, for example, a server, a personal computer, a workstation, a self-learning machine (e.g., a neural network), a mobile device (e.g., a cell phone, a smart phone, a tablet such as an iPad™), or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, GPUs, DSPs, or controllers from any desired family or manufacturer. The hardware processor 2012 may be a semiconductor based (e.g., silicon based) device. In this example, the processor 2012 implements one or more of the example product management service 252, the example customer management service 254, the example SDSi feature management service 256, the example SDSi portal 262 and/or the example SDSi agent management interface 264.

The processor 2012 of the illustrated example includes a local memory 2013 (e.g., a cache). The processor 2012 of the illustrated example is in communication with a main memory including a volatile memory 2014 and a non-volatile memory 2016 via a link 2018. The link 2018 may be implemented by a bus, one or more point-to-point connections, etc., or a combination thereof. The volatile memory 2014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), a Bluetooth® interface, a near field communication (NFC) interface, and/or a PCI express interface.

In the illustrated example, one or more input devices 2022 are connected to the interface circuit 2020. The input device(s) 2022 permit(s) a user to enter data and/or commands into the processor 2012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2000, can allow the user to control the computer system and provide data to the computer using physical gestures, such as, but not limited to, hand or body movements, facial expressions, and face recognition.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 2020 of the illustrated example, thus, typically includes a graphics driver card, a graphics driver chip and/or a graphics driver processor.

The interface circuit 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, redundant array of independent disks (RAID) systems, and digital versatile disk (DVD) drives.

The machine executable instructions 2032 corresponding to the instructions of FIG. 19 may be stored in the mass storage device 2028, in the volatile memory 2014, in the non-volatile memory 2016, in the local memory 2013 and/or on a removable non-transitory computer readable storage medium, such as a CD or DVD 2036.

Figure 21:
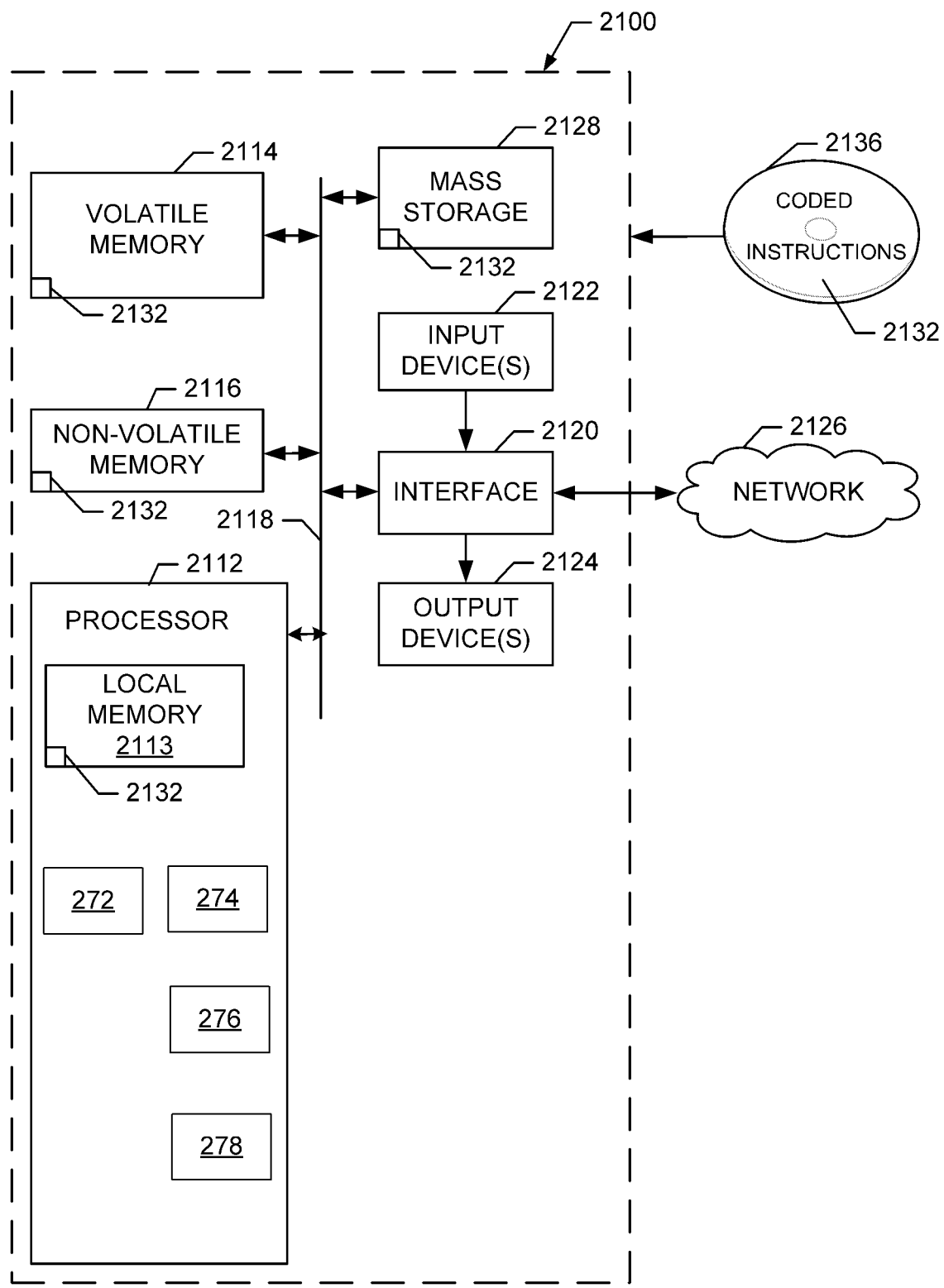
FIG. 21 is a block diagram of an example processor platform structured to execute the example computer readable instructions of FIG. 17 to implement the example customer enterprise system of FIGS. 1 and/or 2.

FIG. 21 is a block diagram of an example processor platform 2100 structured to execute the instructions of FIG. 20 to implement the customer enterprise system 115 of FIGS. 1-9. The processor platform 2100 can be, for example, a server, a personal computer, a workstation, a self-learning machine (e.g., a neural network), a mobile device (e.g., a cell phone, a smart phone, a tablet such as an iPad™) or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors, GPUs, DSPs, or controllers from any desired family or manufacturer. The hardware processor 2112 may be a semiconductor based (e.g., silicon based) device. In this example, the processor 2112 implements one or more of the example SDSi client agent 272, the example platform inventory management service 274, the example accounts management service 276 and/or the example entitlement management service 278.

The processor 2112 of the illustrated example includes a local memory 2113 (e.g., a cache). The processor 2112 of the illustrated example is in communication with a main memory including a volatile memory 2114 and a non-volatile memory 2116 via a link 2118. The link 2118 may be implemented by a bus, one or more point-to-point connections, etc., or a combination thereof. The volatile memory 2114 may be implemented by SDRAM, DRAM, RDRAM® and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a USB, a Bluetooth® interface, an NFC interface, and/or a PCI express interface.

In the illustrated example, one or more input devices 2122 are connected to the interface circuit 2120. The input device(s) 2122 permit(s) a user to enter data and/or commands into the processor 2112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2100, can allow the user to control the computer system and provide data to the computer using physical gestures, such as, but not limited to, hand or body movements, facial expressions, and face recognition.

One or more output devices 2124 are also connected to the interface circuit 2120 of the illustrated example. The output devices 2124 can be implemented, for example, by display devices (e.g., an LED, an OLED, an LCD, a CRT display, an IPS display, a touchscreen, etc.), a tactile output device, a printer and/or speakers(s). The interface circuit 2120 of the illustrated example, thus, typically includes a graphics driver card, a graphics driver chip and/or a graphics driver processor.

The interface circuit 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2126. The communication can be via, for example, an Ethernet connection, a DSL connection, a telephone line connection, a coaxial cable system, a satellite system, a line-of-site wireless system, a cellular telephone system, etc.

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and DVD drives.

The machine executable instructions 2132 corresponding to the instructions of FIG. 20 may be stored in the mass storage device 2128, in the volatile memory 2114, in the non-volatile memory 2116, in the local memory 2113 and/or on a removable non-transitory computer readable storage medium, such as a CD or DVD 2136.

Figure 22:
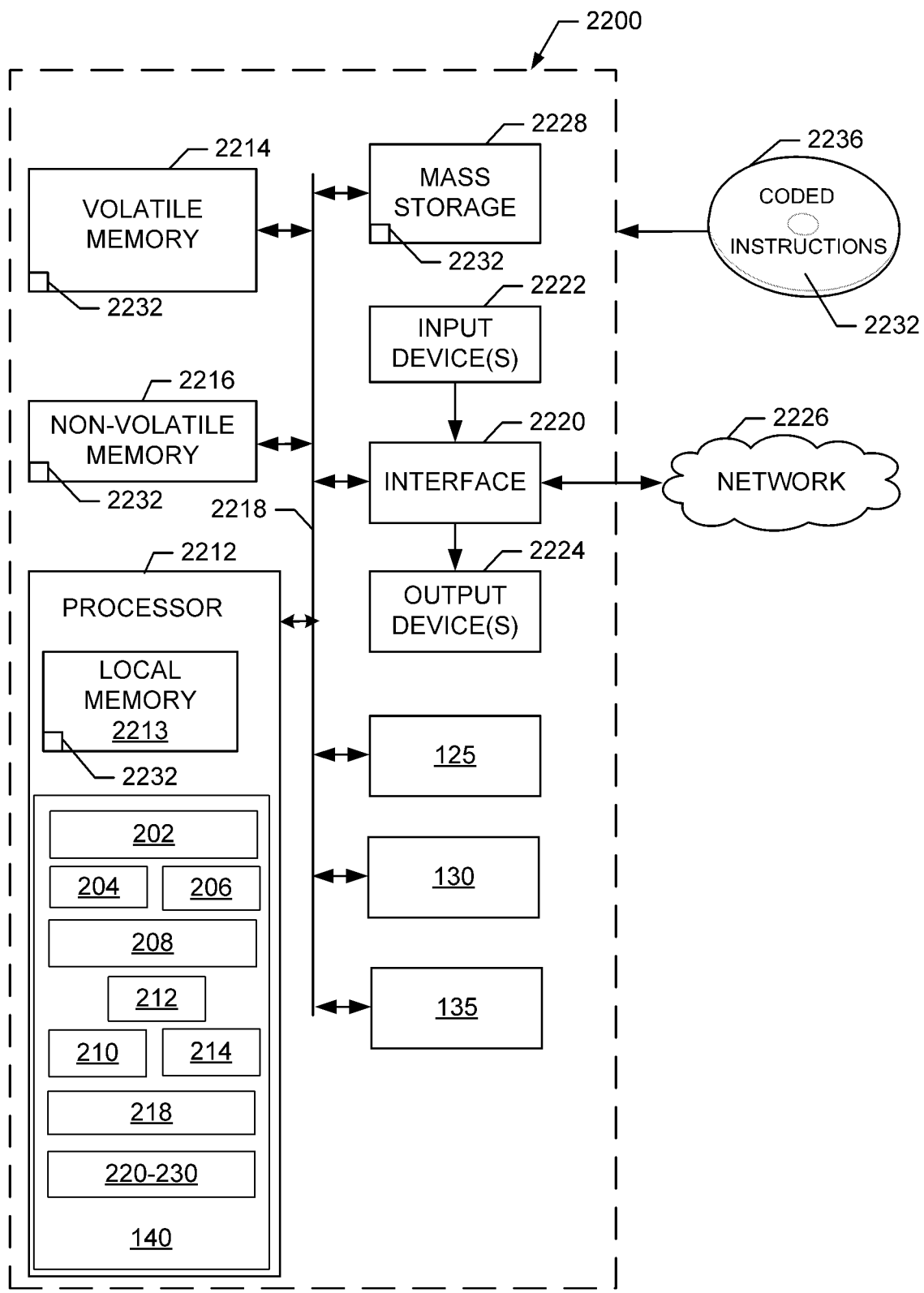
FIG. 22 is a block diagram of an example processor platform structured to execute the example computer readable instructions of FIG. 18 to implement the example software defined silicon agent of FIGS. 1 and/or 2.

FIG. 22 is a block diagram of an example processor platform 2200 structured to execute the instructions of FIG. 35 to implement the SDSi asset agent 140 of FIGS. 1-9. The processor platform 2200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors, GPUs, DSPs, or controllers from any desired family or manufacturer. The hardware processor 2212 may be a semiconductor based (e.g., silicon based) device. In this example, the processor 2212 implements one or more of the example agent interface 202, the example agent local services 204, the example analytics engine 206, the example communication services 208, the example agent CLI 210, the example agent daemon 212, the example license processor 214, the example agent library 218 and/or the example feature libraries 220-230.

The processor 2212 of the illustrated example includes a local memory 2213 (e.g., a cache). The processor 2212 of the illustrated example is in communication with a main memory including a volatile memory 2214 and a non-volatile memory 2216 via a link 2218. The link 2218 may be implemented by a bus, one or more point-to-point connections, etc., or a combination thereof. The volatile memory 2214 may be implemented by SDRAM, DRAM, RDRAM® and/or any other type of random access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a USB, a Bluetooth® interface, an NFC interface, and/or a PCI express interface.

In the illustrated example, one or more input devices 2222 are connected to the interface circuit 2220. The input device(s) 2222 permit(s) a user to enter data and/or commands into the processor 2212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2200, can allow the user to control the computer system and provide data to the computer using physical gestures, such as, but not limited to, hand or body movements, facial expressions, and face recognition.

One or more output devices 2224 are also connected to the interface circuit 2220 of the illustrated example. The output devices 2224 can be implemented, for example, by display devices (e.g., an LED, an OLED, an LCD, a CRT display, an IPS display, a touchscreen, etc.), a tactile output device, a printer and/or speakers(s). The interface circuit 2220 of the illustrated example, thus, typically includes a graphics driver card, a graphics driver chip and/or a graphics driver processor.

The interface circuit 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2226. The communication can be via, for example, an Ethernet connection, a DSL connection, a telephone line connection, a coaxial cable system, a satellite system, a line-of-site wireless system, a cellular telephone system, etc.

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, RAID systems, and DVD drives.

The machine executable instructions 2232 corresponding to the instructions of FIG. 21 may be stored in the mass storage device 2228, in the volatile memory 2214, in the non-volatile memory 2216, in the local memory 2213 and/or on a removable non-transitory computer readable storage medium, such as a CD or DVD 2236.

Figure 23:
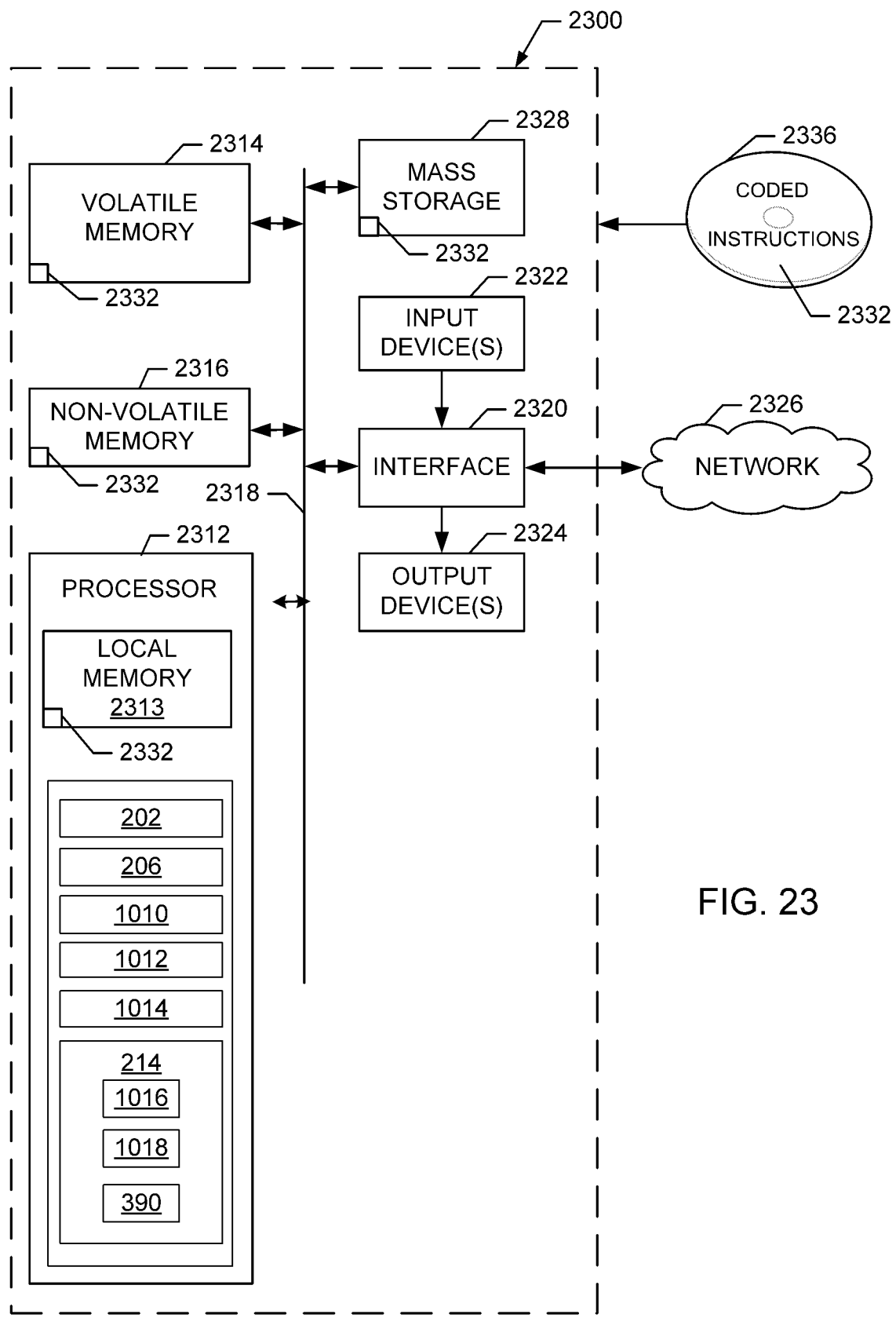
FIG. 23 is a block diagram of an example processor platform structured to execute the example computer readable instructions of FIG. 19 to implement the example SDSi asset agent of FIG. 10.

FIG. 23 is a block 2300 structured to execute the instructions of FIG. 19 to implement the SDSi asset agent 140 of FIG. 10. The processor platform 2300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2300 of the illustrated example includes a processor 2312. The processor 2312 of the illustrated example is hardware. For example, the processor 2312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example agent interface 202, the example analytics engine 206, the example license processor 214, the example hardware identifier manager 1010, the example entropy identifier generator 1012, the example certificate manager 1014, the example license manager 1016, the example authentication analyzer 1018, and the example feature activator 1020.

The processor 2312 of the illustrated example includes a local memory 2313 (e.g., a cache). The processor 2312 of the illustrated example is in communication with a main memory including a volatile memory 2314 and a non-volatile memory 2316 via a bus 2318. The volatile memory 2314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2316 may be implemented by flash memory and/or any other desired type of memory device. Access to the main memory 2314, 2316 is controlled by a memory controller.

The processor platform 2300 of the illustrated example also includes an interface circuit 2320. The interface circuit 2320 may be implemented by any type of interface standard, such as an Ethernet interface, a universal serial bus (USB), a Bluetooth® interface, a near field communication (NFC) interface, and/or a PCI express interface.

In the illustrated example, one or more input devices 2322 are connected to the interface circuit 2320. The input device(s) 2322 permit(s) a user to enter data and/or commands into the processor 2312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2324 are also connected to the interface circuit 2320 of the illustrated example. The output devices 2324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2320 of the illustrated example, thus, typically includes a graphics driver card, a graphics driver chip and/or a graphics driver processor.

The interface circuit 2320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2300 of the illustrated example also includes one or more mass storage devices 2328 for storing software and/or data. Examples of such mass storage devices 2328 include floppy disk drives, hard drive disks, compact disk drives, Blu-ray disk drives, redundant array of independent disks (RAID) systems, and digital versatile disk (DVD) drives.

The machine executable instructions 2332 of FIG. 19 may be stored in the mass storage device 2328, in the volatile memory 2314, in the non-volatile memory 2316, and/or on a removable non-transitory computer readable storage medium such as a CD or DVD 2336.

Figure 24:
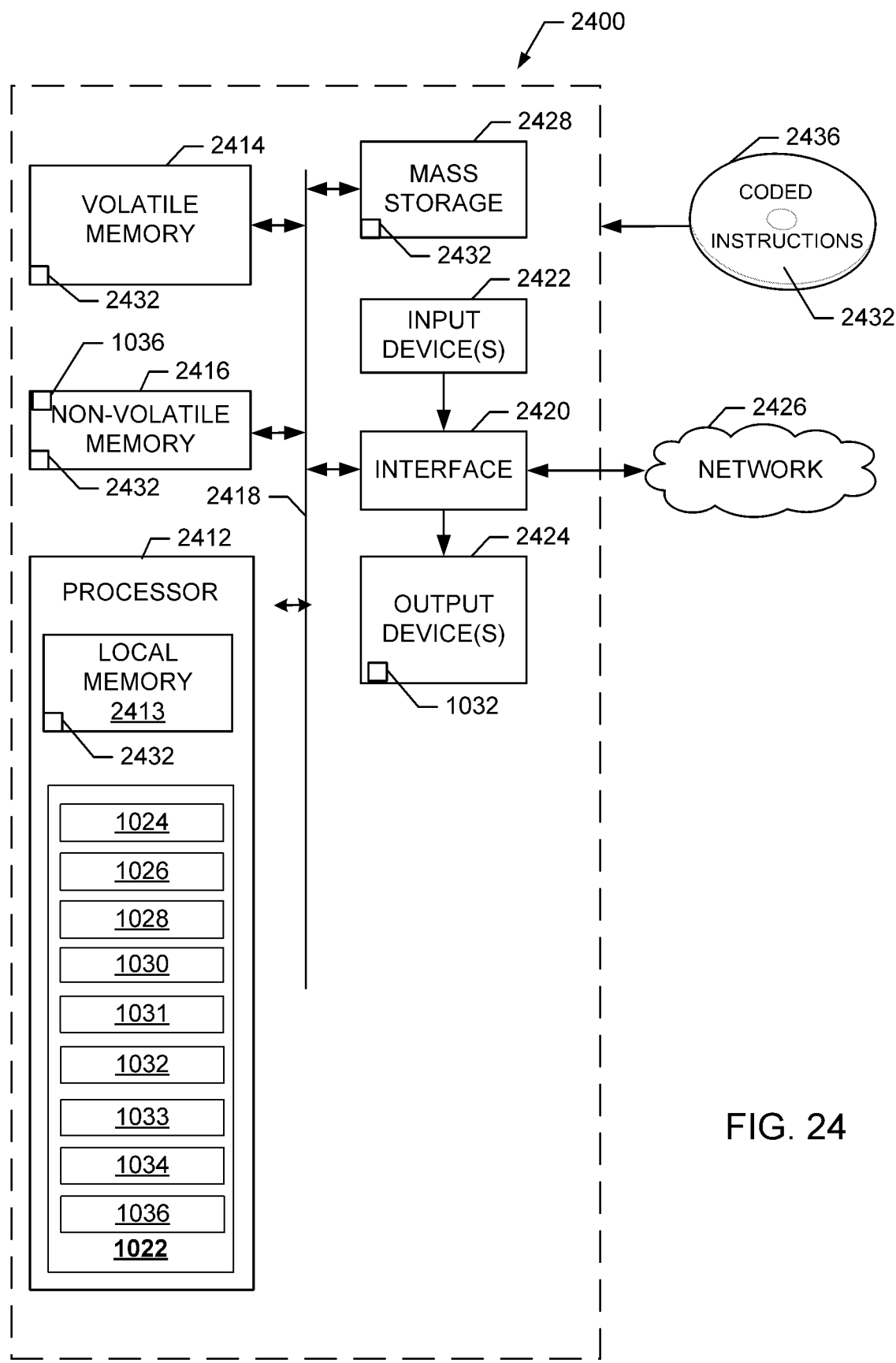
FIG. 24 is a block diagram of an example processor platform structured to execute the example computer readable instructions of FIGS. 13-15 to implement the example SiAAS telemetry generator of FIG. 10.

FIG. 24 is a block 2400 structured to execute the instructions of FIGS. 13-15 to implement the SiAAS telemetry generator 1022 of the SDSi asset agent 140 of FIG. 10. The processor platform 2400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2400 of the illustrated example includes a processor 2412. The processor 2412 of the illustrated example is hardware. For example, the processor 2412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example feature configuration sampler 1024, the example feature configuration data accumulator 1026, the example feature up-time tracker 1028, the example feature enabled counter(s) 1030, the example first timer(s) 1031, the example feature configuration data reporter 1032, the example second timer 103, and the example primary reference counter 1034.

The processor 2412 of the illustrated example includes a local memory 2413 (e.g., a cache). The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2416 may be implemented by flash memory and/or any other desired type of memory device. Access to the main memory 2414, 2416 is controlled by a memory controller. The non-volatile memory 2416 implements the example secure storage 1036.

The processor platform 2400 of the illustrated example also includes an interface circuit 2420. The interface circuit 2420 may be implemented by any type of interface standard, such as an Ethernet interface, a universal serial bus (USB), a Bluetooth® interface, a near field communication (NFC) interface, and/or a PCI express interface.

In the illustrated example, one or more input devices 2422 are connected to the interface circuit 2420. The input device(s) 2422 permit(s) a user to enter data and/or commands into the processor 2412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2424 are also connected to the interface circuit 2420 of the illustrated example. The output devices 2424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2420 of the illustrated example, thus, typically includes a graphics driver card, a graphics driver chip and/or a graphics driver processor. The output devices 2424 can implement the example feature configuration data reporter 1032.

The interface circuit 2420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, redundant array of independent disks (RAID) systems, and digital versatile disk (DVD) drives.

The machine executable instructions 2432 of FIG. 24 may be stored in the mass storage device 2428, in the volatile memory 2414, in the non-volatile memory 2416, and/or on a removable non-transitory computer readable storage medium such as a CD or DVD 2436.

Figure 25:
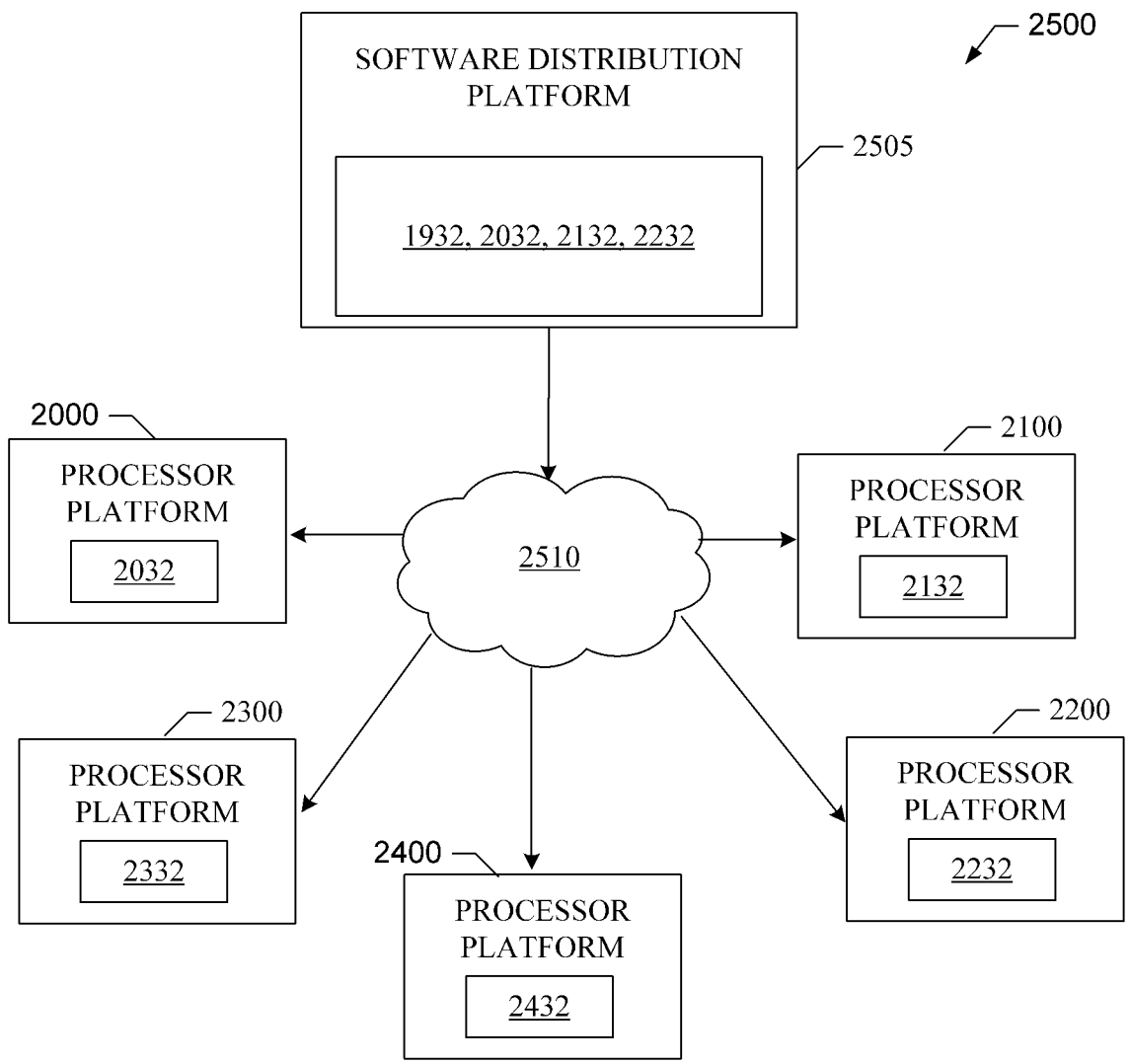
FIG. 25 is a block diagram of an example software distribution platform to distribute software (e.g., software corresponding to the example computer readable instructions of FIGS. 13, 14, 15, 16, 17, 18 and/or 19) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 2505 to distribute software such as the example computer readable instructions 2032, 2132, 2232, 2332 and/or 2432 of FIGS. 20-24 is illustrated in FIG. 25. The example software distribution platform 2505 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 2032, 2132, 2232, 2332 and/or 2432 of FIGS. 20-24. The third parties may be consumers, users, retailers, OEMs, etc., who purchase and/or license the software for use and/or re-sale and/or sub-licensing. In the illustrated example, the software distribution platform 2505 includes one or more servers and one or more storage devices. The storage devices store the computer readable instructions 2032, 2132, 2232, 2332 and/or 2432, which may correspond to the example computer readable instructions 1300, 1400, 1500, 1600, 1700, 1800, and/or 1900 of FIGS. 13-19. The one or more servers of the example software distribution platform 2505 are in communication with a network 2510, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 2032, 2132, 2232, 2332 and/or 2432 from the software distribution platform 2505. For example, the software, which may correspond to the example computer readable instructions 1300, 1400, 1500, 1600, 1700, 1800 and/or 1900 of FIGS. 13-19, may be downloaded to the example processor platforms 2000, 2100, 2200, 2300, and/or 2400, which execute the computer readable instructions 2032, 2132, 2232, 2332 and/or 2432 to implement the manufacture enterprise system 110, the customer enterprise system 115 and/or the SDSi asset agent 140. As another example, the software, which may correspond to the example computer readable instructions. In some examples, one or more servers of the software distribution platform 2505 periodically offer, transmit, and/or force updates to the software (e.g., the example computer readable instructions 2032, 2132, 2232, 2332 and/or 2432 of FIGS. 20-24) to ensure improvements, patches, updates, etc. are distributed and applied to the software at the end user devices.

Edge Computing

Figure 26:
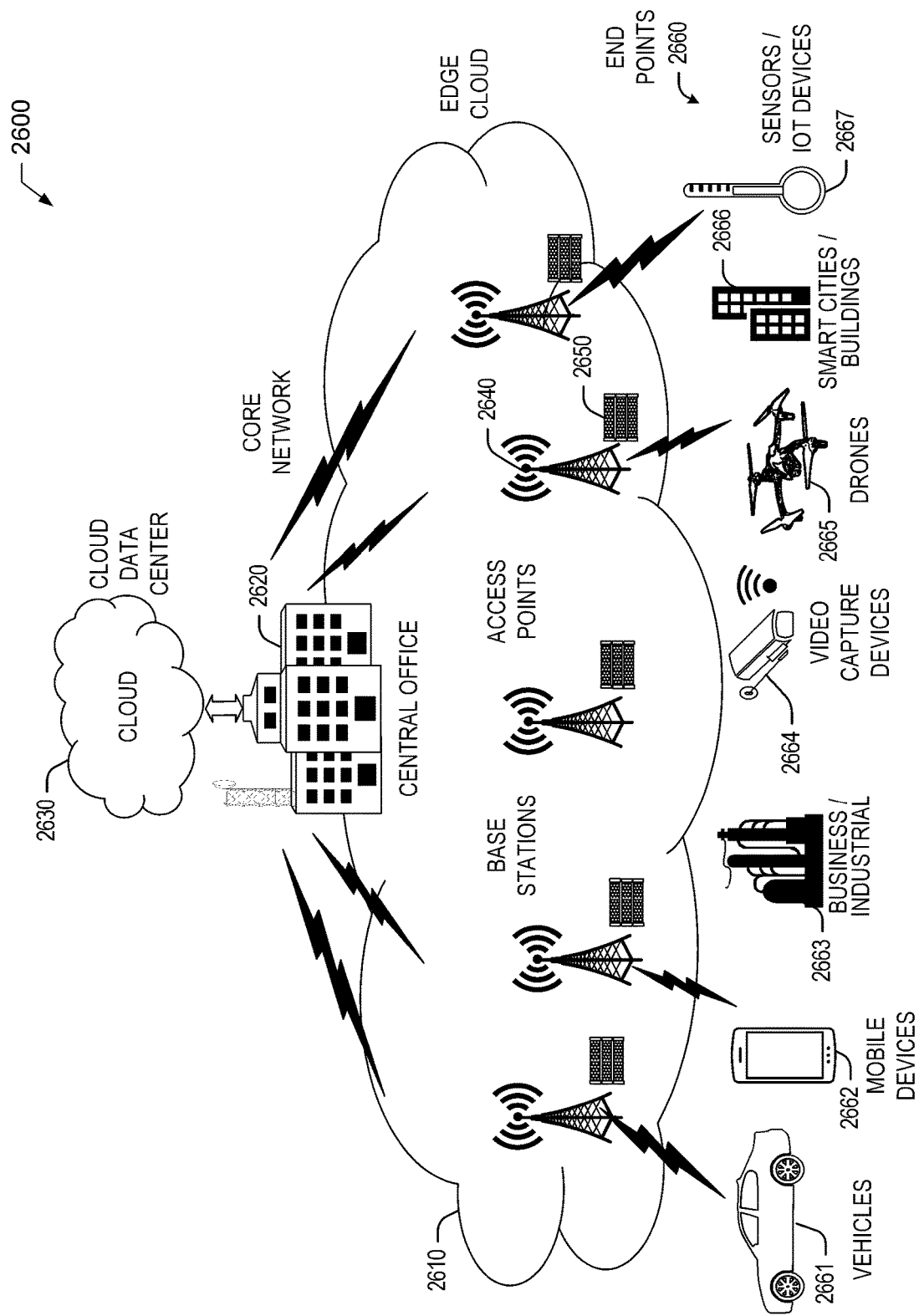
FIG. 26 illustrates an overview of an edge cloud configuration for edge computing.

FIG. 26 is a block diagram 2600 showing an overview of a configuration for edge computing, which includes a layer of processing referred to in many of the following examples as an "edge cloud". As shown, the edge cloud 2610 is co-located at an edge location, such as an access point or base station 2640, a local processing hub 2650, or a central office 2620, and thus may include multiple entities, devices, and equipment instances. The edge cloud 2610 is located much closer to the endpoint (consumer and producer) data sources 2660 (e.g., autonomous vehicles 2661, user equipment 2662, business and industrial equipment 2663, video capture devices 2664, drones 2665, smart cities and building devices 2666, sensors and IoT devices 2667, etc.) than the cloud data center 2630. Compute, memory, and storage resources which are offered at the edges in the edge cloud 2610 are critical to providing ultra-low latency response times for services and functions used by the endpoint data sources 2660 as well as reduce network backhaul traffic from the edge cloud 2610 toward cloud data center 2630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce resources needed for network services, through the distribution of more resources which are located closer both geographically and in network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 27:
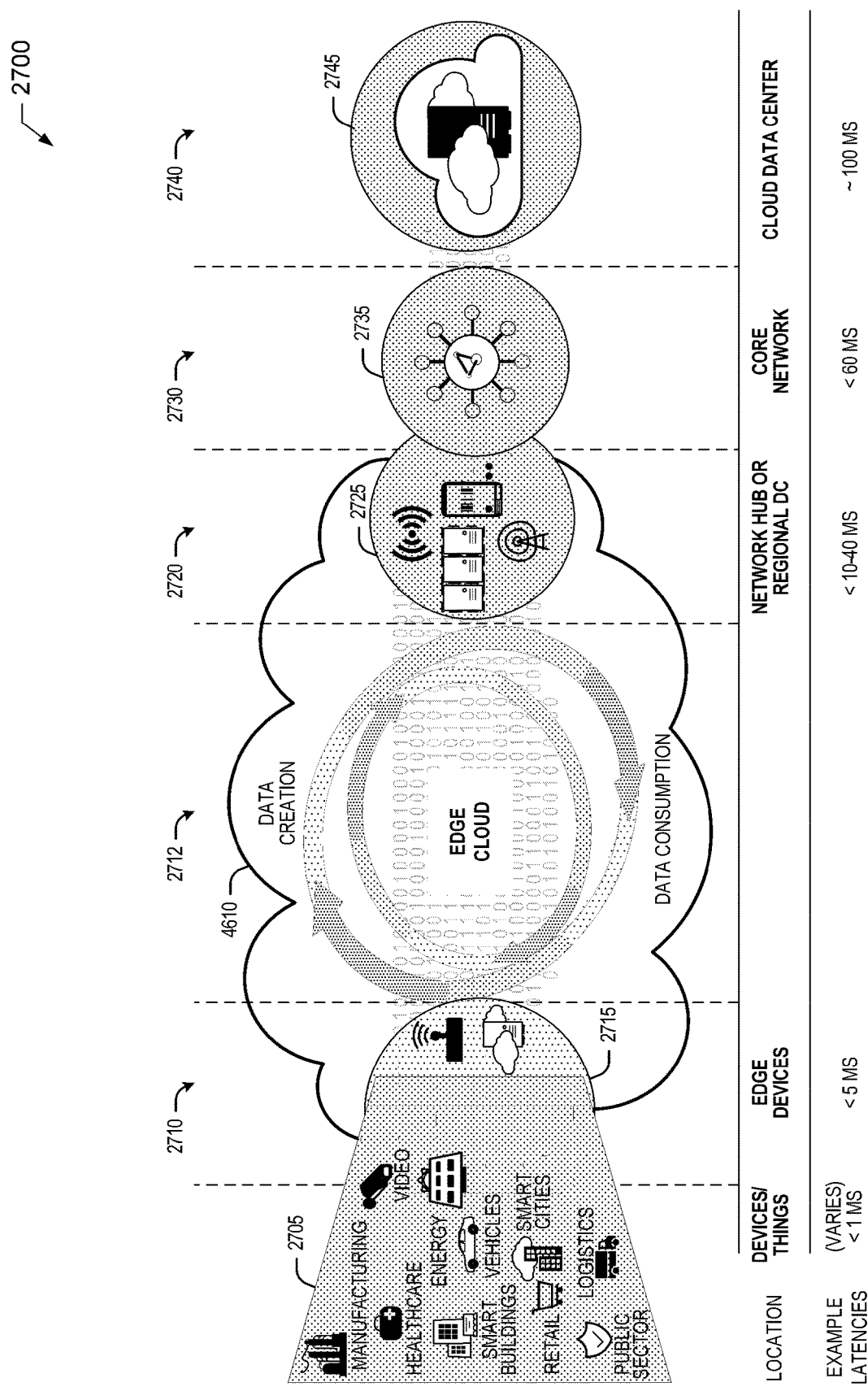
FIG. 27 illustrates operational layers among endpoints, an edge cloud, and cloud computing environments.

FIG. 27 illustrates operational layers among endpoints, an edge cloud, and cloud computing environments. Specifically, FIG. 27 depicts examples of computational use cases 2705, utilizing the edge cloud 2610 among multiple illustrative layers of network computing. The layers begin at an endpoint (devices and things) layer 2700, which accesses the edge cloud 2610 to conduct data creation, analysis, and data consumption activities. The edge cloud 2610 may span multiple network layers, such as an edge devices layer 2710 having gateways, on-premise servers, or network equipment (nodes 2715) located in physically proximate edge systems; a network access layer 2720, encompassing base stations, radio processing units, network hubs, regional data centers (DC), or local network equipment (equipment 2725); and any equipment, devices, or nodes located therebetween (in layer 2712, not illustrated in detail). The network communications within the edge cloud 2610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 2700, under 5 ms at the edge devices layer 2710, to even between 10 to 40 ms when communicating with nodes at the network access layer 2720. Beyond the edge devices layer 2710 are core network 2730 and cloud data center 2740 layers, each with increasing latency (e.g., between 50-60 ms at the core network layer 2730, to 100 or more ms at the cloud data center layer). As a result, operations at a core network data center 2735 or a cloud data center 2745, with latencies of at least 50 to 100 ms or more, will not be able to accomplish many time-critical functions of the use cases 2705. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 2735 or a cloud data center 2745, a central office or content data network may be considered as being located within a "near edge" layer ("near" to the cloud, having high latency values when communicating with the devices and endpoints of the use cases 2705), whereas an access point, base station, on-premise server, or network gateway may be considered as located within a "far edge" layer ("far" from the cloud, having low latency values when communicating with the devices and endpoints of the use cases 2705). It will be understood that other categorizations of a particular network layer as constituting a "close", "local", "near", "middle", or "far" edge may be based on latency, distance, number of network hops, or other measurable characteristics, as measured from a source in any of the network layers 2700-2740.

The various use cases 2705 may access resources under usage pressure from incoming streams, due to multiple services utilizing the edge cloud. To achieve results with low latency, the services executed within the edge cloud 2610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 2610 may provide the ability to serve and respond to multiple applications of the use cases 2705 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 2610 (network layers 2700-2740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2610.

As such, the edge cloud 2610 is formed from network components and functional features operated by and within edge gateway nodes, edge aggregation nodes, or other edge compute nodes among network layers 2710-2730. The edge cloud 2610 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 2610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 2610 may be servers, multi-tenant servers, appliance computing devices, and/or any other type of computing devices. For example, the edge cloud 2610 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The example processor systems of FIGS. 20 to 24 illustrate example hardware for implementing an appliance computing device. The edge cloud 2610 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 28:
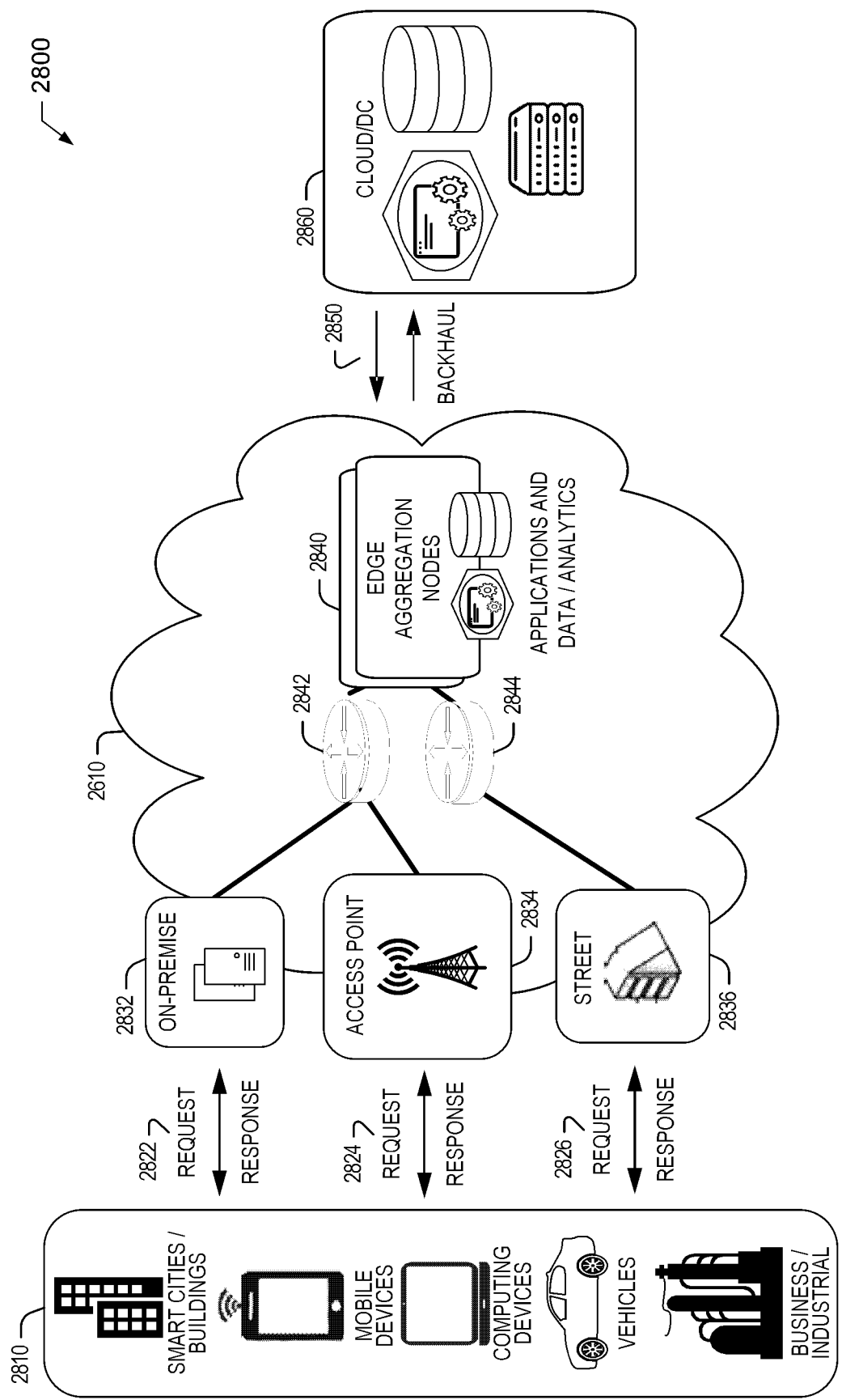
FIG. 28 illustrates an example approach for networking and services in an edge computing system.

In FIG. 28, various client endpoints 2810 (in the form of mobile devices, computers, autonomous vehicles, business computing equipment, industrial processing equipment) exchange requests and responses that are specific to the type of endpoint network aggregation. For instance, client endpoints 2810 may obtain network access via a wired broadband network, by exchanging requests and responses 28222 through an on-premise network system 2832. Some client endpoints 2810, such as mobile computing devices, may obtain network access via a wireless broadband network, by exchanging requests and responses 2824 through an access point (e.g., cellular network tower) 2834. Some client endpoints 2810, such as autonomous vehicles may obtain network access for requests and responses 2826 via a wireless vehicular network through a street-located network system 2836. However, regardless of the type of network access, the TSP may deploy aggregation points 2842, 2844 within the edge cloud 2610 to aggregate traffic and requests. Thus, within the edge cloud 2610, the TSP may deploy various compute and storage resources, such as at edge aggregation nodes 2840, to provide requested content. The edge aggregation nodes 2840 and other systems of the edge cloud 2610 are connected to a cloud or data center 2860, which uses a backhaul network 2850 to fulfill higher-latency requests from a cloud/data center for websites, applications, database servers, etc. Additional or consolidated instances of the edge aggregation nodes 2840 and the aggregation points 2842, 2844, including those deployed on a single server framework, may also be present within the edge cloud 2610 or other areas of the TSP infrastructure.

CONCLUSION

From the foregoing, it will be appreciated that example methods, apparatus and articles of manufacture have been disclosed that enables activation, deactivation and management of silicon product features after the silicon product has left the manufacturer's facility and control. The disclosed methods, apparatus and articles of manufacture improve the efficiency of using a computing device by providing mechanisms to activate dormant features of the silicon product, deactivate active features of the silicon product, perform failure recovery, track an amount time feature configurations of the silicon product are used, etc. The disclosed methods, apparatus and articles of manufacture are accordingly directed to one or more improvement(s) in the functioning of a computer.

Example methods, apparatus, systems, and articles of manufacture to provide silicon as a service are disclosed herein. Further examples and combinations thereof include the following:

Example 1 includes a silicon semiconductor device including a first counter to increment a first count when a timer expires, a feature configuration sampler to sample a state of a configuration of a feature of the semiconductor device responsive to expiration of the timer. The device of example 1 further includes a second counter to increment a second count when the sampled state of the configuration of the feature indicates the configuration is active, and a feature up-time tracker to output a value representative of an amount of time the configuration has been active. In example 1, the amount of time is based on the first count and second count.

Example 2 includes the silicon semiconductor device of example 1. In example 2, the timer is a first timer, and the device further includes a second timer to expire after a duration of time, a data accumulator. The data accumulator outputs (i) a first difference between a first value of the first count at a first expiration of the second timer and a second value of the first count at a preceding second expiration of the second timer, and (ii) a second difference between a first value of the second count at the first expiration of the second timer and a second value of the second count at the preceding second expiration of the second timer.

Example 3 includes the silicon semiconductor device of example 2, further includes a data reporter to report information including the first difference, the second difference, an identity of the feature configuration.

Example 4 includes the silicon semiconductor device of example 3. In example 3, the silicon semiconductor is an embedded processor operable by a customer and the data reporter is to report the information to a manufacturer of the silicon semiconductor.

Example 5 includes the silicon semiconductor device of example 2. In example 4, the feature up-time tracker divides the second difference by the first difference to determine the value representative of the amount of time the feature has been active.

Example 6 includes the silicon semiconductor device of example 1. In example 6, the value output by the feature up-time tracker is associated with a remittance to be provided to a manufacturer of the silicon semiconductor device.

Example 7 includes the silicon semiconductor device of example 1. In example 7, the configuration is one of a plurality of configurations in which the feature is permitted to operate, and the timer is one of a plurality of timers. Additionally, respective ones of the timers are associated with respective ones of the plurality of feature configurations.

Example 8 includes the silicon semiconductor device of example 1. In example 8, the configuration is a first configuration of a plurality of configurations of the feature and the sampled state of the first configuration is active when the feature is operating in the first configuration.

Example 9 includes the silicon semiconductor device of example 1. In example 9, the first count and the second count are stored in a protected memory responsive to expiration of a second timer.

Example 10 includes the silicon semiconductor device of example 1. In example 10, the feature is a set of cores, the configuration is a first configuration of a plurality of configurations, the first configuration includes a first subset of the cores, the second configuration includes a second subset of the cores, and the third configuration is full set of cores.

Example 11 includes the silicon semiconductor device of example 1. In example the feature corresponds to a base operating frequency of a computer processing unit, the configuration is one of a plurality of configurations of the feature, and respective ones of the plurality of configurations correspond to different, respective base operating frequencies.

Example 12 includes a non-transitory computer readable medium comprising instructions that, when executed, cause one or more processors to at least increment a first count of a first counter when a timer expires, sample a state of a configuration of a feature of a silicon semiconductor device responsive to expiration of the timer, increment a second count of a second counter when the sampled state of the feature, indicates the feature is active, and provide a value representative of an amount of time the configuration has been active. In example 12, the amount of time is based on the first count and the second count.

Example 13 includes the non-transitory computer readable medium of example 12. In example 13, the timer is a first timer, and the instructions cause the one or more processors to provide (i) a first difference between a first value of the first count at a first expiration of a second timer and a second value of the first count at a preceding second expiration of the second timer, and (ii) a second difference between a first value of the second count at the first expiration of the second timer and a second value of the second count at the preceding second expiration of the second timer.

Example 14 includes the non-transitory computer readable medium of example 12. In example 14, the instructions further cause the one or more processors to report information including the first difference, the second difference, an identity of the feature and an identity of the configuration.

Example 15 includes the non-transitory computer readable medium of example 14. In example 1, the silicon semiconductor device is an embedded processor operable by a customer, and the instructions cause the one or more processors to report the information to a manufacturer of the silicon semiconductor.

Example 16 includes the non-transitory computer readable medium of example 12. In example 16, the instructions further to cause the one or more processors to divide the second difference by the first difference to determine the value representative of the amount of time the configuration has been active.

Example 17 includes the non-transitory computer readable medium of example 12. In example 17, the value representative of the amount of time the configuration has been active is associated with a remittance to be provided to a manufacturer of the silicon semiconductor device.

Example 18 includes the non-transitory computer readable medium of example 12. In example 18, the configuration of the feature is associated with one of a plurality of configurations in which the feature is permitted to operate, and the timer is one of a plurality of timers. Further, respective ones of the timers are associated with respective ones of the plurality of configurations.

Example 19 includes the non-transitory computer readable medium of example 18. In example 19, the configuration is a first configuration of the plurality of configurations, and the state of the first configuration is active when the feature is operating in the first configuration.

Example 20 includes the non-transitory computer readable medium of example 12. In example 20, the first count and the second count are stored in a protected memory responsive to expiration of a second timer.

Example 21 includes a method comprising incrementing, by executing an instruction with one or more processors, a first count of a first counter when a timer expires, and sampling, by executing an instruction with one or more processors, a state of a configuration of a feature of a silicon semiconductor device responsive to expiration of the timer. In addition, the method includes incrementing, by executing an instruction with one or more processors, a second count of a second counter when the sampled state of the configuration indicates the configuration is active, and providing a value representative of an amount of time the configuration has been active. In example 21, the amount of time based on the first count and the second count.

Example 22 includes the method of example 21. In example 22, the timer is a first timer, and the method further includes providing (i) a first difference between a first value of the first count at a first expiration of a second timer and a second value of the first count at a preceding second expiration of the second timer, and (ii) a second difference between a first value of the second count at the first expiration of the second timer and a second value of the second count at the preceding second expiration of the second timer.

Example 23 includes the method of example 22. In example 23, the instructions cause the at least one processor to divide the first difference by the second difference to determine the value representative of the amount of time the feature has been active.

Example 24 includes the method of example 22 and further includes reporting information including the first difference, the second difference, an identity of the feature and an identity of the configuration.

Example 25 includes the method of example 21. In example 25, the silicon semiconductor device is an embedded processor operable by a customer, and the information is reported to a manufacturer of the silicon semiconductor.

Example 26 includes the method of example 21. In example 26, the value representative of the amount of time the feature has been active is associated with a remittance to be provided to a manufacturer of the silicon semiconductor device.

Example 27 includes the method of example 21. In example 27, the configuration is one of a plurality of configurations in which the feature is permitted to operate, and the timer is one of a plurality of timers. Additionally, respective ones of the timers are associated with respective ones of the plurality of feature configurations.

Example 28 includes the method of example 27. In example 28, the configuration is a first configuration of the plurality of configurations, and the state of the first configuration is active when the feature is operating in the first configuration Example 29 includes the method of example 21, wherein the first count and the second count are stored in a protected memory responsive to expiration of a second timer.

Example 30 includes a system to provide silicon as a service, the system includes memory, and at least one processor to execute computer readable instructions to receive information identifying a configurable feature of a semiconductor device, and an amount of time a first configuration of the configurable feature is operating during a time period. In example 30, the amount of time less than the time period, and the time period corresponds to a billing period. The system of example 30 also generates an invoice identifying a cost for usage of the first configuration of the configurable feature during the time period and transmits the invoice to a customer associated with the semiconductor device.

Example 31 includes the system of example 30. In example 31, the amount of time is a first amount of time and the cost is a first cost. Additionally, the at least one processor is further to receive information identifying the configurable feature and further identifying a second amount of time a second configuration of the configurable feature is operating during the time period. The invoice of example 31 includes a second cost for usage of the second configuration of the configurable feature during the time period.

Example 32 includes the system of example 30. In example 32, the configurable feature is a configurable number of operable cores and the configurable feature is in the first configuration when two of the operable cores are in use. In addition, the configurable feature is in the second configuration when four of the operable cores are in use.

Example 33 includes the system of example 30. In example 33, the information is received from the semiconductor device in response to at least one of a request for information, an expiration of the billing period, or an end of a portion of the billing period.

Example 34 includes the device of example 1 and further includes the devices of any of examples 2, 6, and 7-11.

Example 35 includes the non-transitory computer readable medium of example 12 and further includes the non-transitory computer readable medium of any of examples 13, 14, 16, 17, 18, 19, or 20.

Example 36 includes the method of example 21 and further includes the method of any of examples 22, 25, 26, 27, or 29.

Example 37 includes the system of example 30 and further includes the system of any of examples 31, 32 or 33.

Example 38 is at least one machine-readable medium including instructions that, when executed by processing circuitry, cause the processing circuitry to perform operations to implement any of Examples 1-37.

Example 39 is an apparatus comprising means to implement any of Examples 1-37.

Example 40 is a system to implement any of Examples 1-37.

Example 41 is a method to implement any of Examples 1-37.

Example 42 is a multi-tier edge computing system, comprising a plurality of edge computing nodes provided among on-premise edge, network access edge, or near edge computing settings, the plurality of edge computing nodes configured to perform any of the methods of Examples 1-37.

Example 43 is an edge computing system, comprising a plurality of edge computing nodes, each of the plurality of edge computing nodes configured to perform any of the methods of Examples 1-37.

Example 44 is an edge computing node, operable as a server hosting the service and a plurality of additional services in an edge computing system, configured to perform any of the methods of Examples 1-37.

Example 45 is an edge computing node, operable in a layer of an edge computing network as an aggregation node, network hub node, gateway node, or core data processing node, configured to perform any of the methods of Examples 1-37.

Example 46 is an edge provisioning, orchestration, or management node, operable in an edge computing system, configured to implement any of the methods of Examples 1-37.

Example 47 is an edge computing network, comprising networking and processing components configured to provide or operate a communications network, to enable an edge computing system to implement any of the methods of Examples 1-37.

Example 48 is an access point, comprising networking and processing components configured to provide or operate a communications network, to enable an edge computing system to implement any of the methods of Examples 1-37.

Example 49 is a base station, comprising networking and processing components configured to provide or operate a communications network, configured as an edge computing system to implement any of the methods of Examples 1-37.

Example 50 is a road-side unit, comprising networking components configured to provide or operate a communications network, configured as an edge computing system to implement any of the methods of Examples 1-37.

Example 51 is an on-premise server, operable in a private communications network distinct from a public edge computing network, configured as an edge computing system to implement any of the methods of Examples 1-37.

Example 52 is a 3GPP 4G/LTE mobile wireless communications system, comprising networking and processing components configured as an edge computing system to implement any of the methods of Examples 1-37.

Example 53 is a 5G network mobile wireless communications system, comprising networking and processing components configured as an edge computing system to implement any of the methods of Examples 1-37.

Example 54 is an edge computing system configured as an edge mesh, provided with a microservice cluster, a microservice cluster with sidecars, or linked microservice clusters with sidecars, configured to implement any of the methods of Examples 1-37.

Example 55 is an edge computing system, comprising circuitry configured to implement services with one or more isolation environments provided among dedicated hardware, virtual machines, containers, or virtual machines on containers, the edge computing system configured to implement any of the methods of Examples 1-37.

Example 56 is an edge computing system, comprising networking and processing components to communicate with a user equipment device, client computing device, provisioning device, or management device to implement any of the methods of Examples 1-37.

Example 57 is networking hardware with network functions implemented thereupon, operable within an edge computing system, the network functions configured to implement any of the methods of Examples 1-37.

Example 58 is acceleration hardware with acceleration functions implemented thereupon, operable in an edge computing system, the acceleration functions configured to implement any of the methods of Examples 1-37.

Example 59 is storage hardware with storage capabilities implemented thereupon, operable in an edge computing system, the storage hardware configured to implement any of the methods of Examples 1-37.

Example 60 is computation hardware with compute capabilities implemented thereupon, operable in an edge computing system, the computation hardware configured to implement any of the methods of Examples 1-37.

Example 61 is an edge computing system configured to implement services with any of the methods of Examples 1-37, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 62 is an apparatus of an edge computing system comprising: one or more processors and one or more computer-readable media comprising instructions that, when executed by the one or more processors, cause the one or more processors to perform any of the methods of Examples 1-37.

Example 63 is one or more computer-readable storage media comprising instructions to cause an electronic device of an edge computing system, upon execution of the instructions by one or more processors of the electronic device, to perform any of the methods of Examples 1-37.

Example 64 is a computer program used in an edge computing system, the computer program comprising instructions, wherein execution of the program by a processing element in the edge computing system is to cause the processing element to perform any of the methods of Examples 1-37.

Example 65 is an edge computing appliance device operating as a self-contained processing system, comprising a housing, case, or shell, network communication circuitry, storage memory circuitry, and processor circuitry adapted to perform any of the methods of Examples 1-37.

Example 66 is an apparatus of an edge computing system comprising means to perform any of the methods of Examples 1-37.

Example 67 is an apparatus of an edge computing system comprising logic, modules, or circuitry to perform any of the methods of Examples 1-37.

Example 68 is an edge computing system, including respective edge processing devices and nodes to invoke or perform any of the operations of Examples 1-37, or other subject matter described herein.

Example 69 is a client endpoint node, operable to invoke or perform the operations of any of Examples 1-37, or other subject matter described herein.

Example 70 is an aggregation node, network hub node, gateway node, or core data processing node, within or coupled to an edge computing system, operable to invoke or perform the operations of any of Examples 1-37, or other subject matter described herein.

Example 71 is an access point, base station, road-side unit, street-side unit, or on-premise unit, within or coupled to an edge computing system, operable to invoke or perform the operations of any of Examples 1-37, or other subject matter described herein.

Example 72 is an edge provisioning node, service orchestration node, application orchestration node, or multi-tenant management node, within or coupled to an edge computing system, operable to invoke or perform the operations of any of Examples 1-37, or other subject matter described herein.

Example 73 is an edge node operating an edge provisioning service, application or service orchestration service, virtual machine deployment, container deployment, function deployment, and compute management, within or coupled to an edge computing system, operable to invoke or perform the operations of any of Examples 1-37, or other subject matter described herein.

Example 74 is an edge computing system including aspects of network functions, acceleration functions, acceleration hardware, storage hardware, or computation hardware resources, operable to invoke or perform the use cases discussed herein, with use of any Examples 1-37, or other subject matter described herein.

Example 75 is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of any of Examples 1-37, or other subject matter described herein.

Example 76 is an edge computing system adapted for mobile wireless communications, including configurations according to a 3GPP 4G/LTE or 5G network capabilities, operable to invoke or perform the use cases discussed herein, with use of any of Examples 1-37, or other subject matter described herein.

Example 77 is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of any of Examples 1-37, or other subject matter described herein.

Example 78 is networking hardware, acceleration hardware, storage hardware, or computation hardware, with capabilities implemented thereupon, operable in an edge computing system to invoke or perform the use cases discussed herein, with use of any of Examples 1-37, or other subject matter described herein.

Example 79 is an apparatus of an edge computing system comprising: one or more processors and one or more computer-readable media comprising instructions that, when deployed and executed by the one or more processors, cause the one or more processors to invoke or perform the use cases discussed herein, with use of any of Examples 1-37, or other subject matter described herein.

Example 80 is one or more computer-readable storage media comprising instructions to cause an electronic device of an edge computing system, upon execution of the instructions by one or more processors of the electronic device, to invoke or perform the use cases discussed herein, with use of any of Examples 1-37, or other subject matter described herein.

Example 81 is an apparatus of an edge computing system comprising means, logic, modules, or circuitry to invoke or perform the use cases discussed herein, with the use of any of Examples 1-37, or other subject matter described herein.

At least one computer readable medium comprising computer readable instructions that when executed cause at least one processor to perform any of the methods of examples 21-29.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A silicon semiconductor device comprising:
   a first counter to increment a first count when a timer expires;
   a feature configuration sampler to sample a state of a configuration of a feature of the silicon semiconductor device responsive to expiration of the timer;
   a second counter to increment a second count when the sampled state of the configuration of the feature indicates the configuration is active; and
   a feature up-time tracker to output a value representative of an amount of time the configuration has been active, the amount of time based on the first count and second count.

2. The silicon semiconductor device of claim 1, wherein the timer is a first timer, and further including:
   a second timer to expire after a duration of time; and
   a data accumulator to output (i) a first difference between a first value of the first count at a first expiration of the second timer and a second value of the first count at a preceding second expiration of the second timer, and (ii) a second difference between a first value of the second count at the first expiration of the second timer and a second value of the second count at the preceding second expiration of the second timer.

3. The silicon semiconductor device of claim 2, further including a data reporter to report information including the first difference, the second difference, and an identity of the feature configuration.

4. The silicon semiconductor device of claim 3, wherein the silicon semiconductor device is an embedded processor operable by a customer and the data reporter is to report the information to a manufacturer of the silicon semiconductor device.

5. The silicon semiconductor device of claim 2, wherein the feature up-time tracker is to divide the second difference by the first difference to determine the value representative of the amount of time the feature has been active.

6. The silicon semiconductor device of claim 1, wherein the configuration is one of a plurality of configurations in which the feature is permitted to operate, and the timer is one of a plurality of timers, respective ones of the timers associated with respective ones of the plurality of configurations.

7. The silicon semiconductor device of claim 1, wherein the feature is a set of cores, the configuration is a first configuration of a plurality of configurations, the first configuration includes a first subset of the cores, a second configuration includes a second subset of the cores, and a third configuration includes a full set of the cores.

8. The silicon semiconductor device of claim 1, wherein the feature corresponds to a base operating frequency of a computer processing unit, the configuration is one of a plurality of configurations of the feature, and respective ones of the plurality of configurations correspond to different, respective base operating frequencies.

9. A non-transitory computer readable medium comprising instructions that, when executed, cause one or more processors to at least:
   increment a first count of a first counter when a timer expires;
   sample a state of a configuration of a feature of a silicon semiconductor device responsive to expiration of the timer;
   increment a second count of a second counter when the sampled state of the feature, indicates the feature is active; and
   provide a value representative of an amount of time the configuration has been active, the amount of time based on the first count and the second count.

10. The non-transitory computer readable medium of claim 9, wherein the timer is a first timer, and the instructions cause the one or more processors to provide (i) a first difference between a first value of the first count at a first expiration of a second timer and a second value of the first count at a preceding second expiration of the second timer, and (ii) a second difference between a first value of the second count at the first expiration of the second timer and a second value of the second count at the preceding second expiration of the second timer.

11. The non-transitory computer readable medium of claim 10, wherein the instructions further cause the one or more processors to report information including the first difference, the second difference, an identity of the feature and an identity of the configuration.

12. The non-transitory computer readable medium of claim 10, wherein the instructions are to cause the one or more processors to divide the second difference by the first difference to determine the value representative of the amount of time the configuration has been active.

13. The non-transitory computer readable medium of claim 9, wherein the configuration of the feature is associated with one of a plurality of configurations in which the feature is permitted to operate, and the timer is one of a plurality of timers, respective ones of the timers associated with respective ones of the plurality of configurations.

14. The non-transitory computer readable medium of claim 9, wherein the first count and the second count are stored in a protected memory responsive to expiration of a second timer.

15. A method comprising:
   incrementing, by executing an instruction with one or more processors, a first count of a first counter when a timer expires;

sampling, by executing an instruction with one or more processors, a state of a configuration of a feature of a silicon semiconductor device responsive to expiration of the timer;

incrementing, by executing an instruction with one or more processors, a second count of a second counter when the sampled state of the configuration indicates the configuration is active; and providing a value representative of an amount of time the configuration has been active, the amount of time based on the first count and the second count.

16. The method of claim 15, wherein the timer is a first timer, and the method includes providing (i) a first difference between a first value of the first count at a first expiration of a second timer and a second value of the first count at a preceding second expiration of the second timer, and (ii) a second difference between a first value of the second count at the first expiration of the second timer and a second value of the second count at the preceding second expiration of the second timer.

17. The method of claim 16, wherein the method includes dividing the first difference by the second difference to determine the value representative of the amount of time the feature has been active.

18. The method of claim 16, wherein the method includes reporting information including the first difference, the second difference, an identity of the feature and an identity of the configuration.

19. The method of claim 18, wherein the silicon semiconductor device is an embedded processor operable by a customer, and the information is reported to a manufacturer of the silicon semiconductor device.

20. The method of claim 15, wherein the value representative of the amount of time the feature has been active is associated with a remittance to be provided to a manufacturer of the silicon semiconductor device.

* * * * *